(12) United States Patent
Kurokawa et al.

(10) Patent No.: US 11,370,473 B2
(45) Date of Patent: Jun. 28, 2022

(54) TELESCOPIC STRUCTURE AND STEERING COLUMN

(71) Applicant: NSK LTD., Tokyo (JP)

(72) Inventors: Yoshifumi Kurokawa, Ann Arbor, MI (US); Jessica Elaine Lipa, Saline, MI (US)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/124,946

(22) Filed: Dec. 17, 2020

(65) Prior Publication Data

US 2021/0213998 A1 Jul. 15, 2021

Related U.S. Application Data

(60) Provisional application No. 62/951,391, filed on Dec. 20, 2019.

(51) Int. Cl.
*B62D 1/185* (2006.01)
*F16D 3/06* (2006.01)
*F16C 3/03* (2006.01)

(52) U.S. Cl.
CPC ............ *B62D 1/185* (2013.01); *F16D 3/06* (2013.01); *F16C 3/03* (2013.01)

(58) Field of Classification Search
CPC ............ B62D 1/185; F16D 3/06; F16C 3/03
See application file for complete search history.

(56) References Cited

U.S. PATENT DOCUMENTS

| 5,152,627 A | 10/1992 | Arnold | |
|---|---|---|---|
| 5,509,324 A * | 4/1996 | Cymbal | B62D 1/16 403/109.3 |
| 8,215,200 B2 * | 7/2012 | Daumal Castellon | F16C 3/03 74/493 |

FOREIGN PATENT DOCUMENTS

| DE | 102010037312 B3 * | 1/2012 | ............ B62D 1/185 |
|---|---|---|---|
| ES | 2362849 B1 * | 3/2012 | |
| JP | 2010-83392 A | 4/2010 | |
| WO | WO-2015011479 A1 * | 1/2015 | ............ F16C 3/035 |

* cited by examiner

*Primary Examiner* — Drew J Brown
(74) *Attorney, Agent, or Firm* — Sughrue Mion, PLLC

(57) ABSTRACT

An interface structure includes a sleeve, a wedge and a biasing member. The sleeve is arranged between the inner circumferential surface of the outer tube and the outer circumferential surface of the inner tube. The sleeve includes at least one fixing portion fixed to a first tube that is one of the outer tube and the inner tube, at least one contact surface configured to come into contact with a second tube that is the other of the outer tube and the inner tube, and a wedge mating surface configured to be mated with the wedge. The wedge is arranged between the first tube and the sleeve and is mated with the wedge mating surface of the sleeve. The biasing member biases the wedge so as to engage the wedge between the first tube and the sleeve while allowing the sleeve and the second tube to slide on each other.

10 Claims, 54 Drawing Sheets

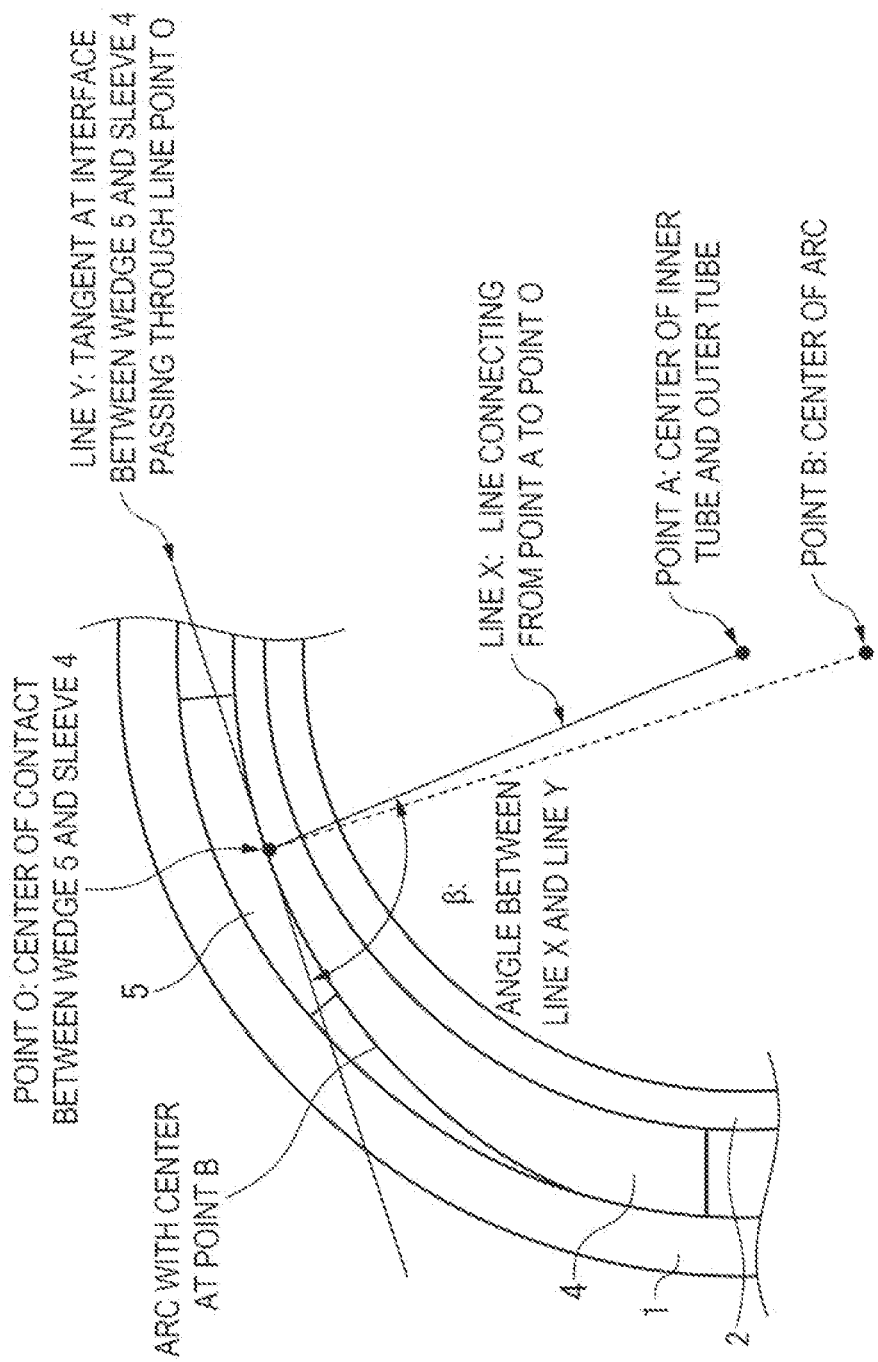

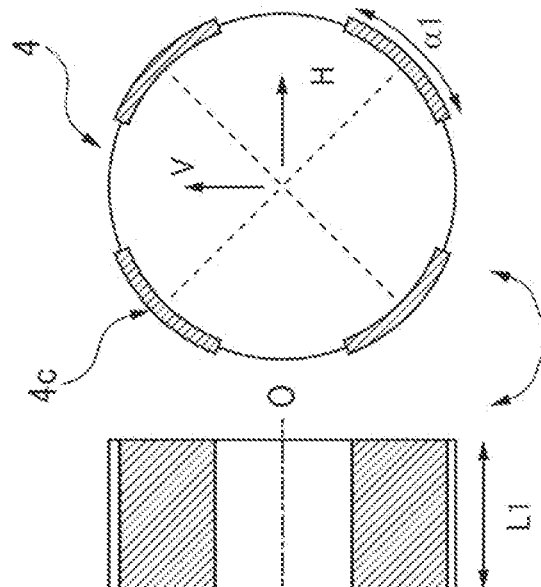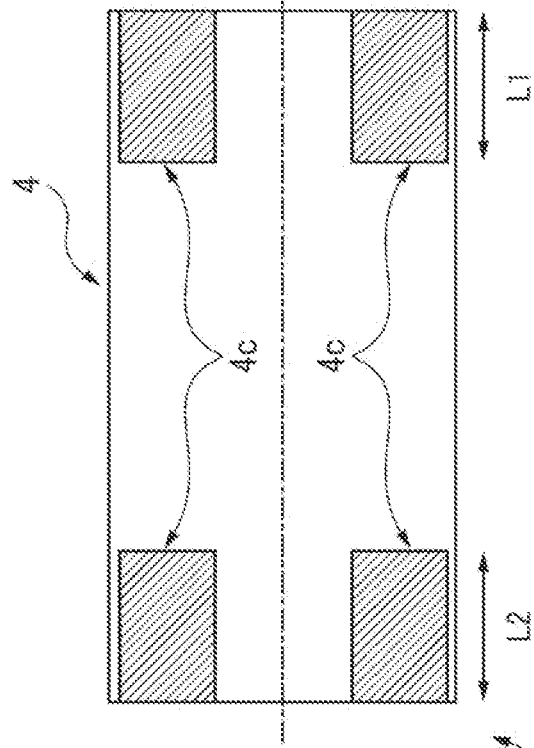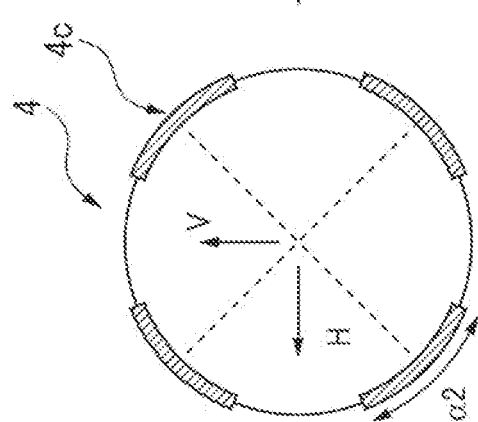

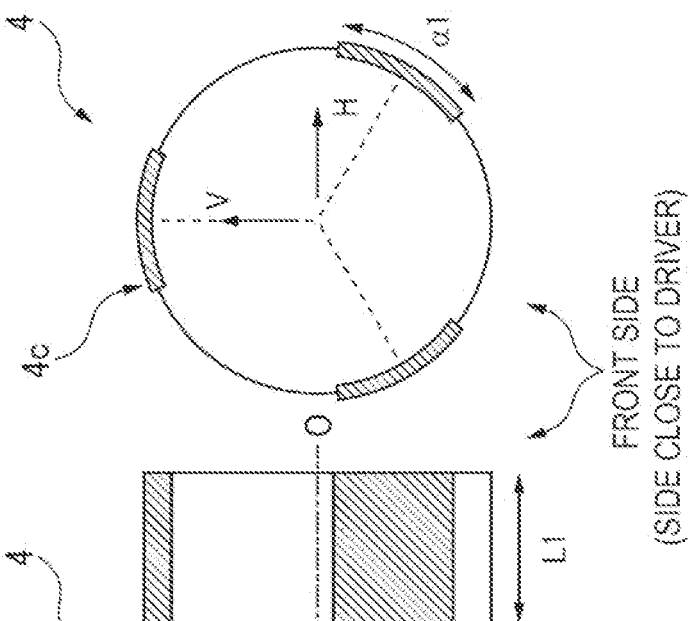
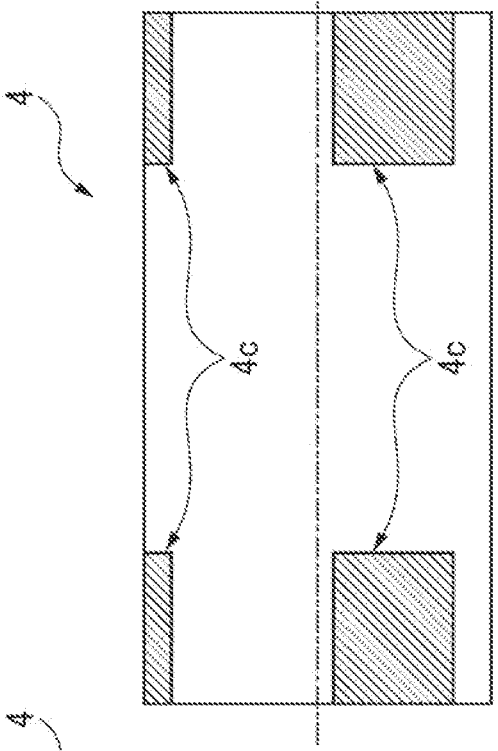
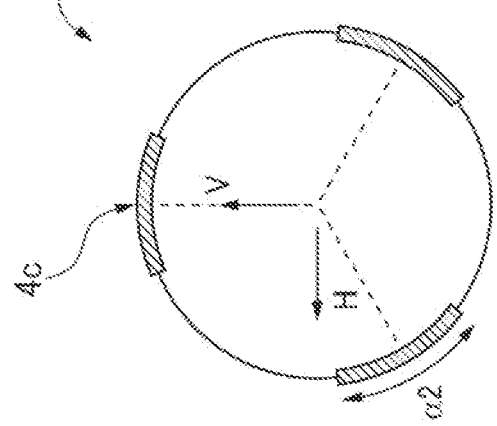

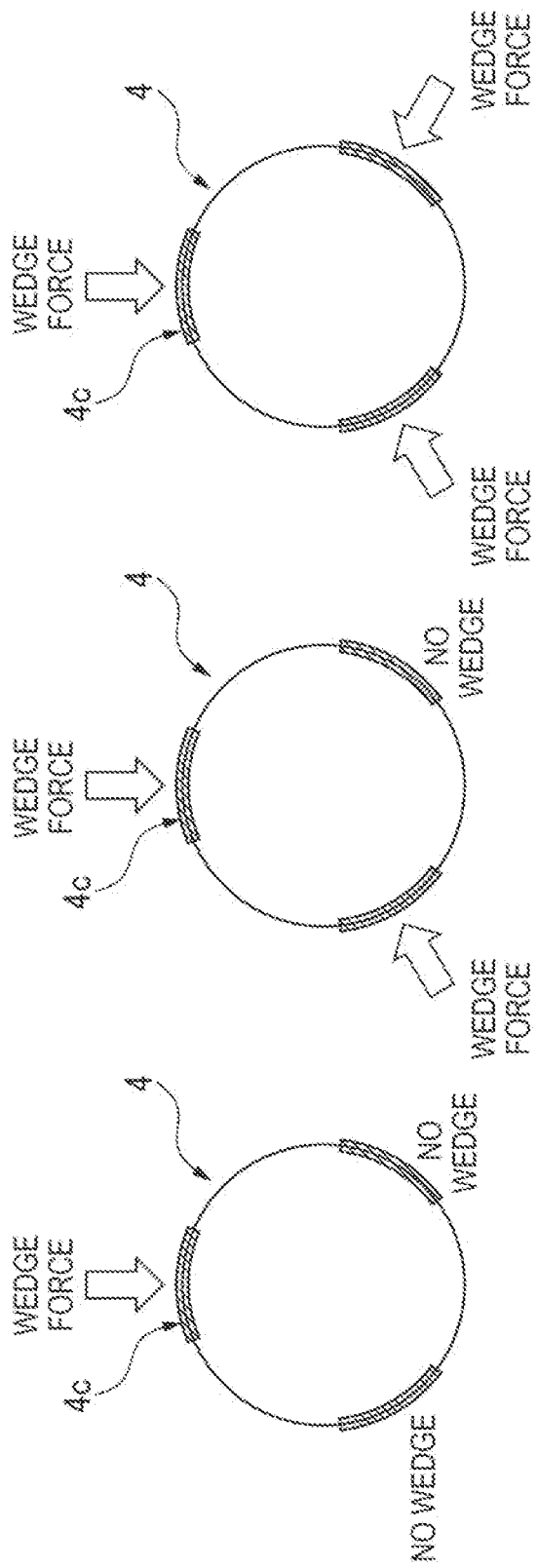

STEP 1    STEP 2

FIG. 62

| TERM | MEANING | | |
|---|---|---|---|
| AXIAL DIRECTION | DIRECTION ALONG AXIS OF STEERING SHAFT OR TUBE, ALONG WHICH TELESCOPE-LIKE MOVEMENT OCCURS | FOR EXAMPLE, CIRCULAR TUBE | FOR EXAMPLE, SQUARE TUBE |
| RADIAL DIRECTION | DIRECTION PERPENDICULAR TO AXIAL DIRECTION | FOR EXAMPLE, CIRCULAR TUBE (RADIAL DIRECTION, INCLUDING INWARD DIRECTION) | FOR EXAMPLE, SQUARE TUBE (RADIAL DIRECTION, INCLUDING INWARD DIRECTION) |
| CIRCUMFERENTIAL DIRECTION | DIRECTION ALONG OUTER CIRCUMFERENCE OF CROSS SECTION OF TUBE, REGARDLESS OF TUBE SHAPE | FOR EXAMPLE, CIRCULAR TUBE (CIRCUMFERENTIAL DIRECTION, INCLUDING COUNTERCLOCKWISE) | FOR EXAMPLE, SQUARE TUBE (CIRCUMFERENTIAL DIRECTION, INCLUDING COUNTERCLOCKWISE) |
| SYMBOL ⊙ | PIVOT SHAFT | | |

TELESCOPIC STRUCTURE AND STEERING COLUMN

CROSS-REFERENCE TO RELATED APPLICATIONS

The present application is based on U.S. Provisional Patent Application No. 62/951,391 filed on Dec. 20, 2019, the contents of which are incorporated herein by reference.

TECHNICAL FIELD

The present invention relates to a telescopic structure, and further relates to a steering column having the telescopic structure.

BACKGROUND ART

The telescopic structure may be provided, for example, on the steering column in a steering device of an automobile to allow a distance between a driver and a steering wheel to be adjusted. In a related-art telescopic structure, radial backlash may occur in a fitting position of a plurality of cylindrical parts, resulting in low rigidity. In order to solve this problem, for example, the following technology is disclosed.

According to one technology, for example, as disclosed in FIGS. 2 and 3 of Japanese Unexamined Patent Application Publication No. 2010-083392, a member (for example, a plastic member) is pressed against a tube using a screw and a spring from a housing side. That is, as schematically shown in FIG. 61, in a telescopic structure in which a metal inner tube 102 is inserted into a metal outer tube 101, the member made of a polyoxymethylene material (POM) is pressed against the inner tube 102 at a plurality of positions by a spring 106 from the outer tube 101. A clearance 100C is formed in a space between the outer tube 101 and the inner tube 102.

Disadvantages of this technology are as follows.

1. Rigidity highly depends on a spring force. (In addition, the rigidity is limited by the spring force.) The rigidity may be difficult to adjust due to this dependence.

2. A large spring force may be required in order to ensure good rigidity, resulting in a large sliding force (for example, approximately 400N). The large sliding force increases wear and load on a motor (resulting in a slow telescope operation speed).

3. Since a contact surface of a sliding interface may not be clear, it may be difficult to control a natural frequency, the rigidity and a low-temperature sliding force.

4. A metal-on-metal contact may be a cause of increasing the sliding force, and may require the use of grease.

5. Since both the sliding force and the rigidity strongly depend on the spring force, the sliding force cannot be easily changed without changing the rigidity.

In contrast, a steering column 1 disclosed in U.S. Pat. No. 5,152,627 has a pipe configuration capable of performing a telescope operation as shown in FIG. 1 of the same patent, and in an embodiment shown in FIG. 2, an inner pipe 4 having a pipe configuration is fitted to an outer pipe 2. A sliding bush 5 made of plastic or metal is formed on the inner pipe 4 by molding or casting. The sliding bush 5 has inclined surfaces 6, 7 to be mated with inclined surfaces of wedge members 8, 9. The wedge members 8, 9 are placed between the inclined surfaces 6, 7 of the sliding bush 5 and an inner surface of the outer pipe 2 so as to sandwich a spring 11 therebetween, and are biased by the spring 11 in directions away from each other. Accordingly, not only a space between the inner surface (a sliding surface) of the outer pipe 2 on a side where the wedge members 8, 9 are placed and the sliding bush 5 is filled without play, but also the inner pipe 4 covered with the sliding bush 5 is pressed against other inner surfaces (sliding surfaces) 12, 13 of the outer pipe 2, so that no play is formed between the inner pipe 4 and the outer pipe 2 on a side of the inner surfaces (the sliding surfaces) 12, 13.

In an embodiment shown in FIGS. 3 and 4 of U.S. Pat. No. 5,152,627, the sliding bush 5 is not formed on the side where the wedge members 8, 9 are placed, and instead, outer surfaces 14, 15 of the inner pipe 4 on the side where the wedge members 8, 9 are placed have inclined surfaces to be mated with the inclined surfaces of the wedge members 8, 9. Accordingly, the wedge members 8, 9 are in direct contact with the outer surfaces 14, 15 of the inner pipe 4 and an inner surface (a sliding surface) 16 of the outer pipe 2, and are sandwiched between these surfaces. In this way, as in the embodiment shown in FIG. 2, no play is formed between the inner pipe 4 and the outer pipe 2.

In a configuration disclosed in U.S. Pat. No. 5,152,627, the wedge members 8, 9 are in contact with the inner surface of the outer pipe 2, or the wedge members 8, 9 are in contact with both the outer surface of the inner pipe 4 and the inner surface of the outer pipe 2. Therefore, the wedge members 8, 9 are dragged by the outer pipe 2 due to friction with the inner surface of the outer pipe 2 when the inner pipe 4 slides, so that the wedge members 8, 9 may be axially displaced from the surface to be engaged with the sliding bush 5 or the inner pipe 4. Due to the sliding friction between the wedge members 8, 9 and the inner surface of the outer pipe 2 when the inner pipe 4 slides, the sliding force may increase, thereby increasing wear and load on a motor (resulting in a slower telescope operation speed).

SUMMARY OF INVENTION

In view of the above, an object of the present invention is to provide a telescopic structure capable of realizing sliding with a small sliding force without backlash while a wedge is not affected by friction during the sliding. Another object of the present invention is to provide a steering column in which a driver does not feel a sense of discomfort such as backlash when operating a steering wheel.

According to the present invention, there is provided a telescopic structure including: an outer tube having a central axis; an inner tube arranged in the outer tube and movable in the outer tube in an axial direction of the central axis; and an interface structure provided between an inner circumferential surface of the outer tube and an outer circumferential surface of the inner tube.

The interface structure includes a sleeve, a wedge and a biasing member. The sleeve is arranged between the inner circumferential surface of the outer tube and the outer circumferential surface of the inner tube. The sleeve includes: at least one fixing portion fixed to a first tube that is one of the outer tube and the inner tube; at least one contact surface configured to come into contact with a second tube that is the other of the outer tube and the inner tube; and a wedge mating surface configured to be mated with the wedge. The wedge is arranged between the first tube and the sleeve and is mated with the wedge mating surface of the sleeve. The biasing member biases the wedge so as to engage the wedge between the first tube and the sleeve while allowing the sleeve and the second tube to slide on each other.

In this way, according to the present invention, the wedge biased by the biasing member deeply engages with the sleeve, and the sleeve and the wedge fill a gap between the outer tube and the inner tube, so that the sleeve and the wedge support the second tube without backlash. In particular, in the present invention, since the wedge is disposed between the first tube and the sleeve, friction does not occur between the wedge and the second tube when the second tube slides. Therefore, the wedge is not dragged and displaced from the mating surface of the sleeve when the second tube slides. Since no friction occurs between the second tube and the wedge, a sliding force is small. When the telescopic structure according to the present invention is used in a steering column, a driver can be prevented from feeling a sense of discomfort such as backlash when operating a steering wheel.

In the present invention, the wedge may have a displacement prevention structure that prevents an axial displacement from the wedge mating surface. Accordingly, the wedge can be more reliably prevented from being dragged and displaced from the mating surface of the sleeve when the second tube slides.

In the present invention, the biasing member may bias the wedge in (i) the axial direction, (ii) a circumferential direction of the first tube, or (iii) an oblique direction having a direction component of the axial direction and a direction component of the circumferential direction.

Preferably, the wedge mating surface and the contact surface are arranged at the same position in the axial direction and the circumferential direction.

Preferably, at the same position, the first tube, the wedge, the sleeve and the second tube overlap each other without a gap.

Preferably, a plurality of the contact surfaces are arranged at different positions in the axial direction and are raised from a periphery of the sleeve to come into contact with the second tube.

Preferably, the sleeve is made of a material having flexibility.

Preferably, the sleeve is made of a plastic material.

Preferably, the biasing member is a spring.

BRIEF DESCRIPTION OF DRAWINGS

FIG. 10 is a view showing the wedge angle in the interface structure (a sliding interface) having the circumferential wedge in a case of circular tubes.

FIGS. 18A, 18B and 18C are respectively a rear view, a side view and a front view schematically showing an example of the sleeve having four contact surfaces in vicinity of each of axial end portions.

FIGS. 19A, 19B and 19C are respectively a rear view, a side view and a front view schematically showing another example of an arrangement of contact surfaces 4c on the sleeve 4.

Each of FIGS. 20A, 20B, 20C and 20D is a view showing an example in which a force due to the wedge is applied to only two of the four contact surfaces.

Figures 20A, 20B, 20C:
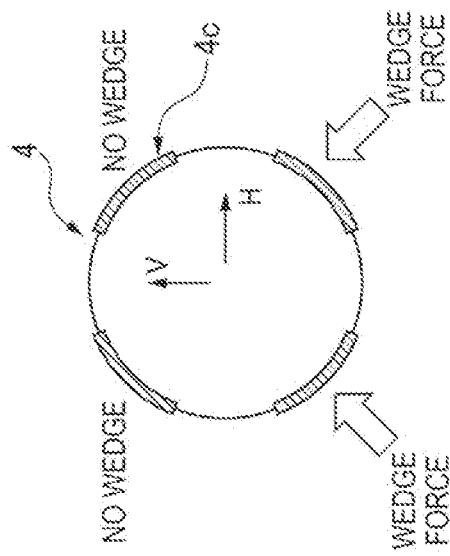
Figures 20D, 20E, 20F:
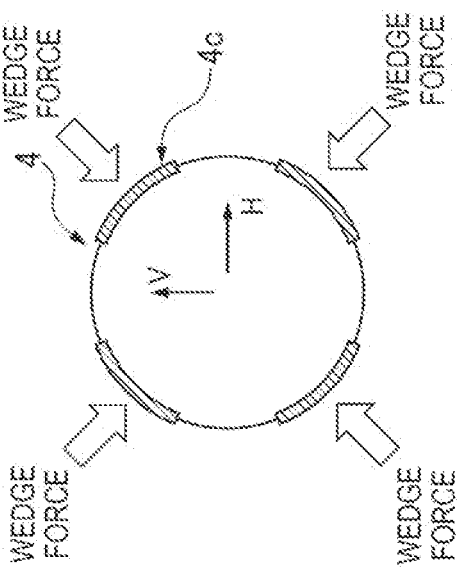

FIG. 20E is a view showing an example in which the force due to the wedge is applied to only three of the four contact surfaces.

FIG. 20F is a view showing an example in which the force due to the wedge is applied to all of the four contact surfaces.

FIG. 21A is a view showing an example in which the force due to the wedge is applied to only one of three contact surfaces.

FIG. 21B is a view showing an example in which the force due to the wedge is applied to only two of the three contact surfaces.

FIG. 21C is a view showing an example in which the force due to the wedge is applied to all of the three contact surfaces.

Figure 22A:
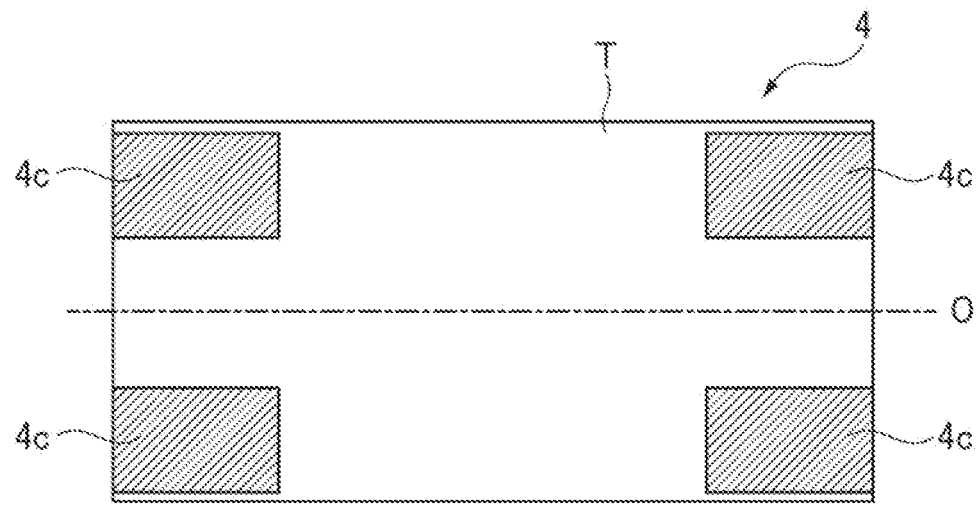
Figure 22B:
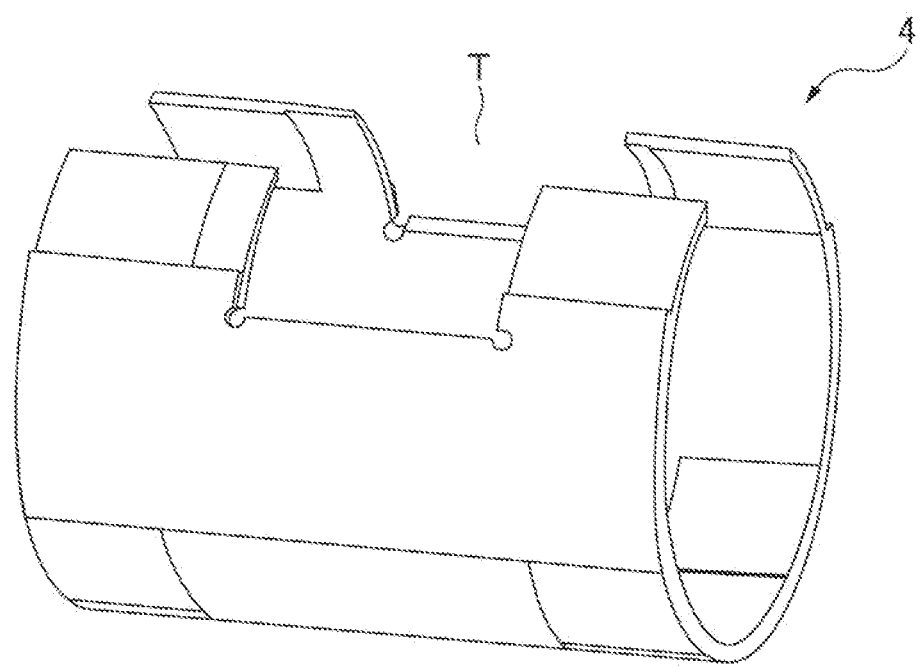

FIGS. 22A and 22B are views showing an example in which a portion between a plurality of contact surfaces is removed from the sleeve, in which FIG. 22A is a side view and FIG. 22B is a perspective view.

Figure 23:
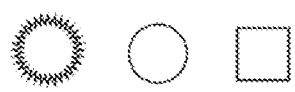

FIG. 23 is a view showing a plurality of examples of a shape of a press-fit portion for fixing the sleeve.

Each of FIGS. 24A, 24B, 24C and 24D is a front view and a side view of an example of the sleeve having one or more fixing positions.

Figure 25:
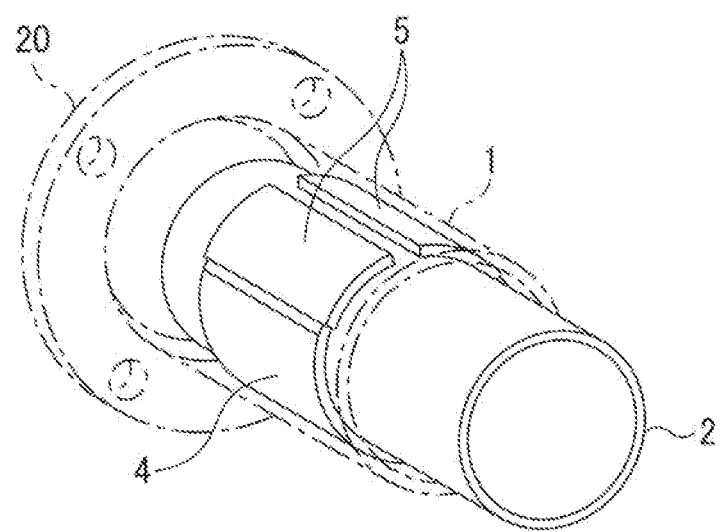

FIG. 25 is a perspective view showing an appearance of an example of an actual device having the telescopic structure according to the present invention.

Figure 26A:
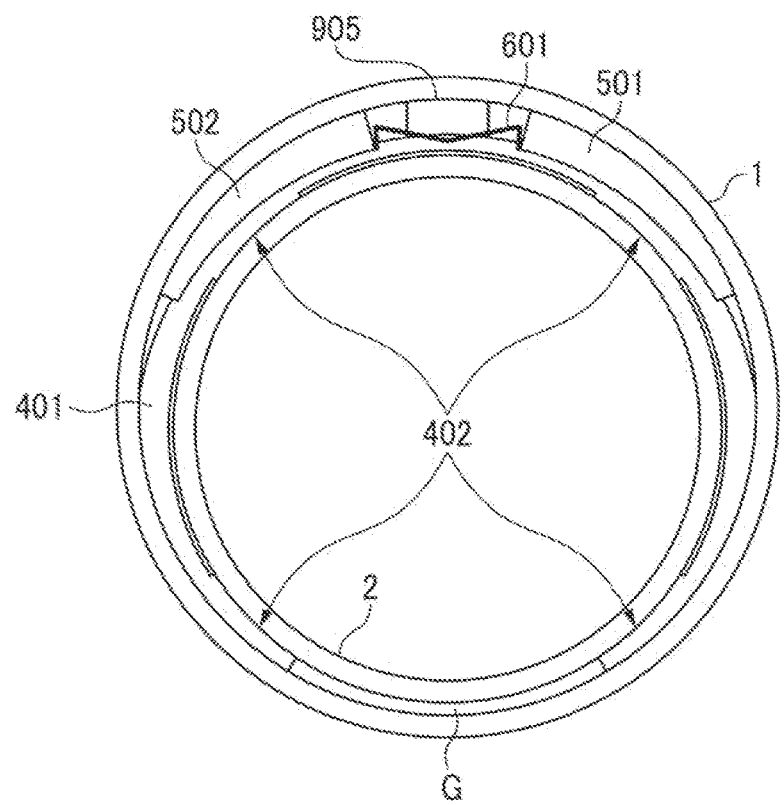

FIG. 26A is an end view of a sliding interface using circumferential wedges as viewed in the axial direction according to a first embodiment of the present invention.

Figure 26B:
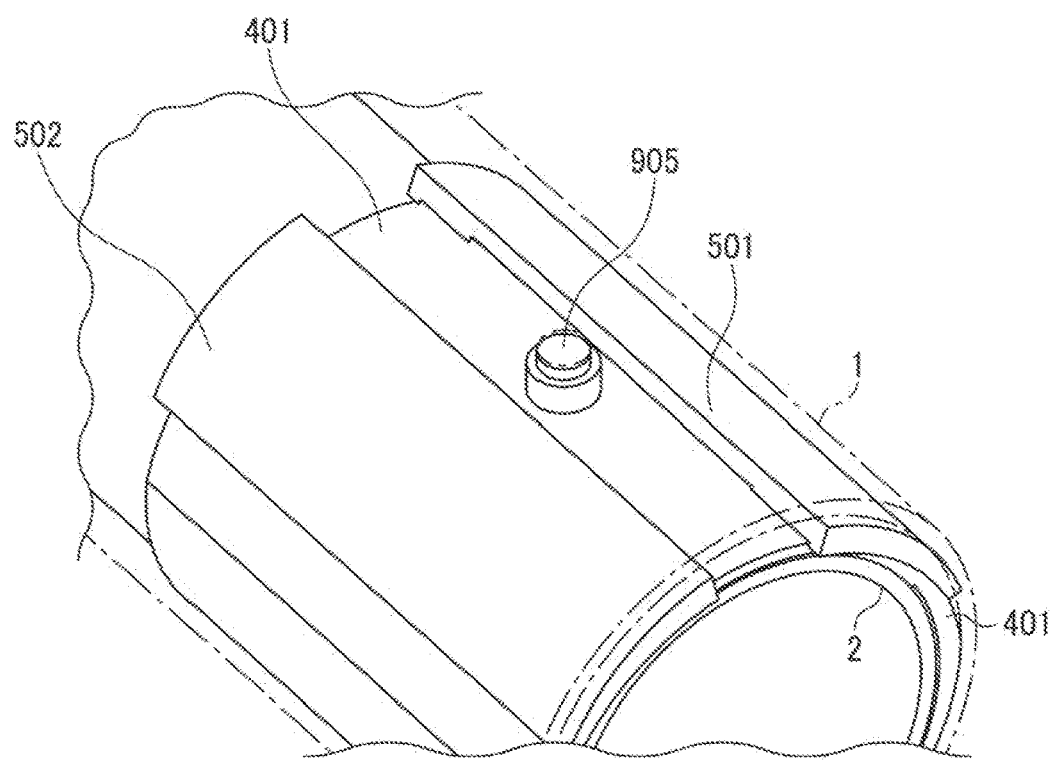

FIG. 26B is a partial perspective view of the telescopic structure having the sliding interface in FIG. 26A.

Figure 26C:
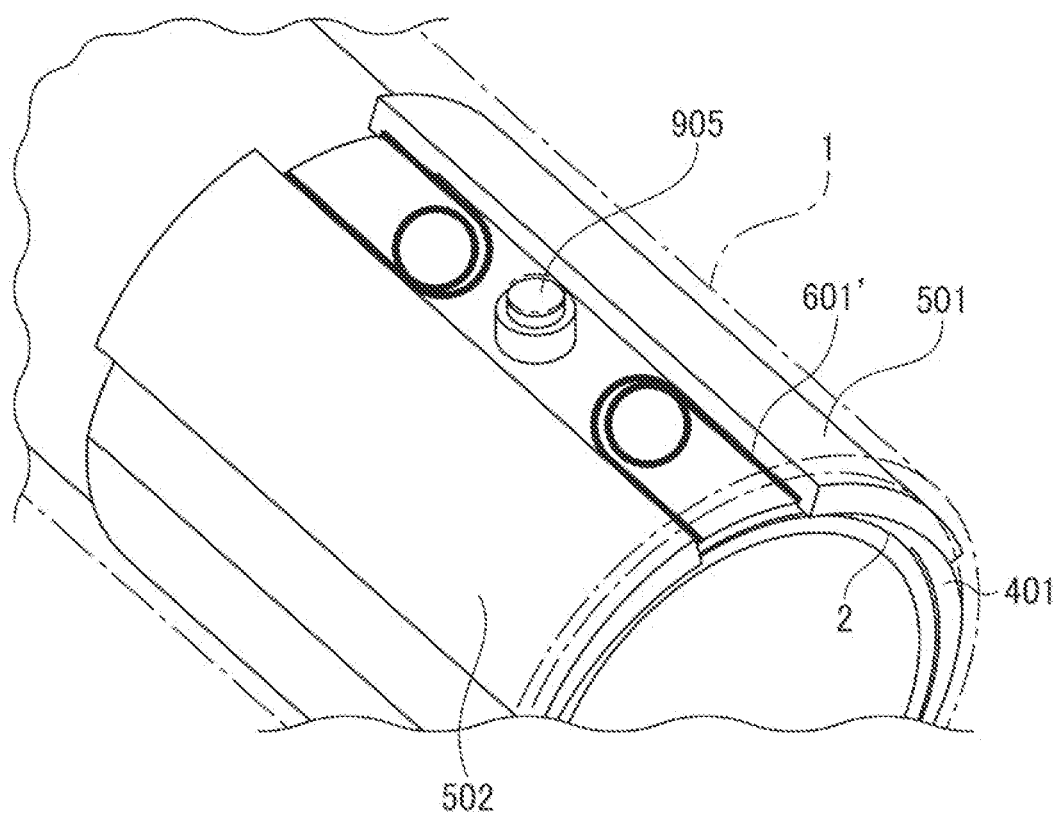

FIG. 26C is a perspective view showing an example in which a coil spring is installed in a gap of the sleeve in a configuration in FIG. 26B.

Figure 26D:
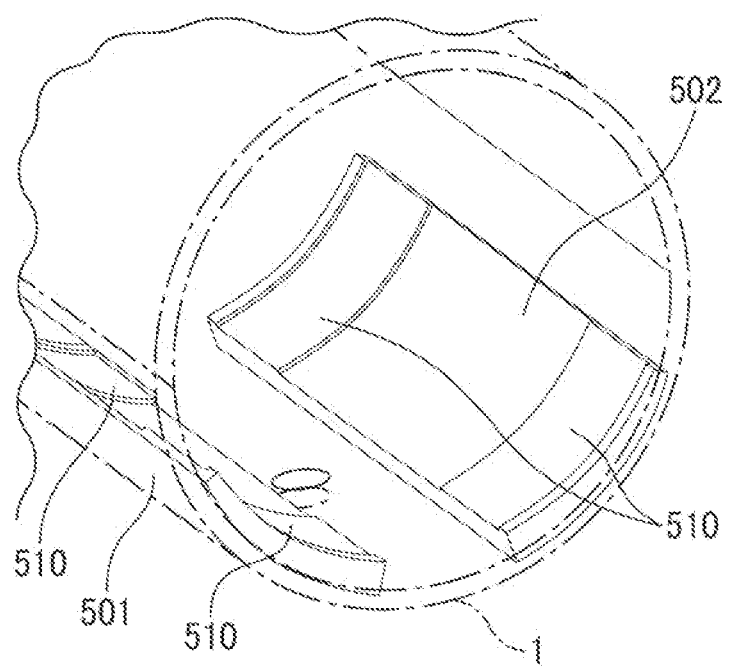

FIG. 26D is a perspective view showing a contact surface of the wedge to be mated with a back side of the contact surface of the sleeve on a side close to the wedges.

Figure 27A:
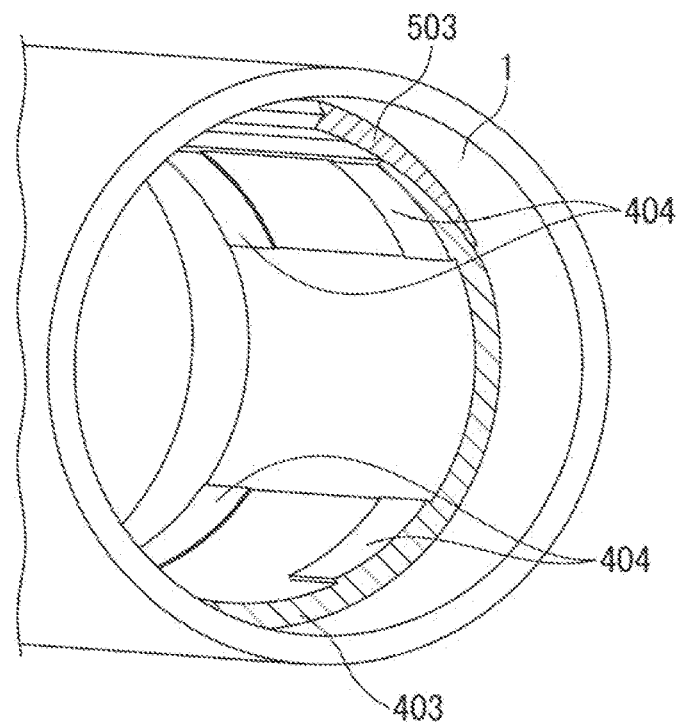

FIG. 27A is a partial perspective view of a sliding interface using circumferential wedges according to a second embodiment of the present invention.

Figure 27B:
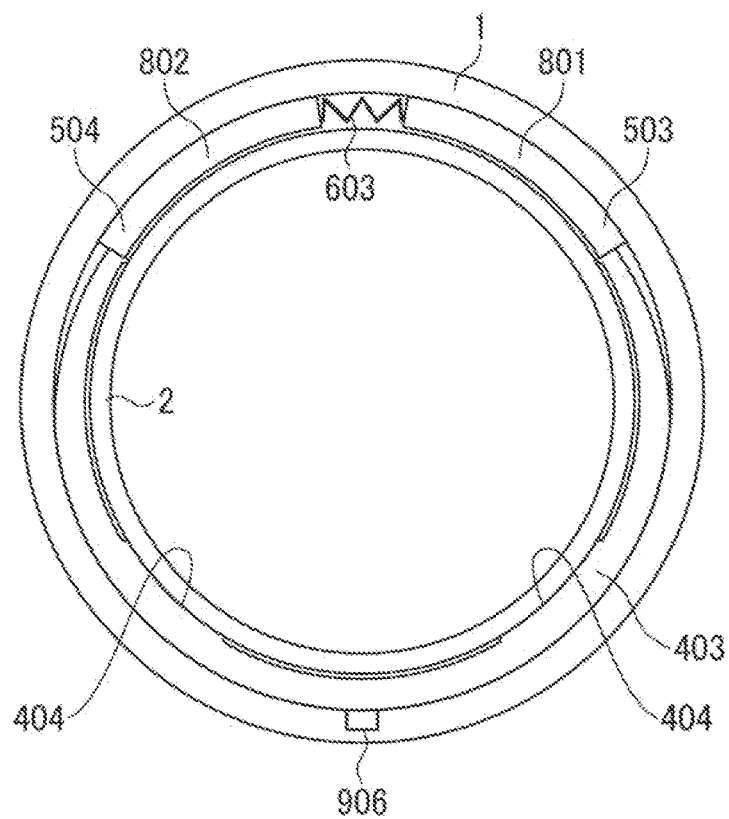

FIG. 27B is an end view of the sliding interface in FIG. 27A as viewed in the axial direction.

Figure 27C:
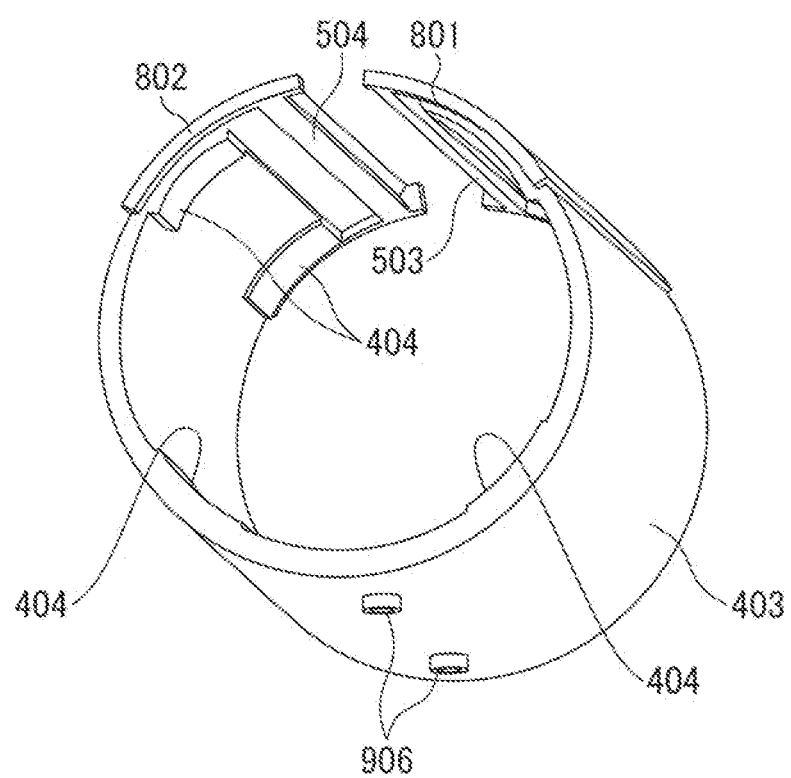

FIG. 27C is a view showing an assembly of a sleeve and the wedges in the sliding interface in FIG. 27A.

Each of FIGS. 28A, 28B, 28C and 28D is a top view showing an example of shapes of a spring and base side end portions of wedges to which the spring is attached.

Figure 29:
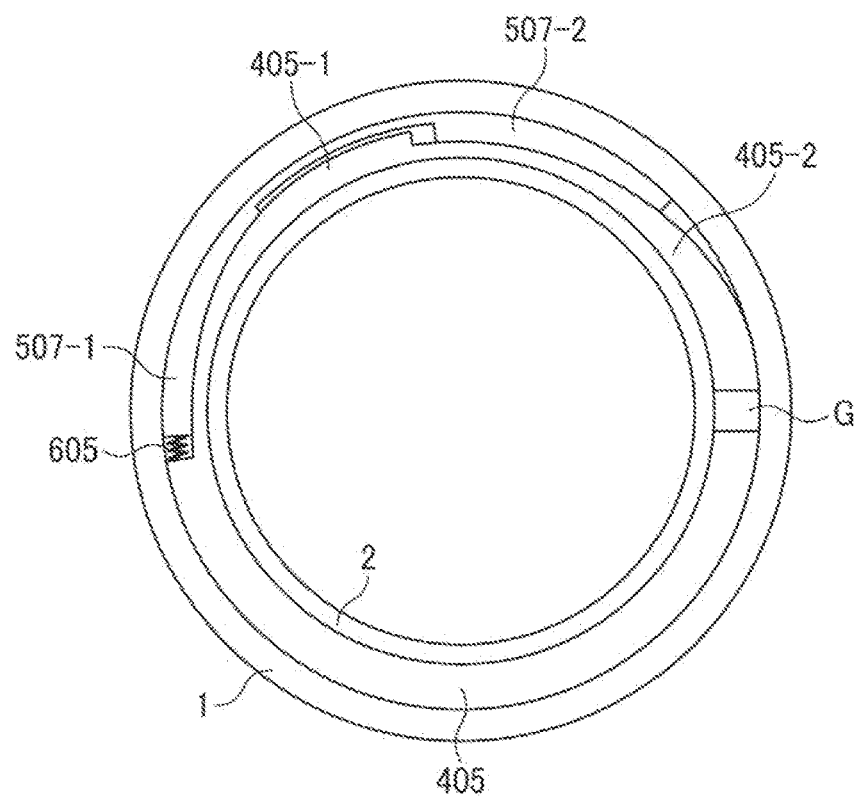

FIG. 29 is an end view of a sliding interface using circumferential wedges as viewed in the axial direction according to a third embodiment of the present invention.

Figure 30:
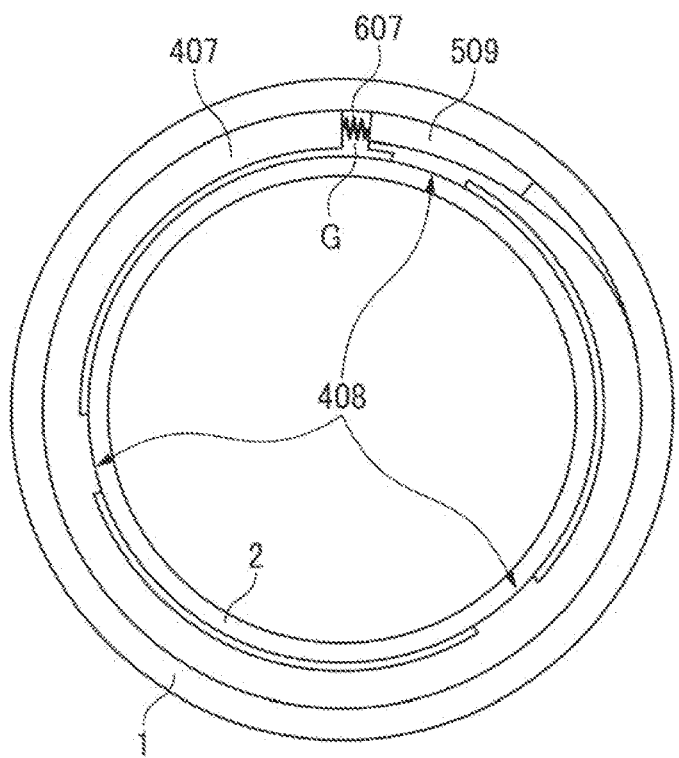

FIG. 30 is an end view of a sliding interface using a circumferential wedge as viewed in the axial direction according to a fourth embodiment of the present invention.

Figure 31:
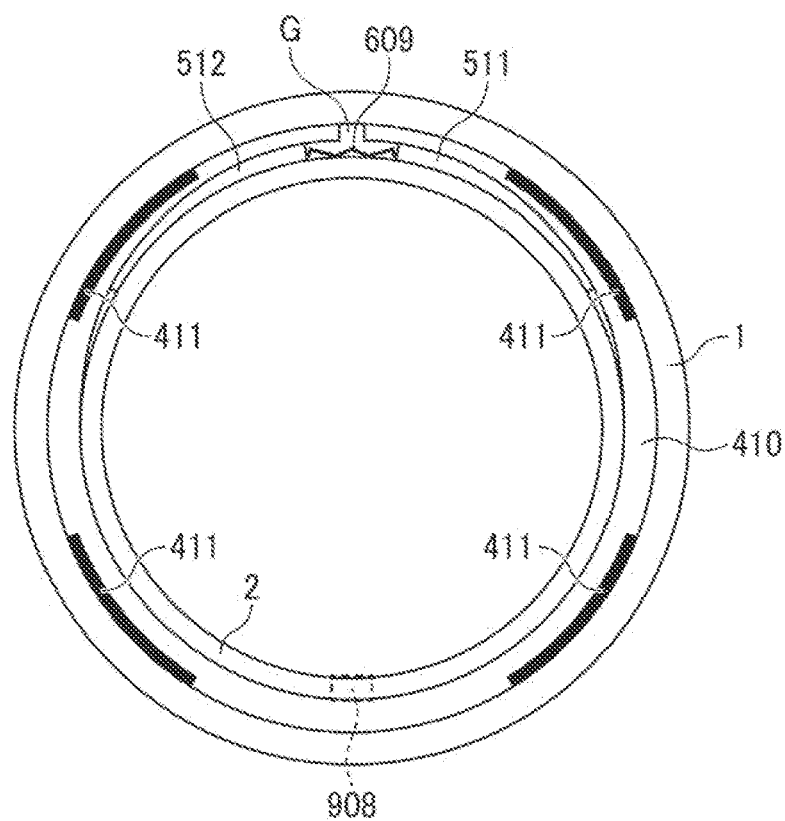

FIG. 31 is an end view of a sliding interface using circumferential wedges as viewed in the axial direction according to a fifth embodiment of the present invention.

Figure 32:
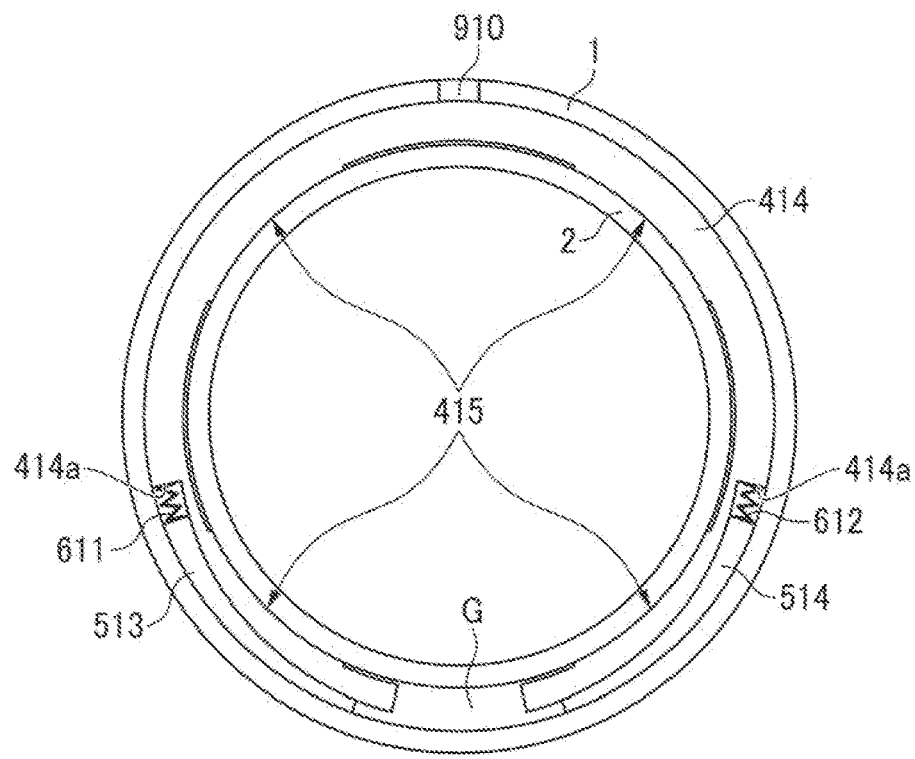

FIG. 32 is an end view of a sliding interface using circumferential wedges as viewed in the axial direction according to a sixth embodiment of the present invention.

Figure 33:
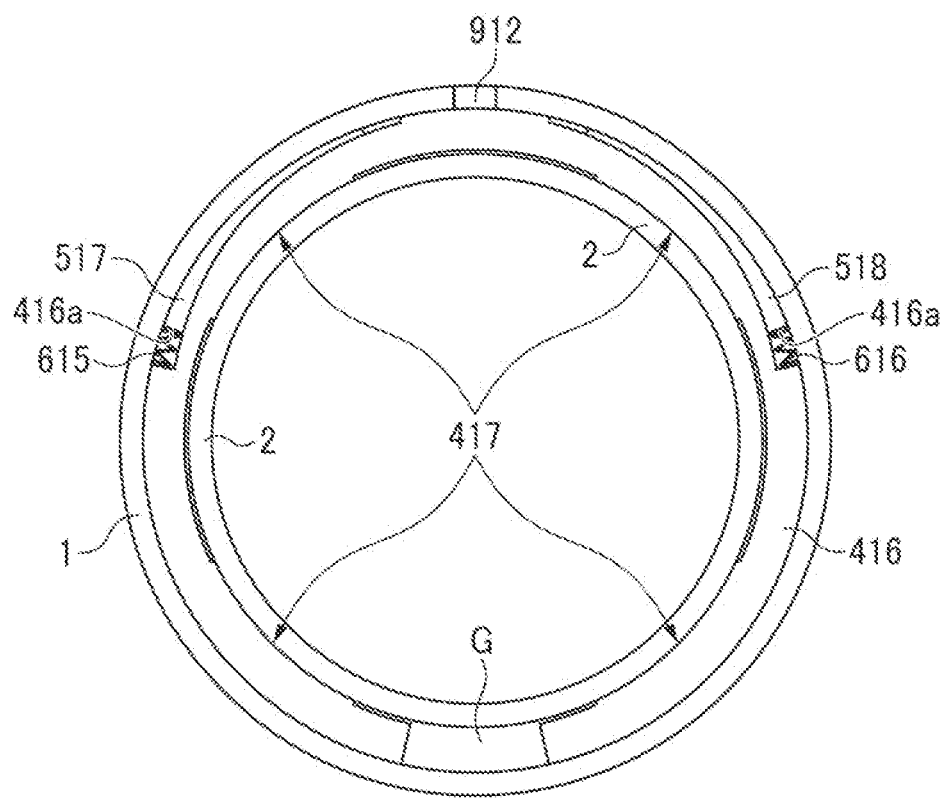

FIG. 33 is an end view of a sliding interface using circumferential wedges as viewed in the axial direction according to a seventh embodiment of the present invention.

Figure 34:
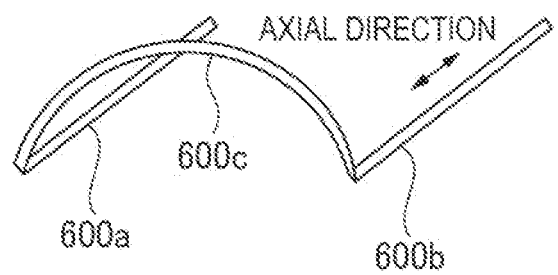

FIG. 34 is a perspective view showing an example of a spring that may be used in a sliding interface having two springs and a circumferential wedge configuration.

Figure 35:
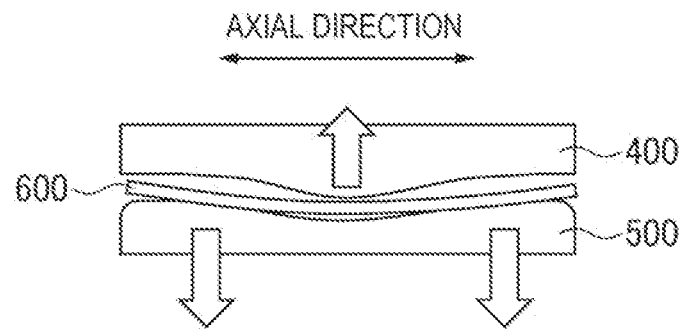

FIG. 35 is a view schematically showing an example of shapes of end surfaces of a base side end portion of the wedge and a stepped portion of the sleeve facing the base side end portion of the wedge, which is suitable for using a wire spring in the sliding interface using the circumferential wedge configuration.

Figure 36:
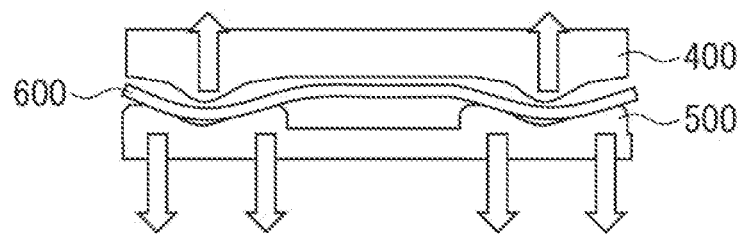

FIG. 36 is a view schematically showing another example of shapes of end surfaces of a base side end portion of the wedge and a stepped portion of the sleeve facing the base side end portion of the wedge, which is suitable for using the wire spring in the sliding interface using the circumferential wedge configuration.

Figure 37A:
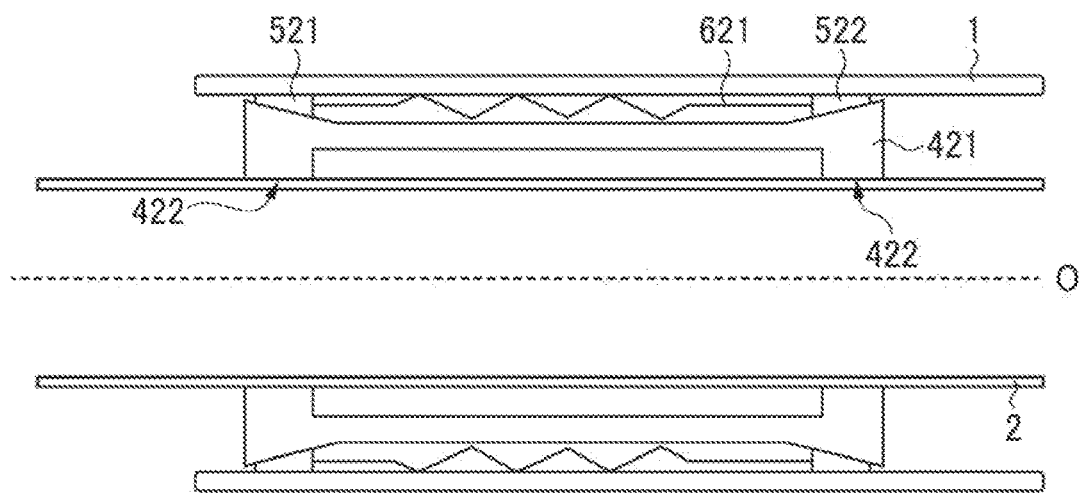

FIG. 37A is an axial cross-sectional view of a sliding interface using axial wedges according to an eighth embodiment of the present invention.

Figure 37B:
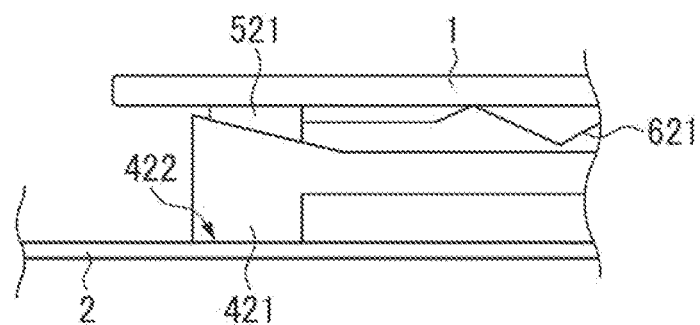

FIG. 37B is an enlarged cross-sectional view of a peripheral portion of one wedge in a configuration in FIG. 37A.

Figure 37C:
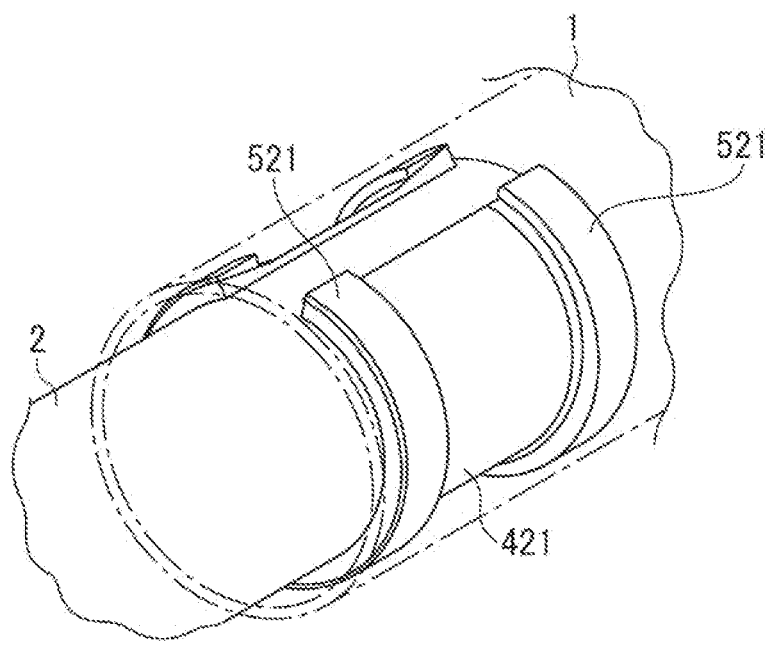

FIG. 37C is a partial perspective view of a telescopic structure having the configuration in FIG. 37A.

Figure 37D:
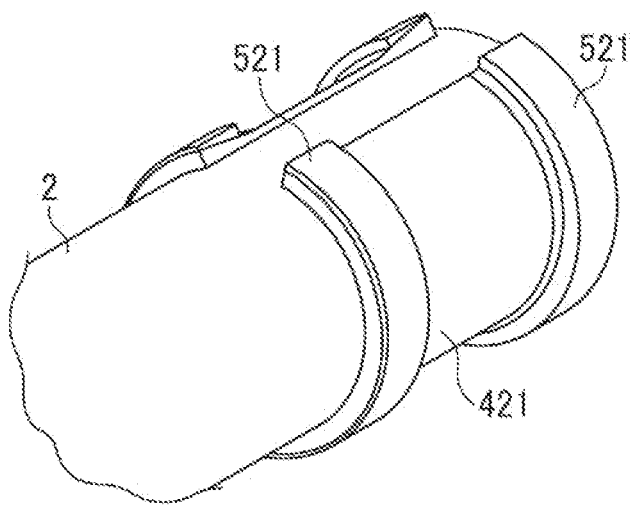

FIG. 37D is a partial perspective view of the telescopic structure in FIG. 37C with an outer tube removed.

Figure 38:
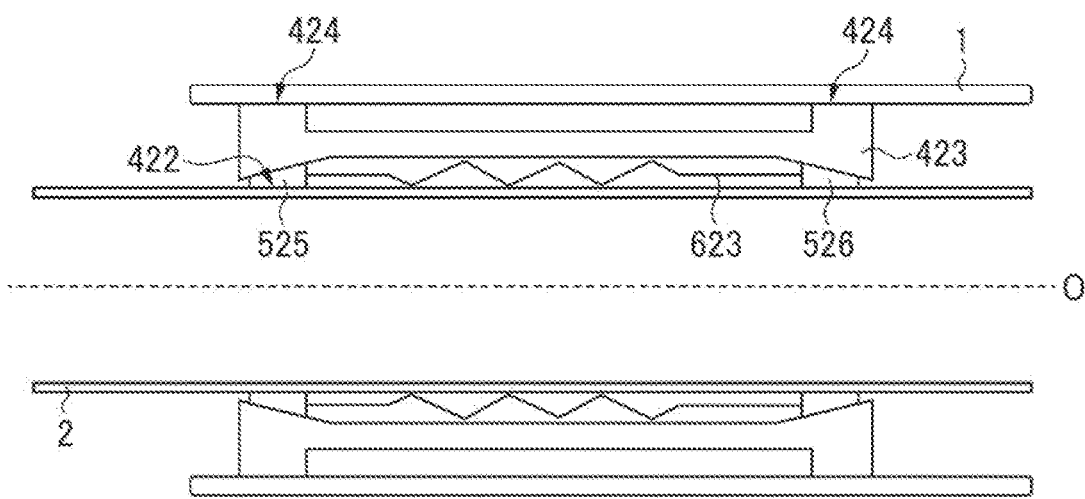

FIG. 38 is an axial cross-sectional view of a sliding interface using axial wedges according to a ninth embodiment of the present invention.

Figure 39A:
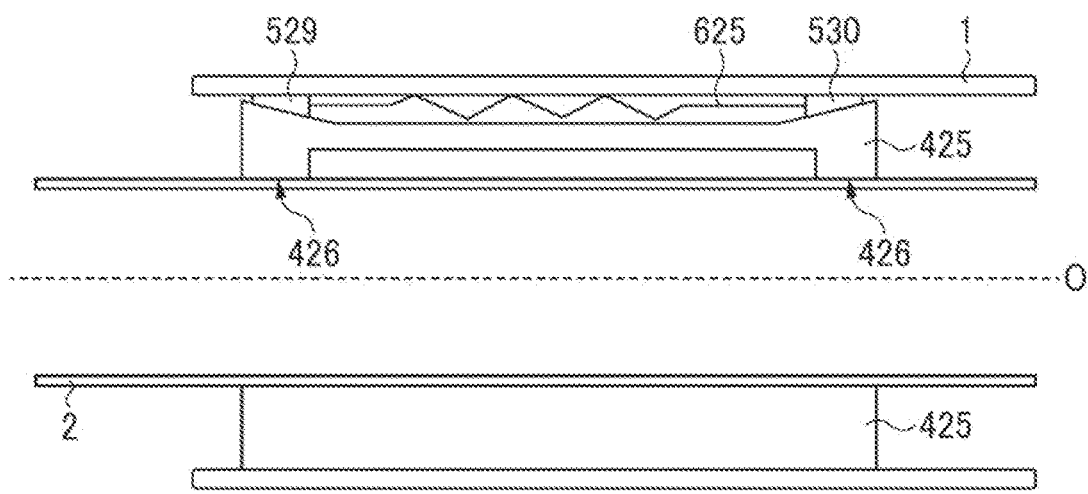

FIG. 39A is an axial cross-sectional view of a sliding interface using axial wedges according to a tenth embodiment of the present invention.

Figure 39B:
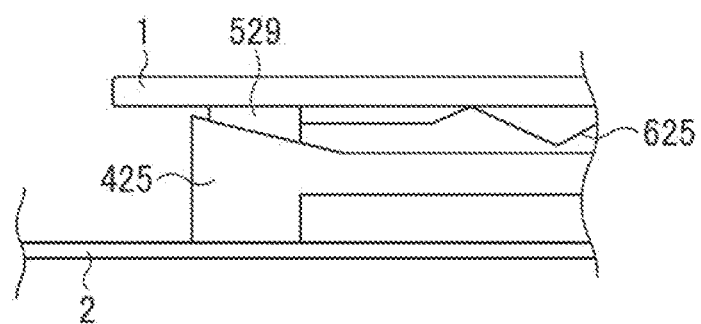

FIG. 39B is an enlarged cross-sectional view of a peripheral portion of one wedge in a configuration in FIG. 39A.

Figure 40A:
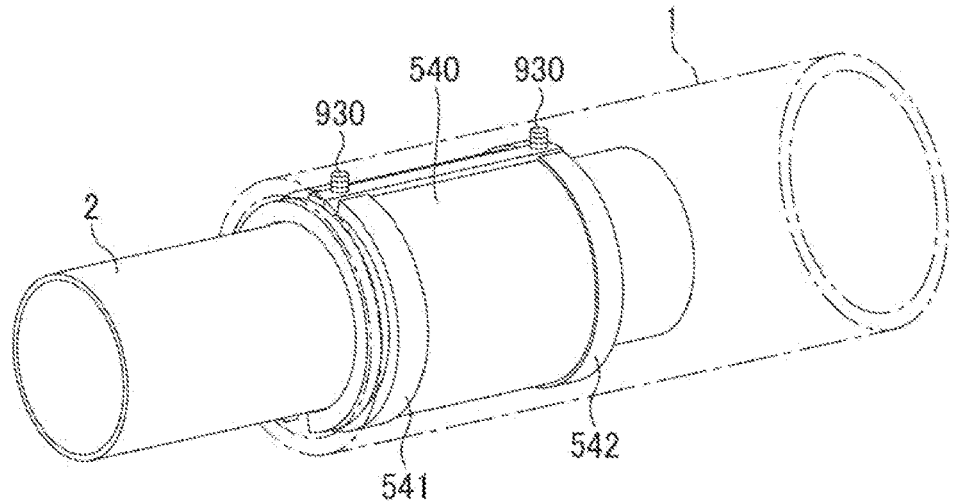

FIG. 40A is a perspective view of a telescopic structure having a sliding interface using an axial wedge according to an eleventh embodiment of the present invention.

Figure 40B:
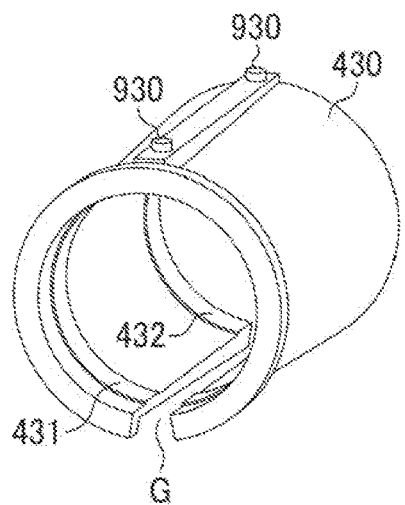

FIG. 40B is a perspective view of a sleeve constituting the sliding interface in the telescopic structure in FIG. 40A.

Figure 40C:
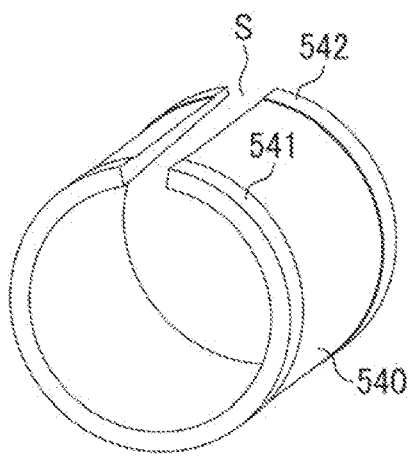

FIG. 40C is a perspective view of the wedge constituting the sliding interface in the telescopic structure in FIG. 40A.

Figure 40D:
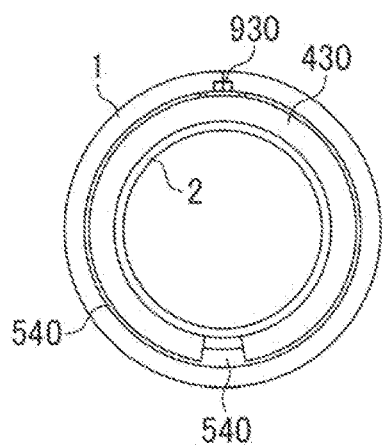

FIG. 40D is an end view of the telescopic structure in FIG. 40A as viewed in the axial direction.

Figure 40E:
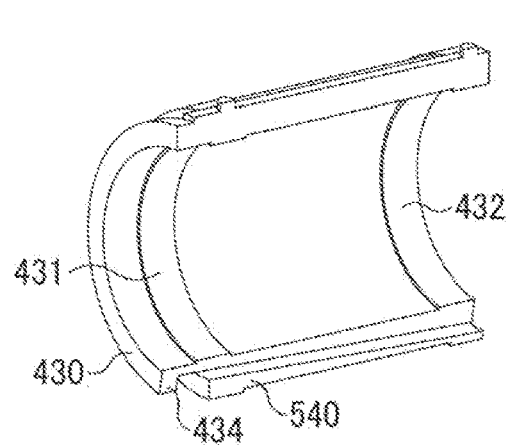

FIG. 40E is a perspective view obtained by virtually cutting an assembly of the sleeve and the wedge in the telescopic structure in FIG. 40A along a vertical plane passing through a central axis.

Figure 40F:
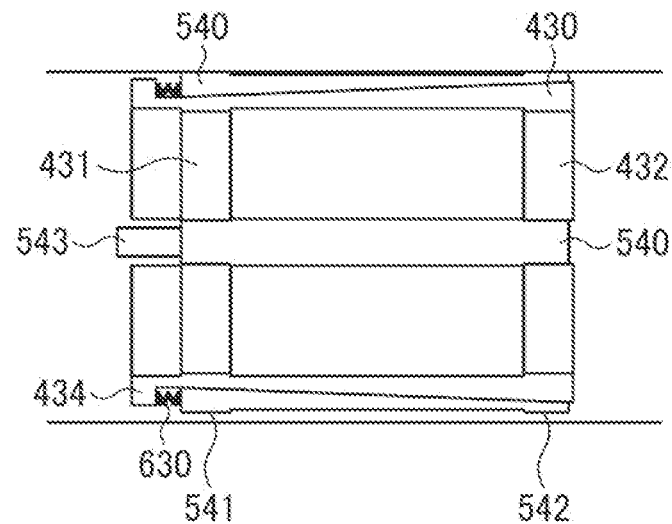

FIG. 40F is a top view of a lower half of a portion where the sliding interface of the telescopic structure in FIG. 40A exists, obtained by virtually removing an upper half from a horizontal plane passing through the central axis.

Figure 40G:
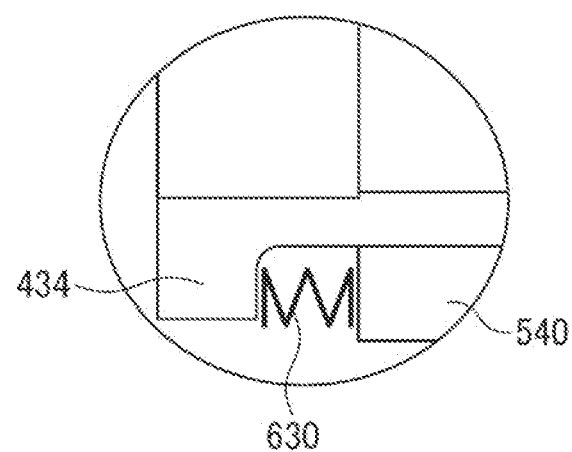

FIG. 40G is an enlarged view of a peripheral portion of one wedge in FIG. 40F.

Figure 41A:
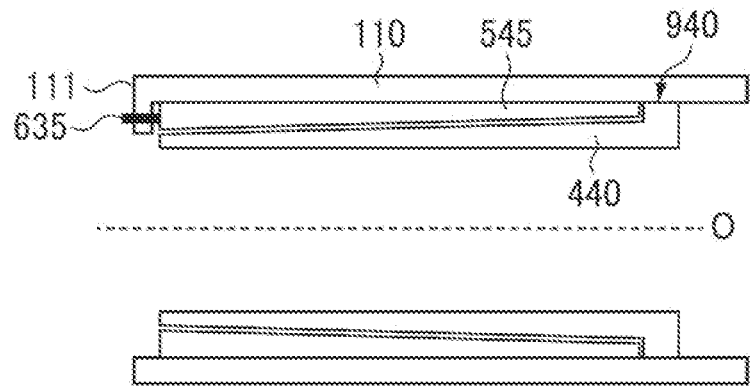

FIG. 41A is an axial cross-sectional view schematically showing only necessary portions of a telescopic structure having a modification of a sliding interface using an axial wedge.

Figure 41B:
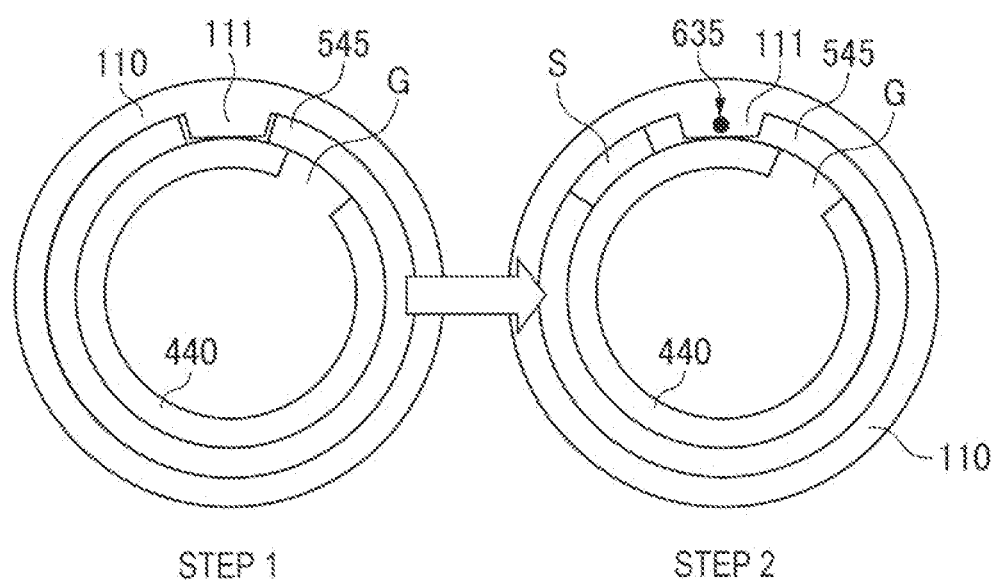

FIG. 41B is an end view schematically showing only necessary portions as viewed in the axial direction for description of assembly steps of the telescopic structure in FIG. 41A.

Figure 42:
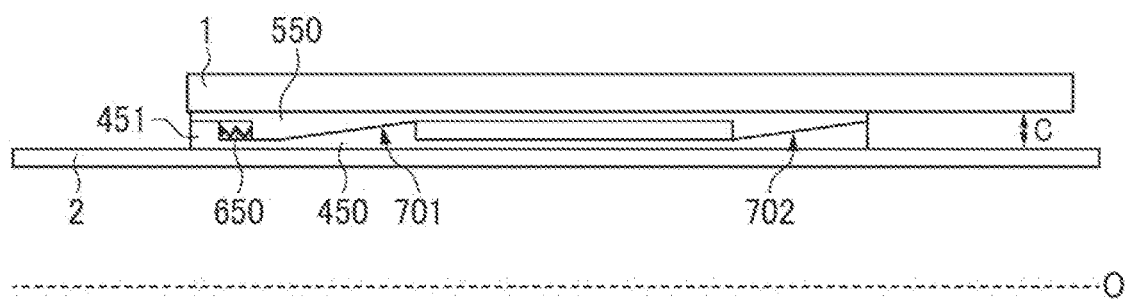

FIG. 42 is an axial cross-sectional view schematically showing only necessary portions of a telescopic structure having another modification of a sliding interface using an axial wedge.

Figure 43:
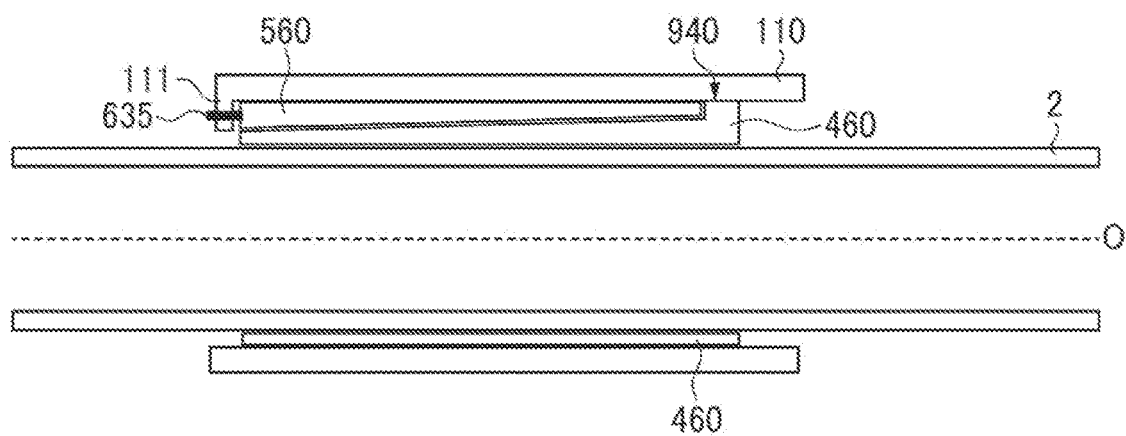

FIG. 43 is an axial cross-sectional view schematically showing only necessary portions of a telescopic structure having still another modification of a sliding interface using an axial wedge.

Figure 44A:
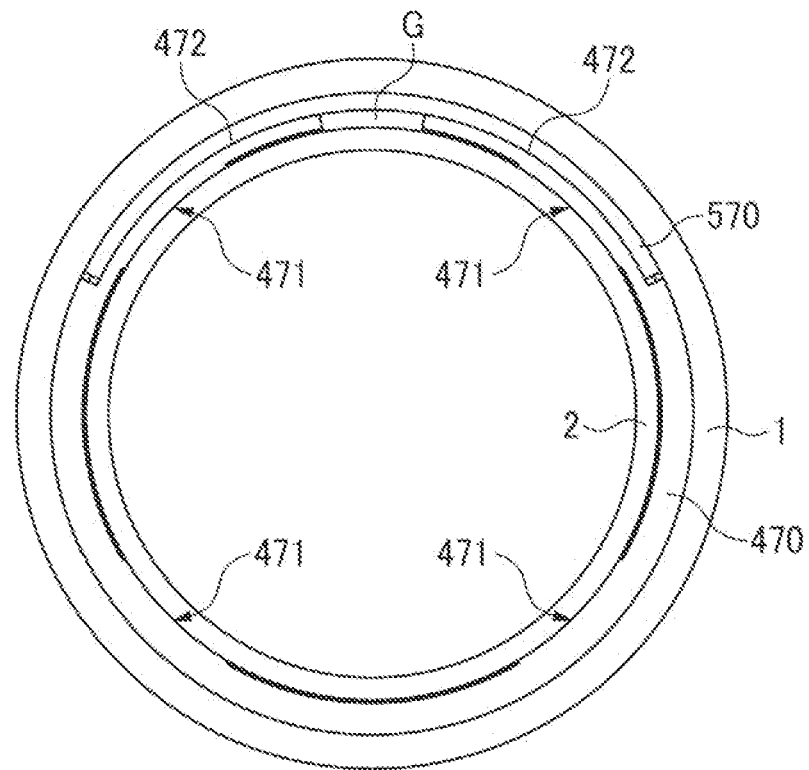

FIG. 44A is an end view of a telescopic structure including a sliding interface having an axial wedge as viewed in the axial direction according to a twelfth embodiment of the present invention.

Figure 44B:
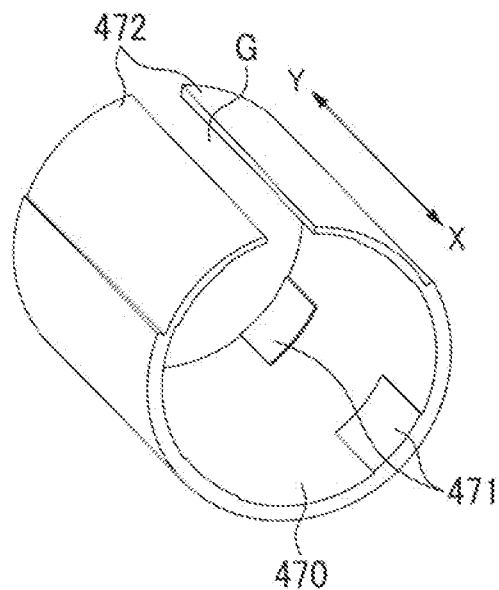

FIG. 44B is a perspective view of a sleeve constituting the sliding interface in FIG. 44A.

Figure 44C:
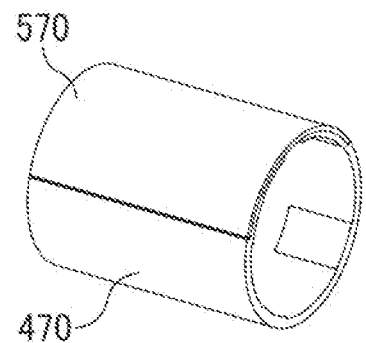

FIG. 44C is a perspective view showing an assembly of the sleeve and the wedge in FIG. 44B.

Figure 44D:
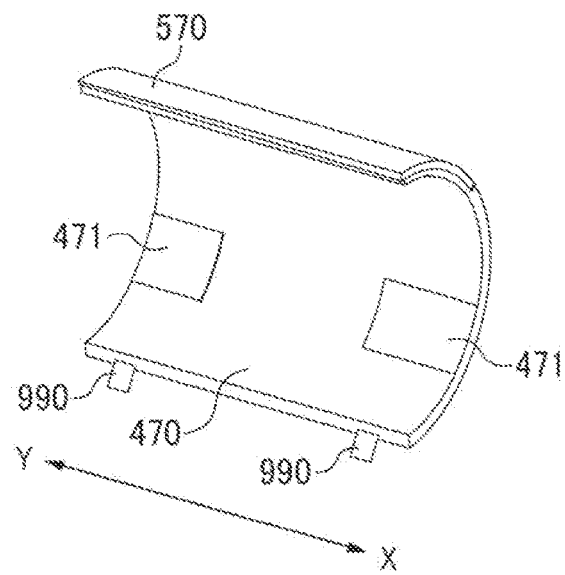

FIG. 44D is a perspective view obtained by virtually cutting the assembly in FIG. 44C along a vertical plane parallel to a central axis.

Figure 44E:
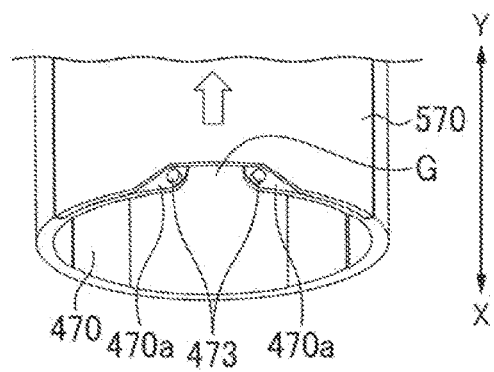

FIG. 44E is a partial perspective view of a configuration example near one end portion of the assembly in FIG. 44C as viewed obliquely from above.

Figure 44F:
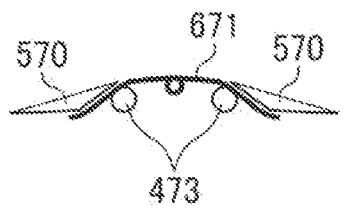

FIG. 44F is a schematic view showing a spring setting example at one end portion of the assembly shown in FIG. 44E.

Figure 44G:
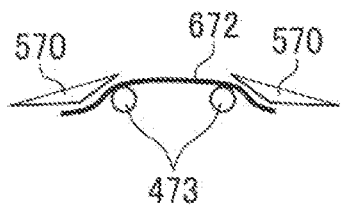

FIG. 44G is a schematic view showing another spring setting example at one end portion of the assembly shown in FIG. 44E.

Figure 44H:
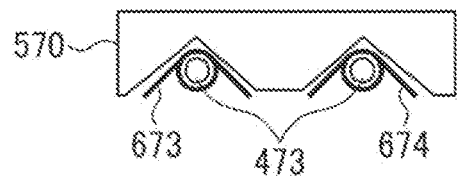

FIG. 44H is a schematic view showing a spring setting example in another configuration example near one end portion of the assembly in FIG. 44C.

Figure 44I:
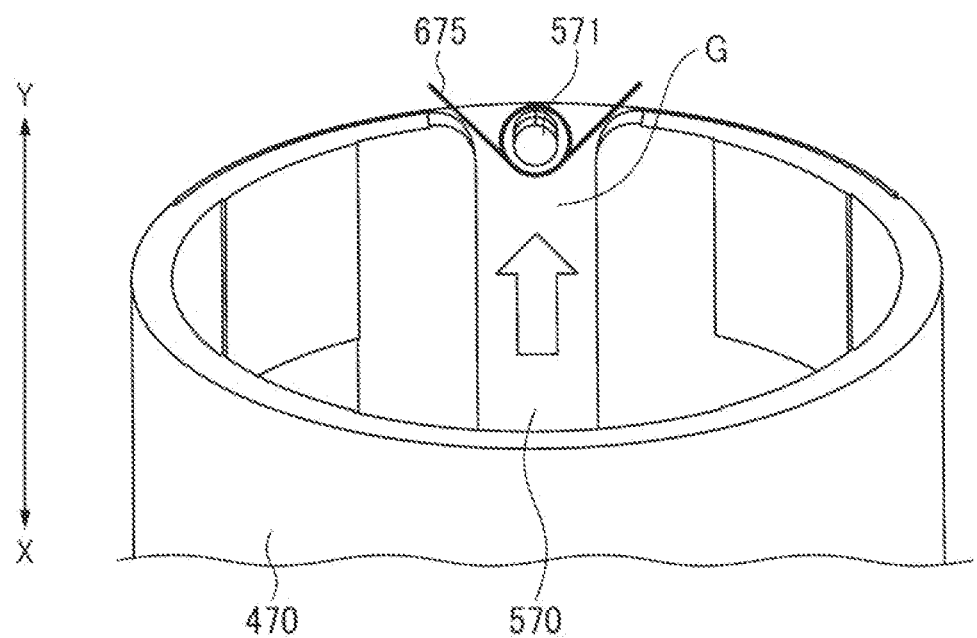

FIG. 44I is a schematic view showing a spring setting example in a configuration example near the other end portion of the assembly in FIG. 44C.

Figure 45A:
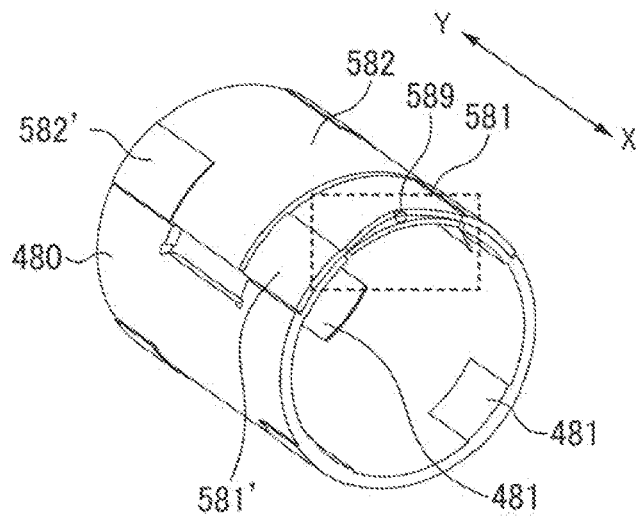

FIG. 45A is a perspective view of an assembly of a sleeve and wedges constituting a sliding interface having the axial wedges according to a thirteenth embodiment of the present invention.

Figure 45B:
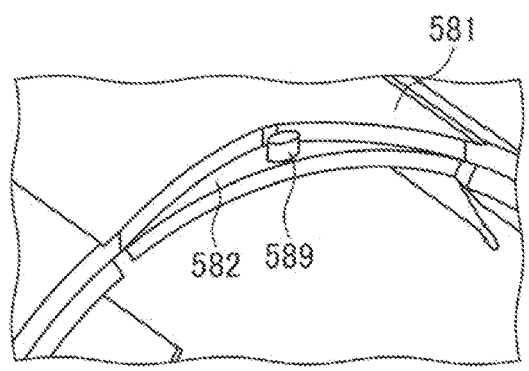

FIG. 45B is an enlarged view of vicinity of one end portion in the assembly in FIG. 45A.

Figure 45C:
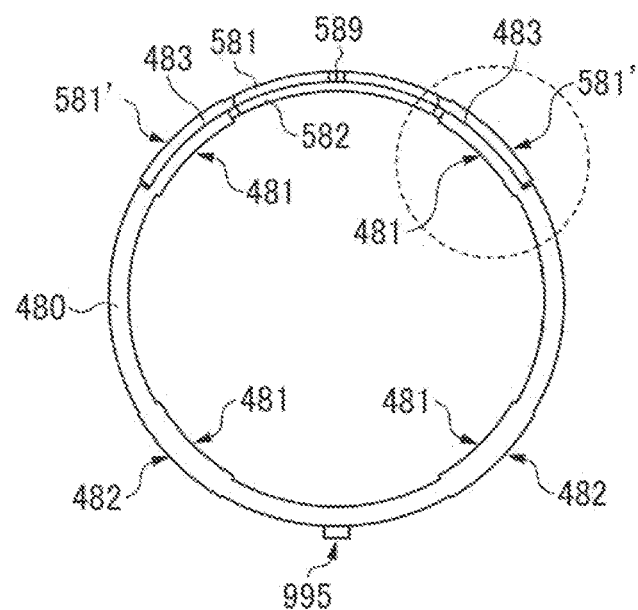

FIG. 45C is an end view of the assembly in FIG. 45A as viewed in the axial direction.

Figure 45D:
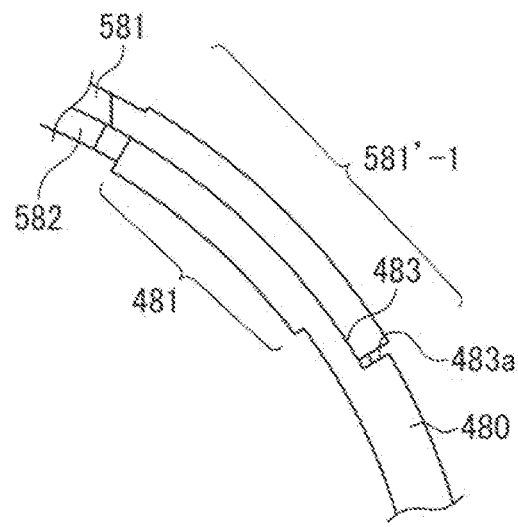

FIG. 45D is a partial end view showing a configuration within a broken line in the assembly in FIG. 45C in an enlarged manner.

Figure 45E:
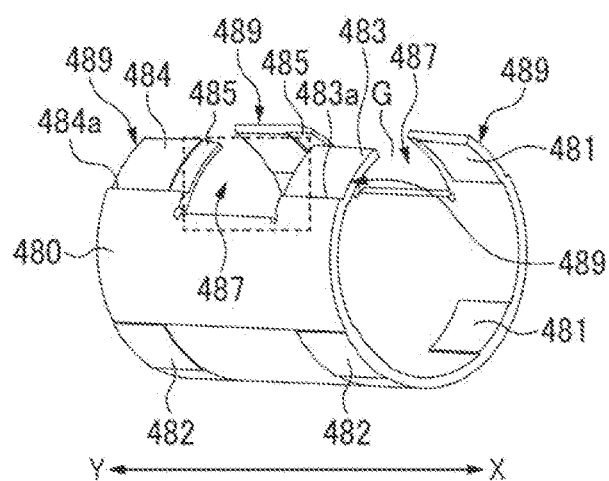

FIG. 45E is a perspective view of the sleeve in the assembly in FIG. 45A.

Figure 45F:
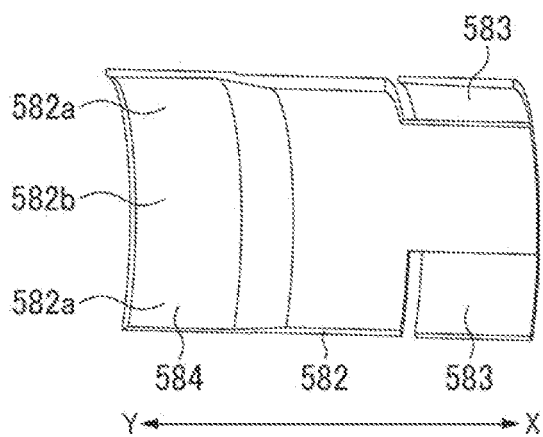

FIG. 45F is a perspective view showing a relative arrangement of the two wedges in the assembly in FIG. 45A.

Figure 45G:
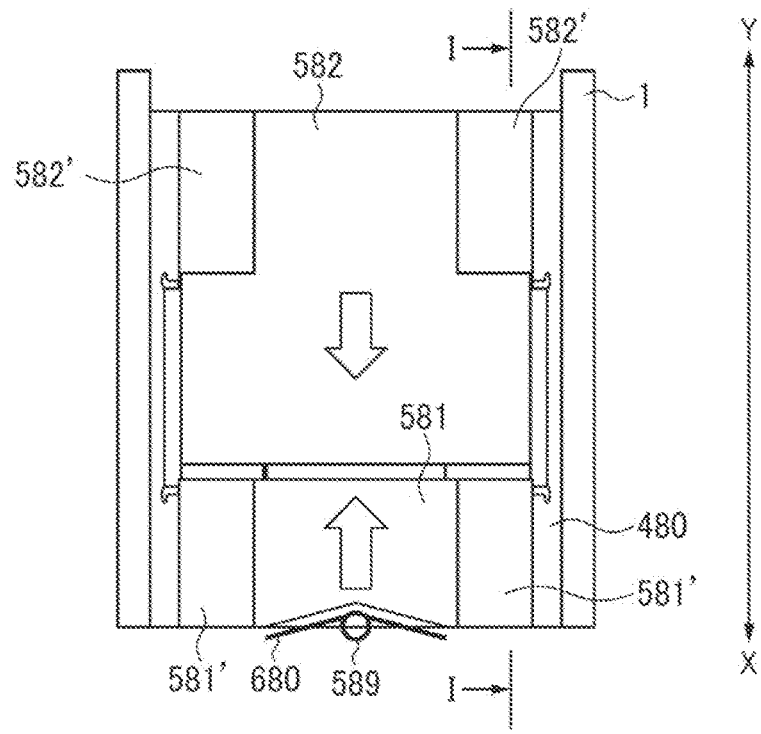

FIG. 45G is a top view of the assembly in FIG. 45A obtained by virtually removing an upper half of an outer tube as viewed from above.

Figure 45H:
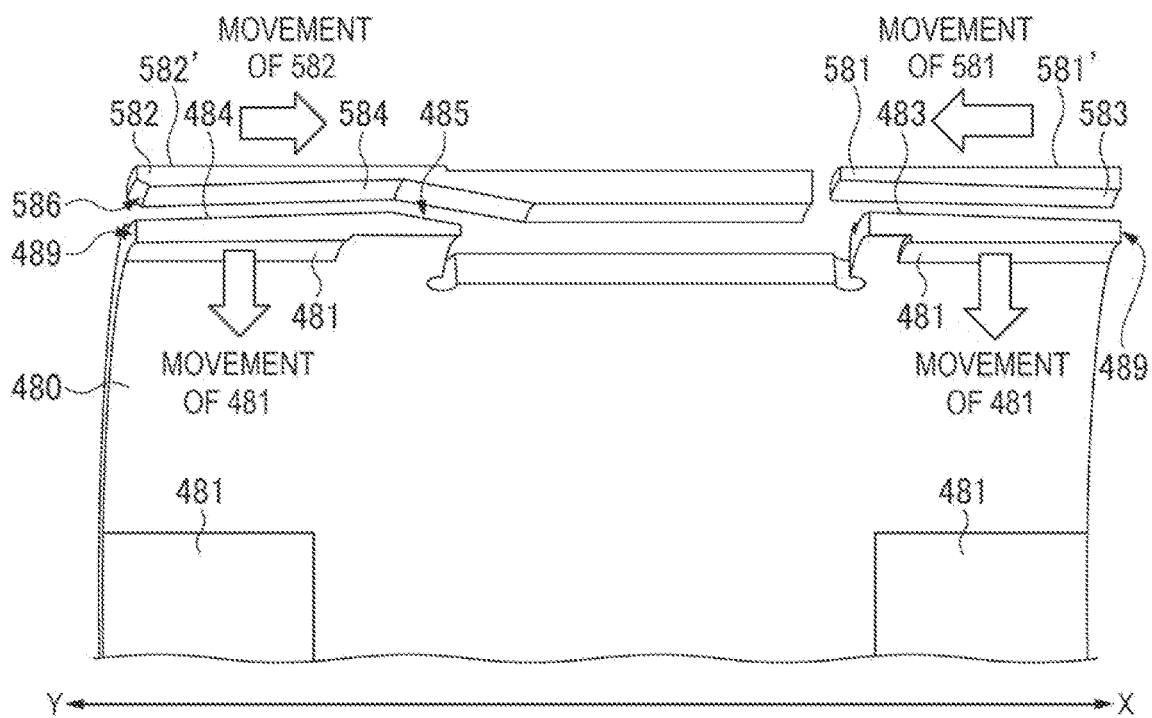

FIG. 45H is a partial exploded perspective view showing a cross section of the two wedges and the sleeve obtained by virtually cutting the assembly in FIG. 45A along a vertical plane at a position of a line I-I in FIG. 45G.

Figure 46A:
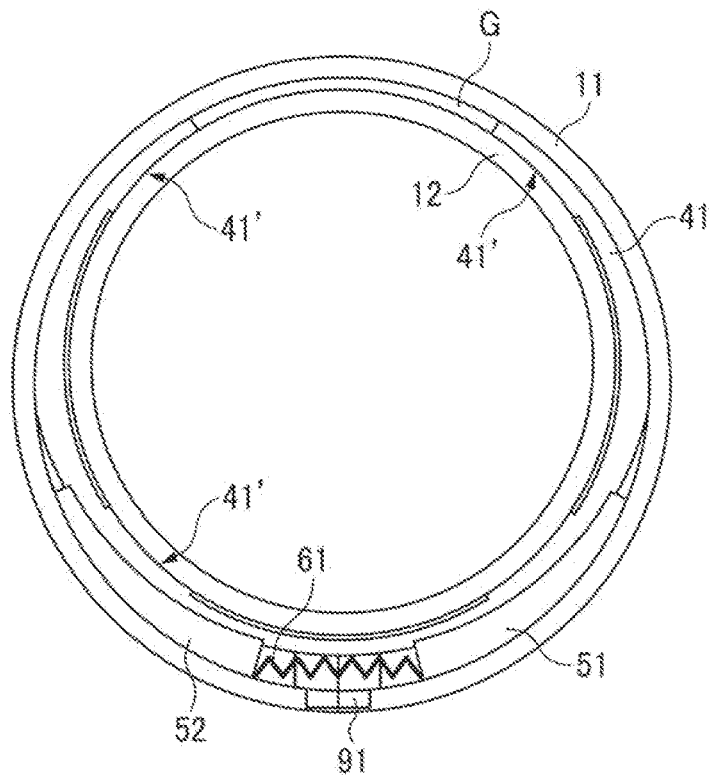

FIG. 46A is an end view of one of two sliding interfaces using circumferential wedges as viewed in the axial direction in a telescopic structure having three tubes according to a fourteenth embodiment of the present invention.

Figure 46B:
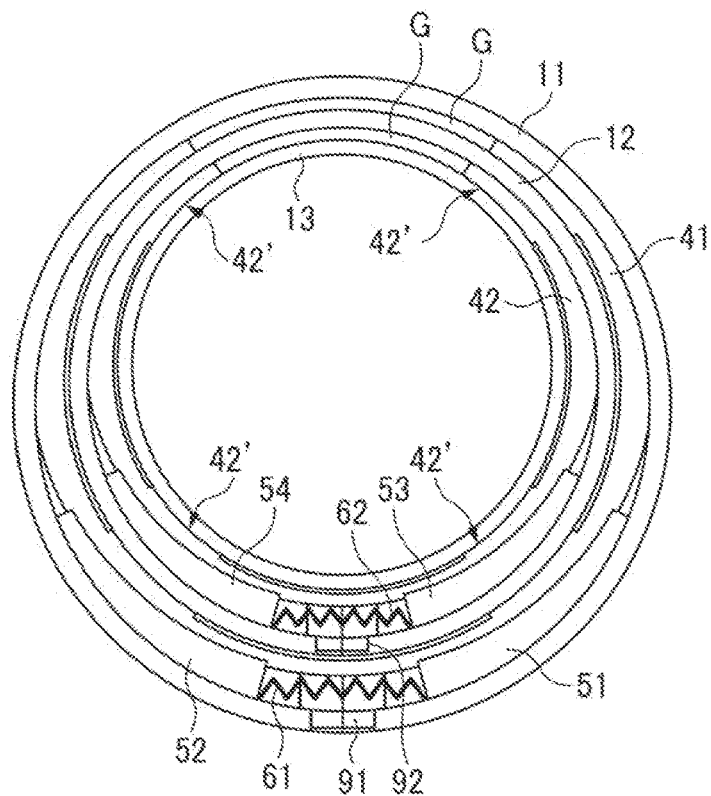

FIG. 46B is an end view of the telescopic structure according to the fourteenth embodiment as viewed from one end side in the axial direction.

Figure 47A:
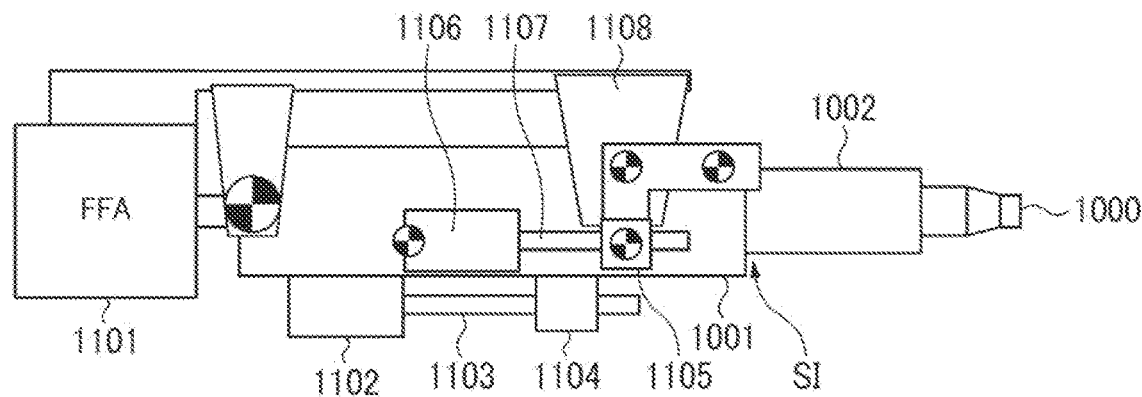

FIG. 47A is a view showing a state in which the telescopic structure is extended in a steering column using the telescopic structure according to the present invention.

Figure 47B:
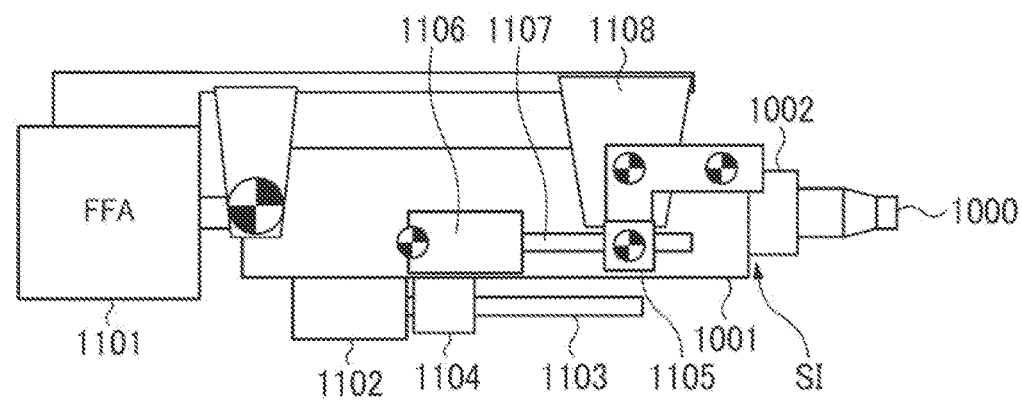

FIG. 47B is a view showing a state in which the telescopic structure is shortened in the steering column using the telescopic structure according to the present invention.

Figure 47C:
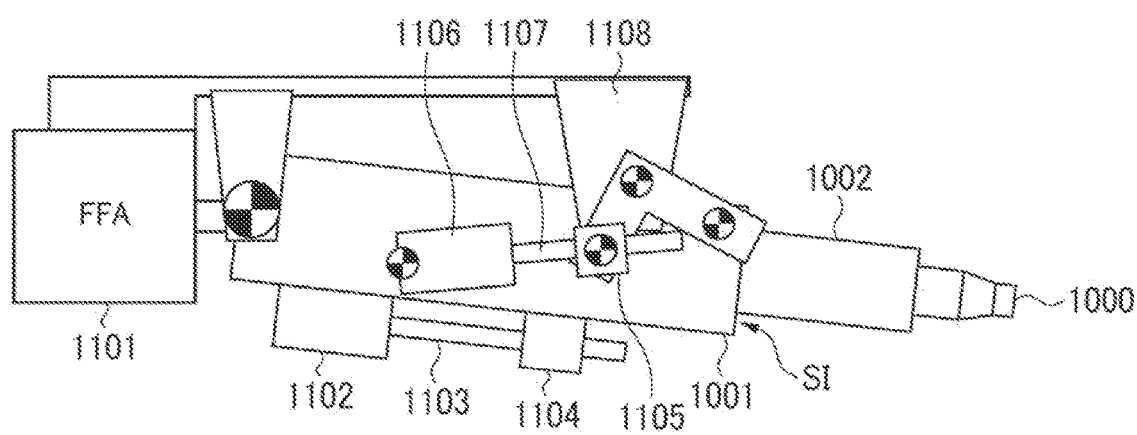

FIG. 47C is a view showing a tilt-down state of the steering column using the telescopic structure according to the present invention.

Figure 48A:
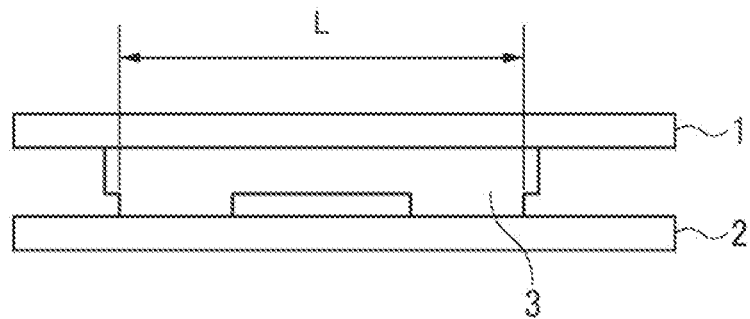

FIG. 48A is a view showing an engagement length of a sliding interface (in a fully engaged state).

Figure 48B:
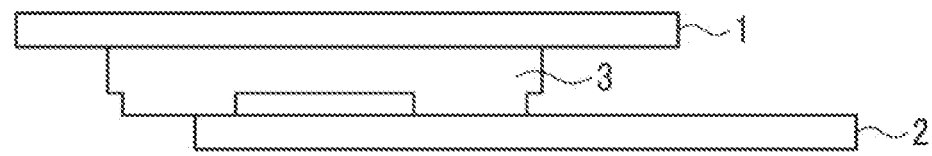

FIG. 48B is a view showing the sliding interface in a non-fully engaged state.

Figure 49A:
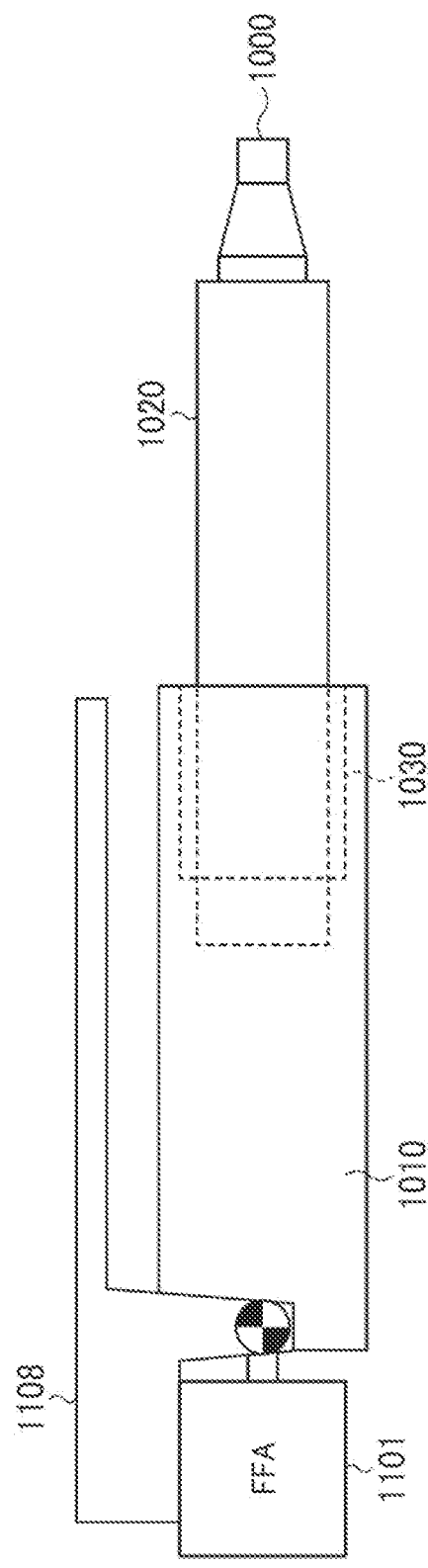

FIG. 49A is a view schematically showing a state in which a telescopic structure having two tubes and one sliding interface is fully extended as a first usage example of the telescopic structure according to the present invention in a steering column.

Figure 49B:
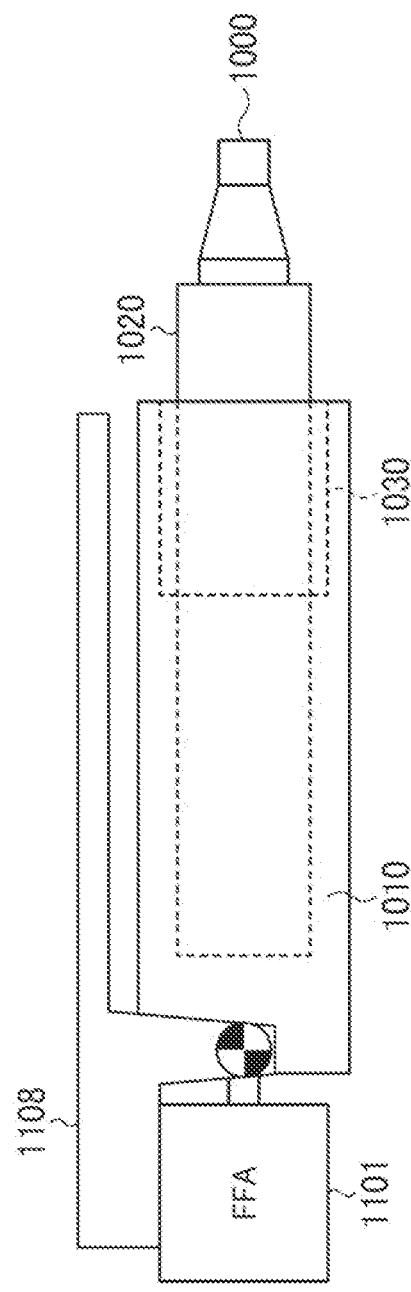

FIG. 49B is a view schematically showing a state in which the telescopic structure having two tubes and one sliding interface is fully shortened as the first usage example of the telescopic structure according to the present invention in the steering column.

Figure 50A:
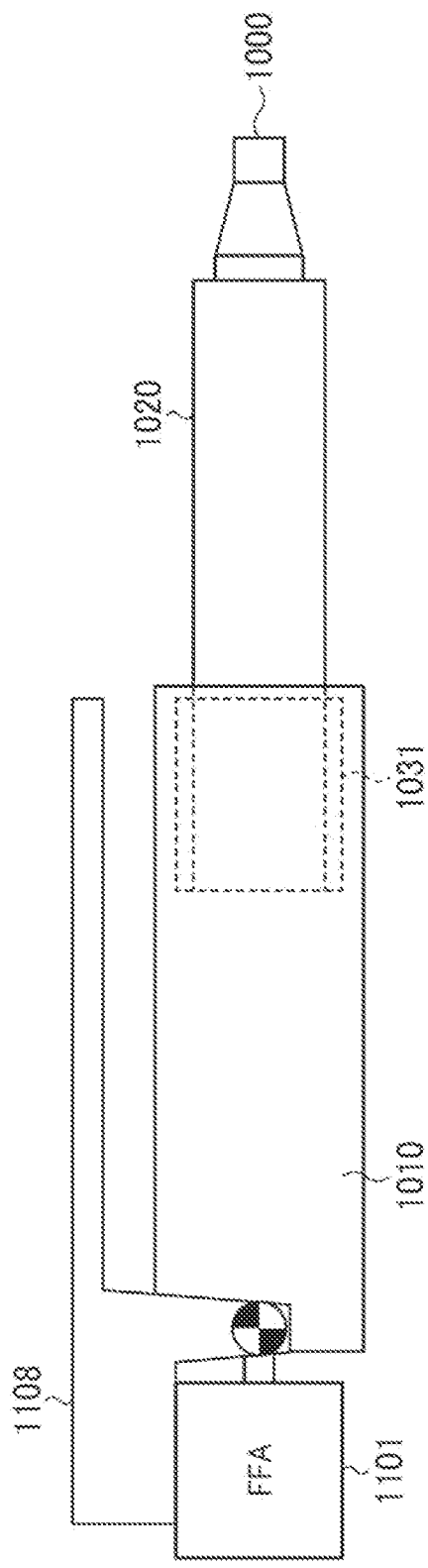

FIG. 50A is a view schematically showing a state in which a telescopic structure having two tubes and one sliding interface is fully extended as a second usage example of the telescopic structure according to the present invention in the steering column.

Figure 50B:
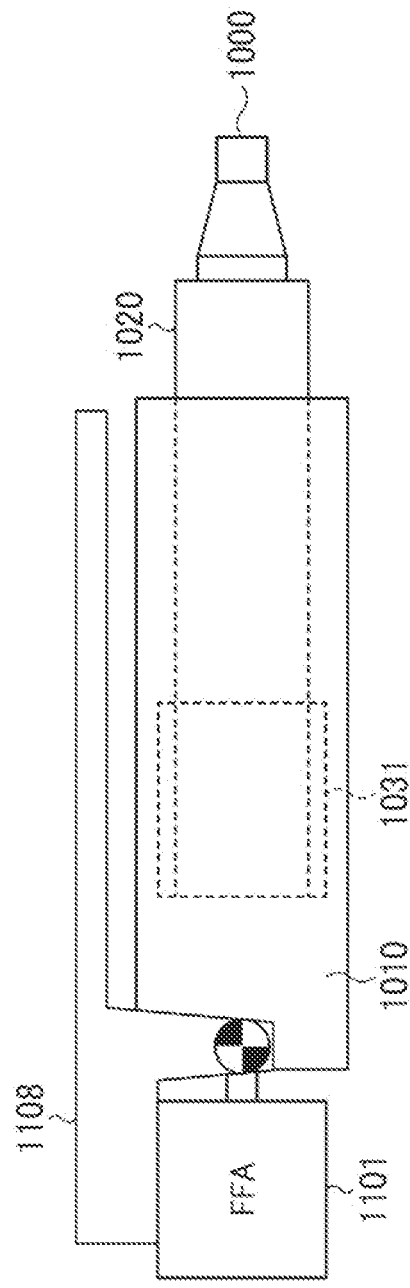

FIG. 50B is a view schematically showing a state in which the telescopic structure having two tubes and one sliding interface is fully shortened as the second usage example of the telescopic structure according to the present invention in the steering column.

Figure 51A:
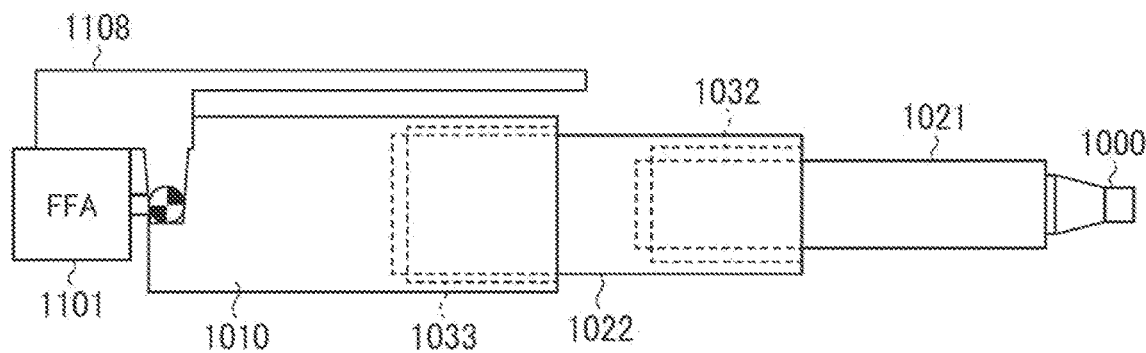

FIG. 51A is a view schematically showing a state in which a telescopic structure having three tubes and two sliding interfaces is fully extended as a third usage example of the telescopic structure according to the present invention in the steering column.

Figure 51B:
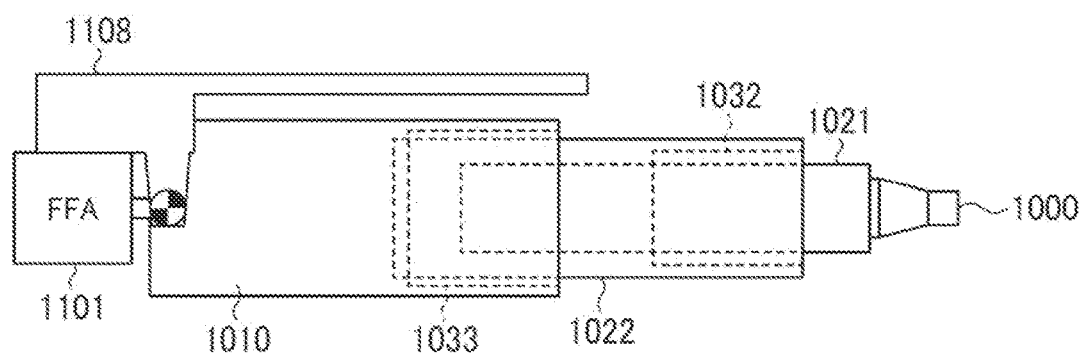

FIG. 51B is a view schematically showing a state in which the telescopic structure having three tubes and two sliding interfaces is partially extended as the third usage example of the telescopic structure according to the present invention in the steering column.

Figure 51C:
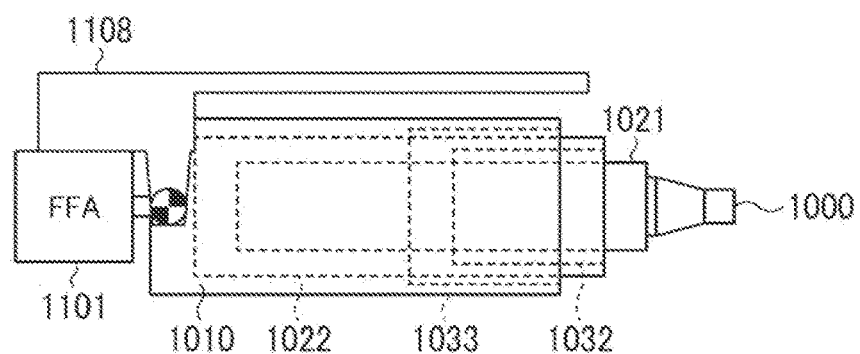

FIG. 51C is a view schematically showing a state in which the telescopic structure having three tubes and two sliding interfaces is fully shortened as the third usage example of the telescopic structure according to the present invention in the steering column.

Figure 52A:
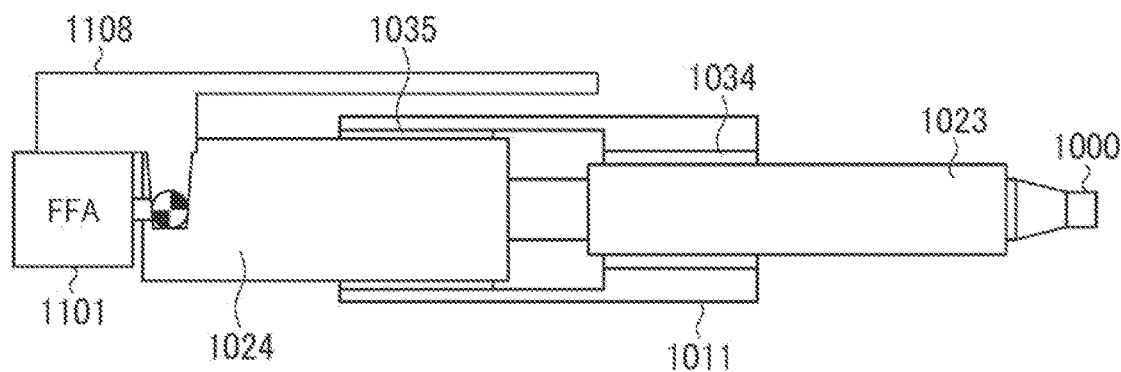

FIG. 52A is a view schematically showing a state in which a telescopic structure having three tubes and two sliding interfaces is fully extended as a fourth usage example of the telescopic structure according to the present invention in the steering column.

Figure 52B:
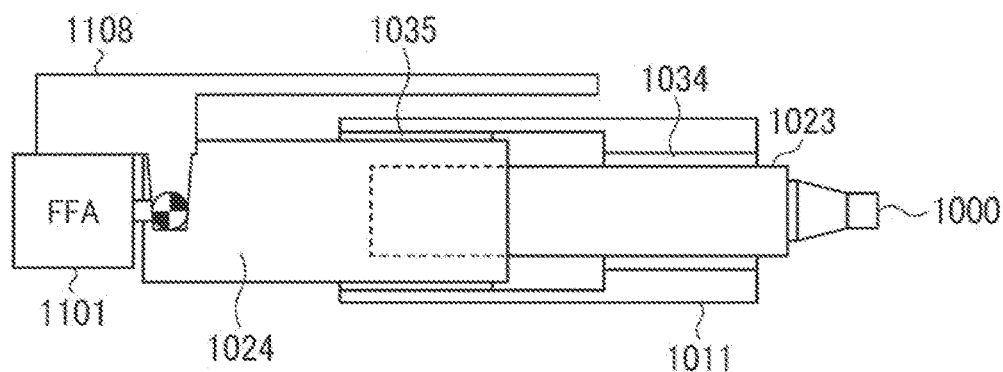

FIG. 52B is a view schematically showing a state in which the telescopic structure having three tubes and two sliding interfaces is partially extended as the fourth usage example of the telescopic structure according to the present invention in the steering column.

Figure 52C:
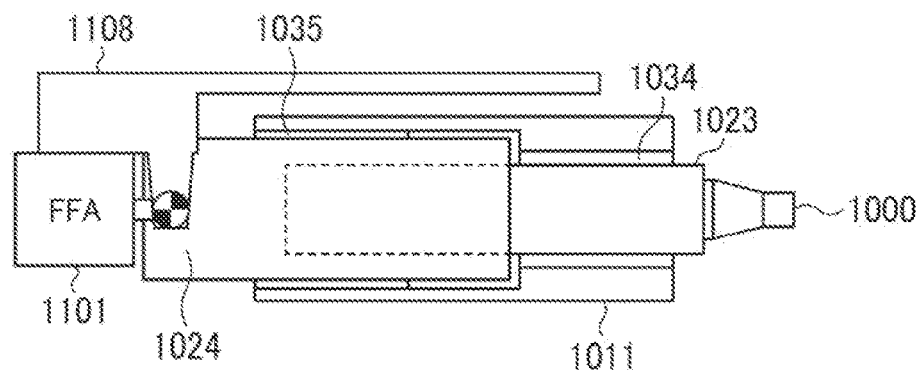

FIG. 52C is a view schematically showing a state in which the telescopic structure having three tubes and two sliding interfaces is fully shortened as the fourth usage example of the telescopic structure according to the present invention in the steering column.

Figure 53:
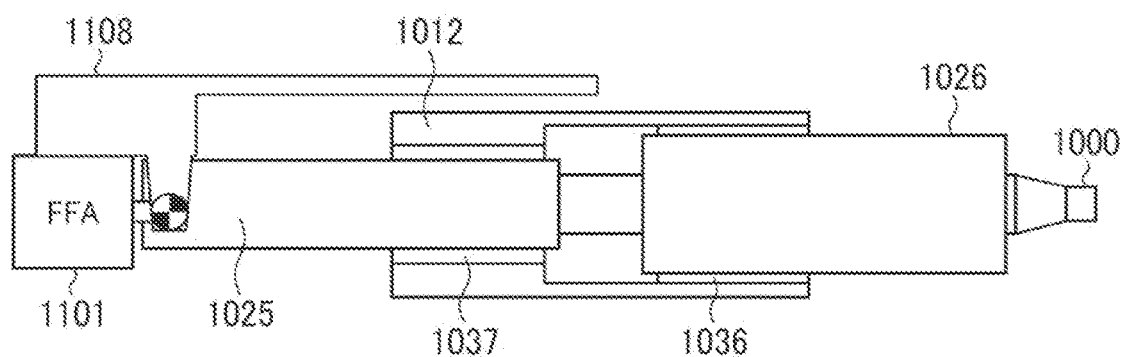

FIG. 53 is a view schematically showing a state in which a telescopic structure having three tubes and two sliding interfaces is fully extended as a fifth usage example of the telescopic structure according to the present invention in the steering column.

Figure 54:
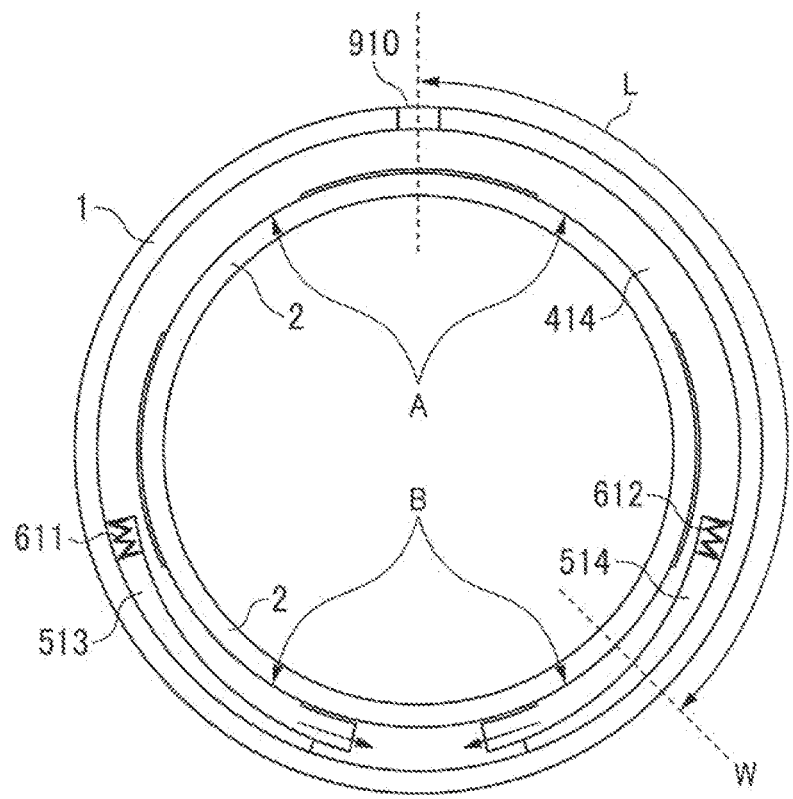

FIG. 54 is an end view as viewed from the axial direction showing a distance between a fixing position of a sleeve and a wedge position in the sliding interface having the circumferential wedges, which is considered in a second temperature compensation method.

Figure 55:
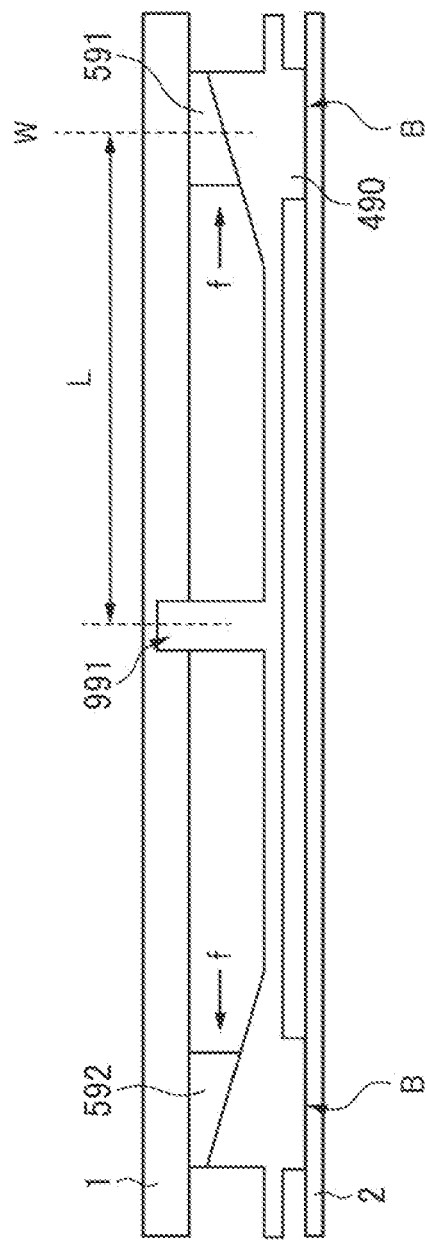

FIG. 55 is a partial cross-sectional view showing a distance between a fixing position of a sleeve and a wedge position in the sliding interface having axial wedges, which is considered in the second temperature compensation method.

Figure 56:
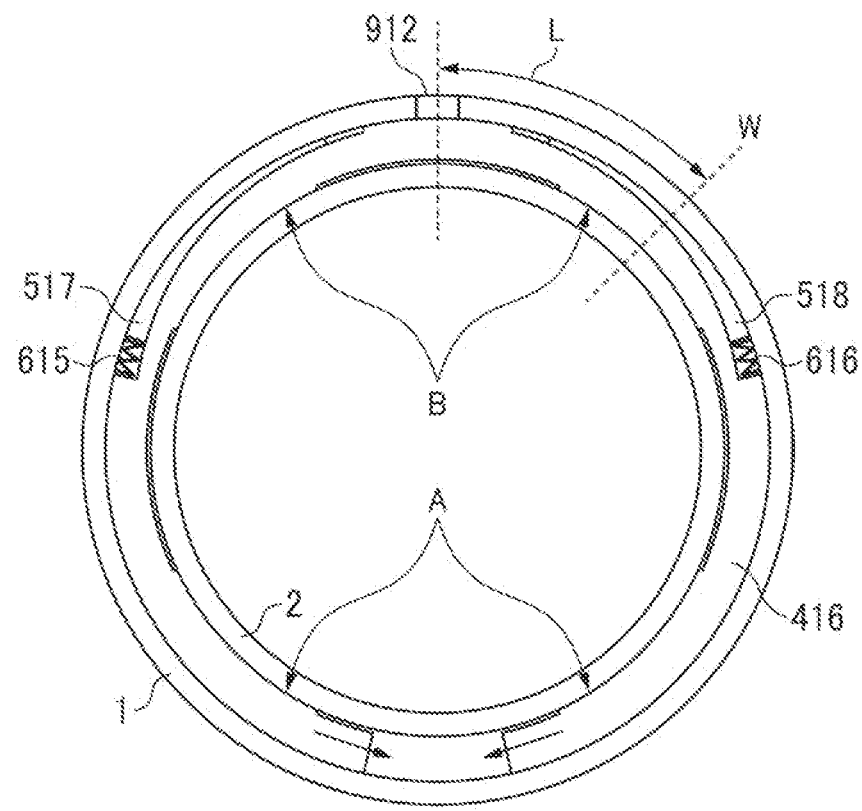

FIG. 56 is an end view as viewed from the axial direction showing a distance between a fixing position of a sleeve and a wedge position in the sliding interface having the circumferential wedges, which is considered in a third temperature compensation method.

Figure 57:
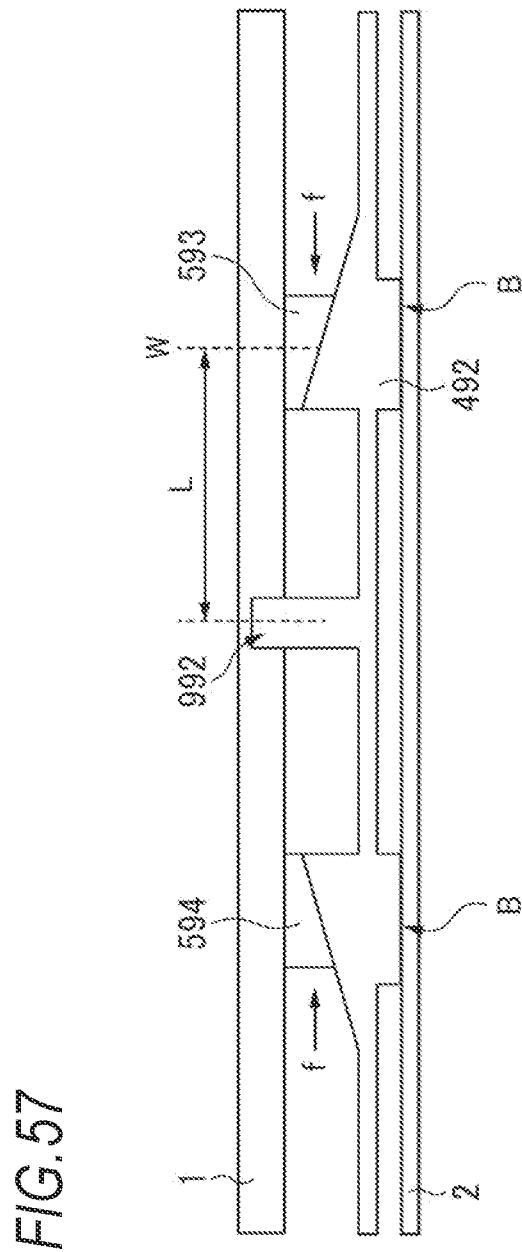

FIG. 57 is a partial cross-sectional view showing a distance between a fixing position of a sleeve and a wedge position in a sliding interface having axial wedges, which is considered in the third temperature compensation method.

Figure 58:
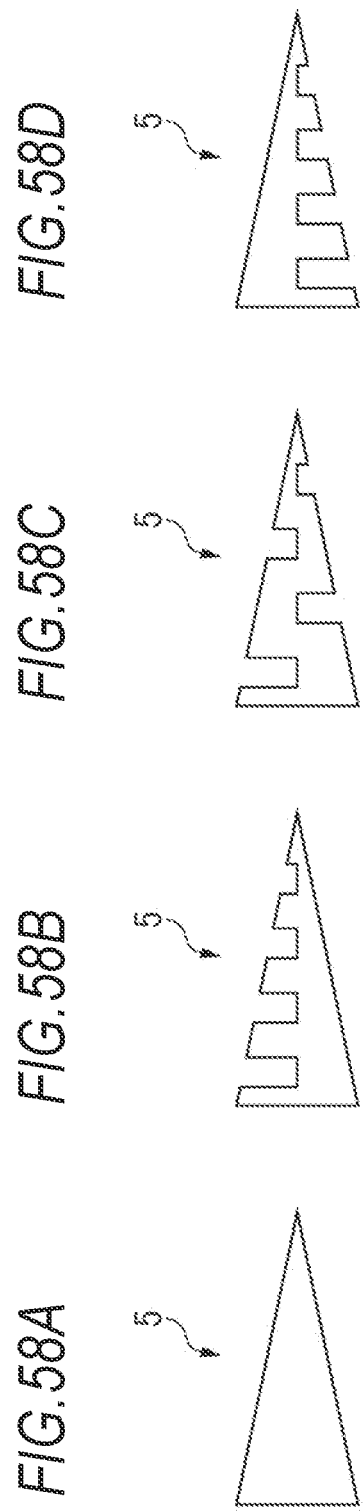

FIG. 58A is a view showing the wedge without material removal, and FIGS. 58B to 58D are views showing examples of the wedge with material removed.

Figure 59:
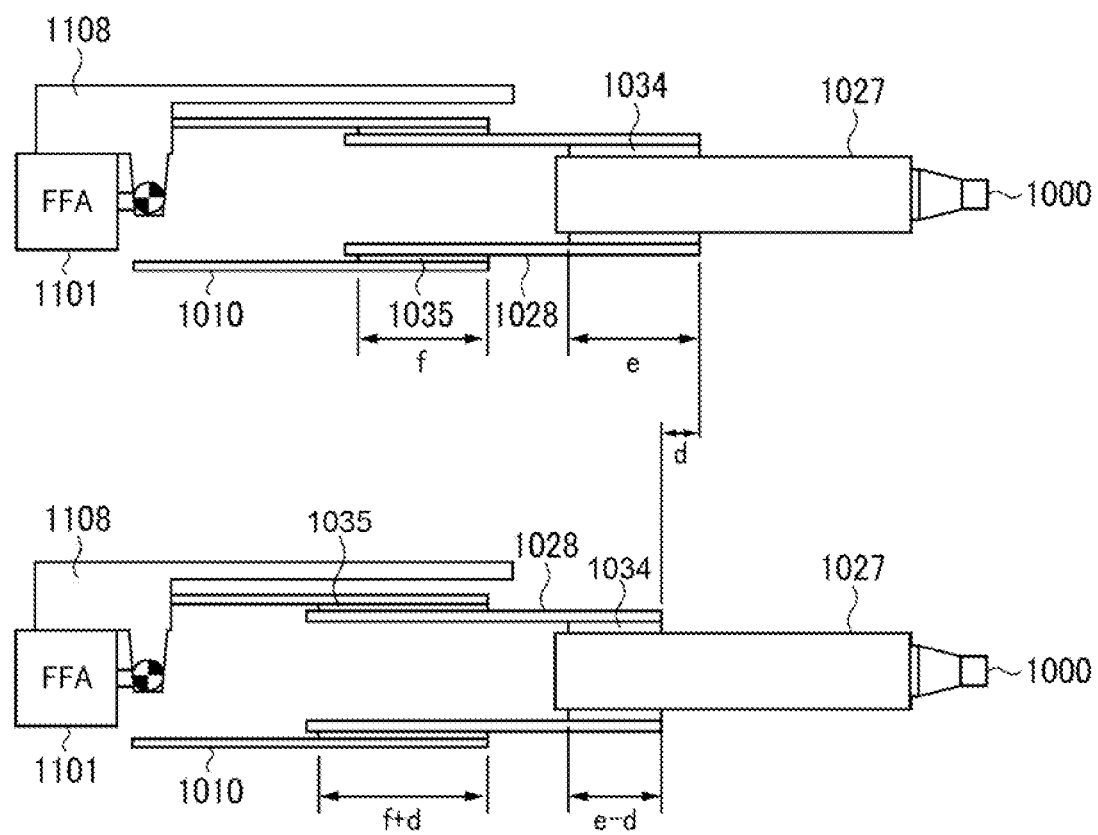

FIG. 59 is a view showing a change in lengths of the two sliding interfaces in the telescopic structure having the two sliding interfaces.

Figure 60:
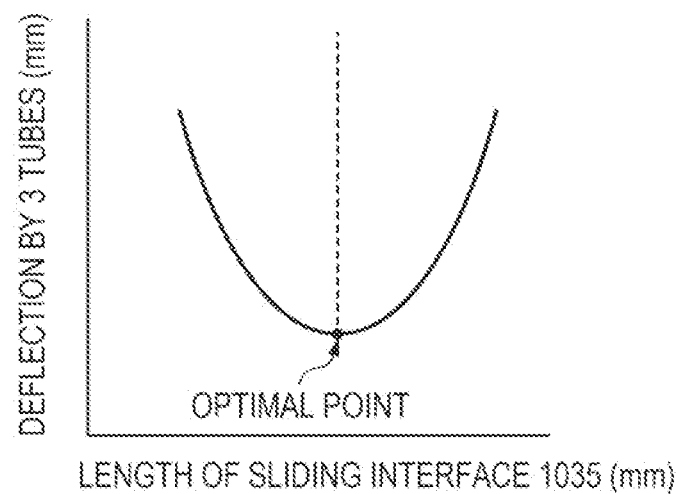

FIG. 60 is a conceptual view showing an optimum length of the sliding interface in the telescopic structure having the two sliding interfaces.

Figure 61:
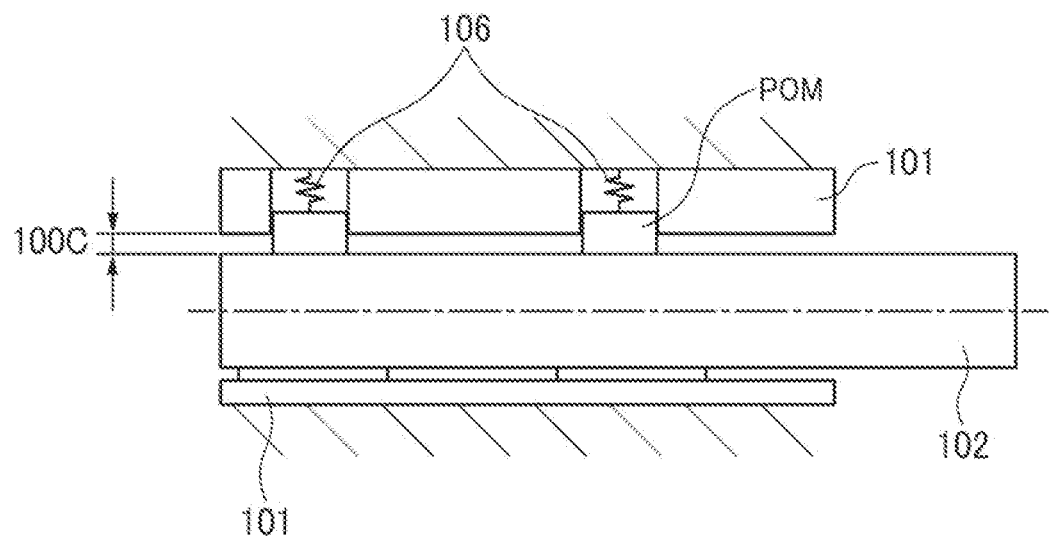

FIG. 61 is a view schematically showing a related-art technology for preventing backlash in a telescopic structure.

FIG. 62 is a view showing definitions of an axial direction, a radial direction and a circumferential direction used in the present specification.

DESCRIPTION OF EMBODIMENTS

<Definitions of Axial Direction, Radical Direction and Circumferential Direction>

FIG. 62 shows meanings of an "axial direction", a "radial direction" and a "circumferential direction" used in the present specification.

<Basic Principle of Present Invention>

Figure 1A:
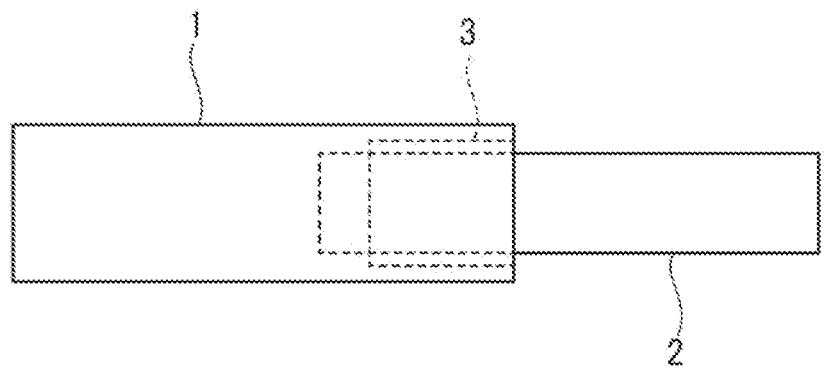
FIGS. 1A and 1B are schematic views showing extended and shortened states of one type of telescopic structure according to the present invention.
Figure 1B:
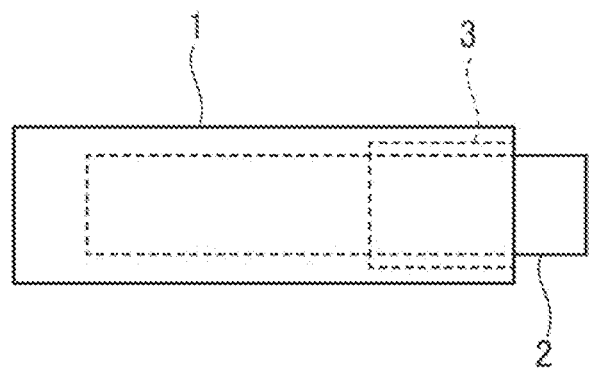
Figure 2:
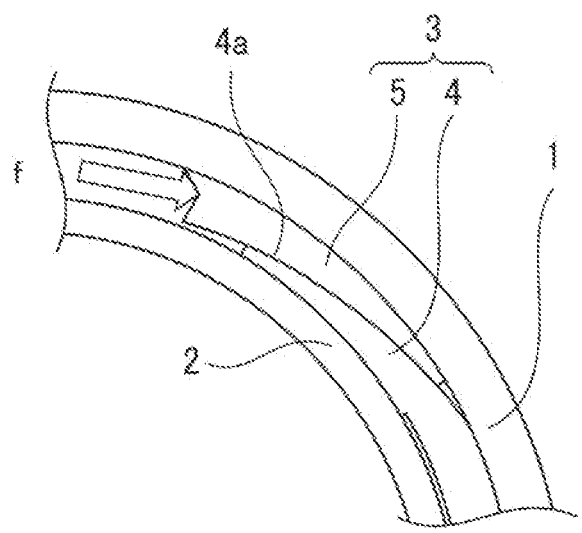
FIG. 2 is a partial cross-sectional view showing a portion where a sleeve and a wedge are engaged with each other, which is formed in a cross section perpendicular to an axial direction of an interface structure in the type of telescopic structure in which a sleeve 4 is fixed to an outer tube 1 according to the present invention.
Figure 3A:
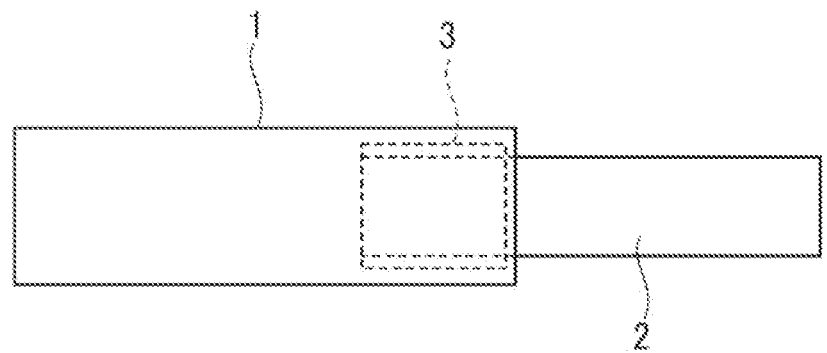
FIGS. 3A and 3B are schematic views showing extended and shortened states of another type of telescopic structure according to the present invention.
Figure 3B:
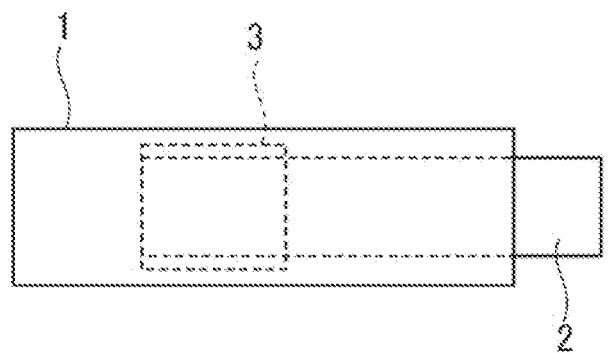
Figure 4:
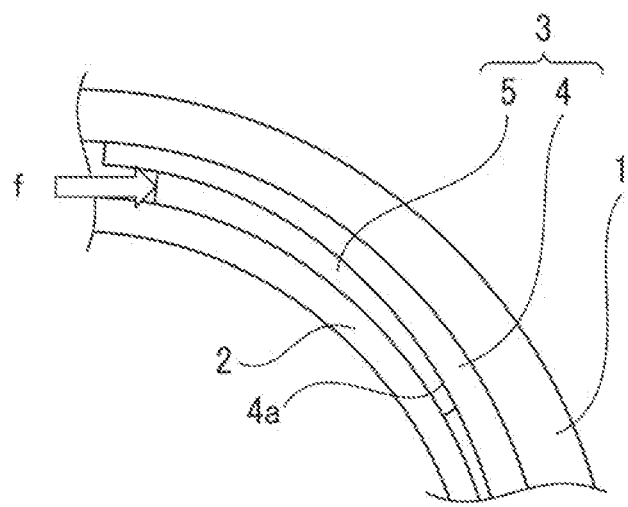
FIG. 4 is a partial cross-sectional view showing a portion where a sleeve and a wedge are engaged with each other, which is formed in a cross section perpendicular to an axial direction of an interface structure in the type of telescopic structure in which the sleeve 4 is fixed to the inner tube 2 according to the present invention.

Two types of telescopic structures according to the present invention will be described with reference to FIGS. 1A to 4. FIGS. 1A to 2 show a type in which a sleeve is fixed to an outer tube, and FIGS. 3A to 4 show a type in which a sleeve is fixed to an inner tube. FIGS. 1A and 3A show a state in which the telescopic structure is extended in the axial direction, and FIGS. 1B and 3B show a state in which the telescopic structure is shortened in the axial direction. FIGS. 2 and 4 are partial cross-sectional views showing a portion where a sleeve 4 and a wedge 5 are engaged with each other, which are formed in a cross section perpendicular to the axial direction of an interface structure 3 in the telescopic structure.

In FIGS. 1A to 4, a reference numeral 1 denotes an outer tube, a reference numeral 2 denotes an inner tube movably arranged inside the outer tube 1, a reference numeral 3 denotes an interface structure provided in a gap between the outer tube 1 and the inner tube 2, a reference numeral 4 denotes a sleeve, and a reference numeral 5 denotes a wedge. The sleeve 4 constitutes the interface structure 3 together with the wedge 5.

In the telescopic structure of FIGS. 1A and 1B, since the sleeve 4 is fixed to the outer tube 1, when the inner tube 2 moves in the axial direction with respect to the outer tube 1, the inner tube 2 slides in contact with a radially inner surface (an inner circumferential surface) of the sleeve 4.

Figure 5:
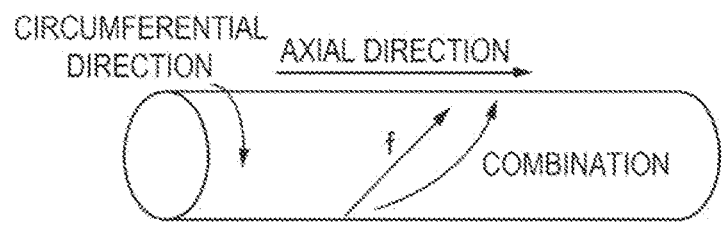
FIG. 5 is a view showing directions in which a force generated by a spring can be applied to a wedge 5.
Figure 6:
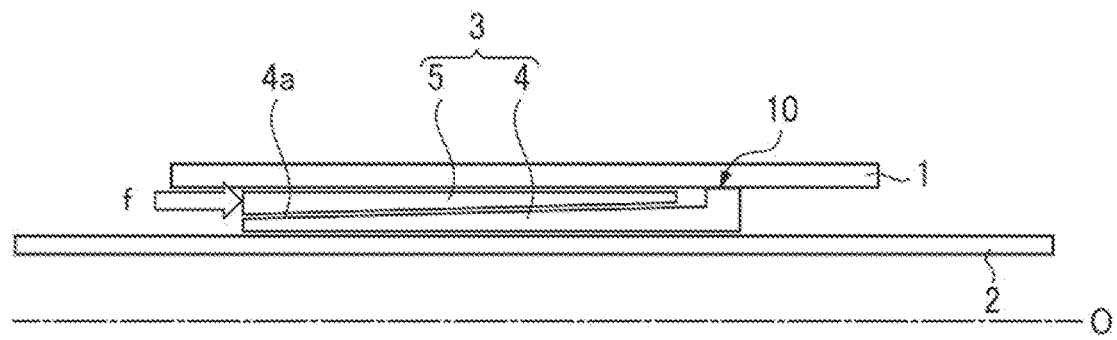
FIG. 6 is a partial cross-sectional view showing a portion where a sleeve and a wedge are engaged with each other, which is formed in a cross section in an axial direction of an interface structure in another type of telescopic structure in which the sleeve 4 is fixed to the outer tube 1 according to the present invention.

As shown in FIG. 2, the sleeve 4 comes into contact with the inner tube 2 (a second tube) to which the sleeve 4 is not fixed on a contact surface thereof, and is mated (engaged) with the wedge 5 on a wedge mating surface 4a. The wedge 5 is arranged between the outer tube 1 (a first tube) and the sleeve 4 so as not to come into contact with the inner tube 2. The wedge 5 is mated (engaged) with the sleeve 4 on the wedge mating surface 4a, and a biasing force f by a biasing member (for example, a spring) is applied to the wedge 5. Although the biasing member itself is not shown in FIG. 2, the biasing force f is generally applied in any one of the axial direction, the circumferential direction or an oblique direction having components of the axial direction and the circumferential direction as shown in FIG. 5. Although the biasing force f is applied in the circumferential direction in an example in FIG. 2, the biasing force f may be applied in the axial direction as shown in an example in FIG. 6. Accordingly, the biasing force f engages the wedge 5 with the sleeve 4 to such a depth that the sleeve 4 and the wedge 5 fill the gap between the outer tube 1 and the inner tube 2 to support the inner tube 2 without backlash.

In the telescopic structure in FIGS. 3A and 3B, since the sleeve 4 is fixed to the inner tube 2, when the inner tube 2 moves in the axial direction with respect to the outer tube 1, a radially outer surface (an outer circumferential surface) of the sleeve 4 that moves in the axial direction together with the inner tube 2 slides in contact with a radially inner surface (an inner circumferential surface) of the outer tube 1.

Figure 7:
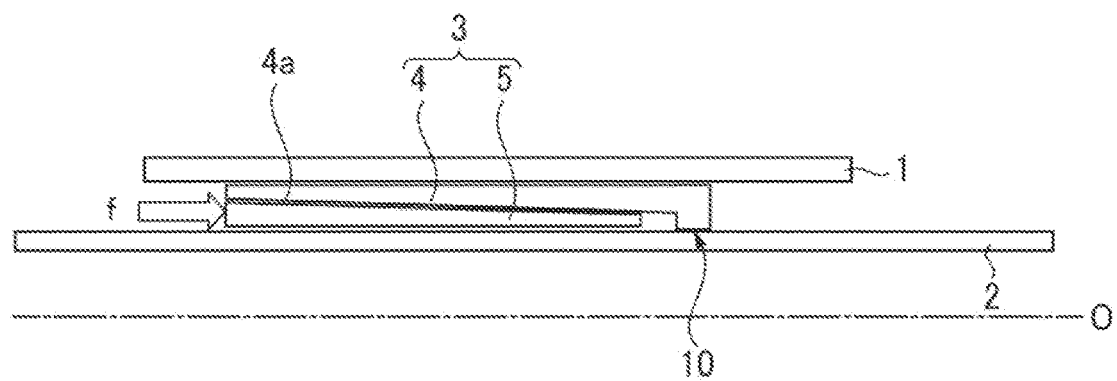
FIG. 7 is a partial cross-sectional view showing a portion where a sleeve and a wedge are engaged with each other, which is formed in a cross section in an axial direction of an interface structure still another type of telescopic structure in which the sleeve 4 is fixed to the inner tube 2 according to the present invention.

As shown in FIG. 4, the sleeve 4 comes into contact with the outer tube 1 (a second tube) to which the sleeve 4 is not fixed on a contact surface thereof, and is mated to (engaged) with the wedge 5 on a wedge mating surface 4a. The wedge 5 is arranged between the inner tube 2 (a first tube) and the sleeve 4 so as not to come into contact with the outer tube 1. The wedge 5 is mated (engaged) with the sleeve 4 on the wedge mating surface 4a, and the biasing force f by a biasing member (for example, a spring) is applied to the wedge 5. Although the biasing member itself is not shown in FIG. 4, the biasing force f is applied in the circumferential direction in the example of FIG. 4, but the biasing force f may be applied in the axial direction as shown in an example in FIG. 7. Accordingly, the biasing force f engages the wedge 5 with the sleeve 4 to such a depth that the sleeve 4 and the wedge 5 fill the gap between the outer tube 1 and the inner tube 2 to support the outer tube 1 without backlash.

In any type, according to the present invention, at least one wedge 5 is arranged between the first tube to which the sleeve 4 is fixed and at least one part of the sleeve 4, and is mated with at least one wedge mating surface 4a of the sleeve 4. That is, the wedge 5 is arranged so as not to come into contact with the second tube that is not fixed to the sleeve 4. When the sleeve 4 is fixed to the outer tube 1, the wedge 5 is located between the sleeve 4 and the outer tube 1, and the wedge 5 does not contact the inner tube 2. When the inner tube 2 slides relative to the outer tube 1, the sleeve 4 does not move relative to the outer tube 1 and the inner tube 2 slides relative to the sleeve 4. When the sleeve 4 is fixed to the inner tube 2, the wedge 5 is located between the sleeve 4 and the inner tube 2, and the wedge 5 does not contact the outer tube 1. When the inner tube 2 slides relative to the outer tube 1, the sleeve 4 does not move relative to the inner tube 2 and the outer tube 1 slides relative to the sleeve 4.

A configuration of the interface structure 3 (a sliding interface, a wedge sleeve) disclosed in the present specification can be adapted to a configuration in which the tube to which the sleeve 4 is fixed is switched between an outer side and an inner side by swapping positions of the sleeve 4 and the wedge 5 between the outer side and the inner side. For example, by swapping the positions of the sleeve 4 and the wedge 5 between the outer side and the inner side, the telescopic structure may be modified between a configuration in FIG. 2 and a configuration in FIG. 4, or between a configuration in FIG. 6 and a configuration in FIG. 7.

<Advantages of Preferred Configuration According to Present Invention>

Preferably, the wedge mating surface and the contact surface are arranged at the same position in the axial direction and the circumferential direction. Preferably, at the same position, the first tube, the wedge, the sleeve and the second tube overlap each other without a gap.

Preferably, a plurality of the contact surfaces are arranged at different positions in the axial direction and are raised from a periphery of the sleeve to come into contact with the second tube.

Preferably, the sleeve is made of a material having flexibility.

Preferably, the sleeve is made of a plastic material.

Figure 8:
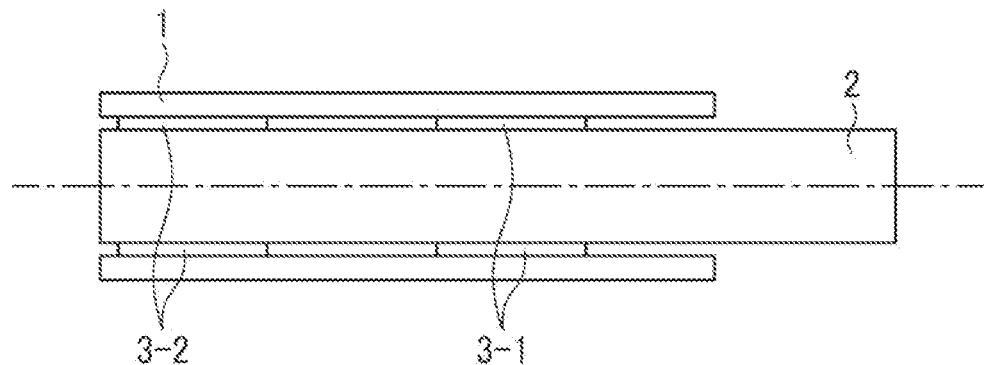
FIG. 8 is a schematic view showing advantages of a preferred configuration according to the present invention.

FIG. 8 is a schematic view showing advantages of a preferred configuration according to the present invention. In FIG. 8, the reference numeral 1 denotes an outer tube, the reference numeral 2 denotes an inner tube, and reference numerals 3-1, 3-2 schematically denote sliding interface portions where contact surfaces of a sleeve are located, in which a portion of the sleeve and a portion of a wedge fill a space between the outer tube 1 and the inner tube 2 with substantially no gap, thereby supporting the outer tube 1 and the inner tube 2.

The advantages of the preferred configuration according to the present invention are as follows.

1. Rigidity of the telescopic structure depends on absence of the space between one tube and the other tube, but according to a configuration of the present invention, influence of the biasing force (a spring force) on the rigidity is small.

2. High rigidity can be ensured by using a small spring force. The spring force needs only to eliminate the space between one tube and the other tube by arranging the wedge such that the wedge does not move backward. As a result, a sliding force can be made smaller (for example, approximately 60 N to 150 N). This is more favorable in terms of wear, and a load on a motor can be reduced and a telescope operation speed can be increased.

3. The contact surfaces in the sliding interfaces 3-1, 3-2 may be easily and clearly limited well-defined locations on plastic components. As a result, the configuration may be more satisfactorily controlled for a natural frequency, the rigidity and a low-temperature sliding force.

4. When the tube is made of metal, a contact of metal on plastic (a metal-on-plastic contact) in the sliding interfaces 3-1, 3-2 can reduce the sliding force, and an amount of grease used can be further reduced, or the grease can be eliminated.

5. Since the rigidity depends on the absence of the space between one tube and the other tube, the sliding force can be more easily changed while the influence on the rigidity can be relatively reduced (by adjusting the spring force).

<Friction Angle>

Figure 9A:
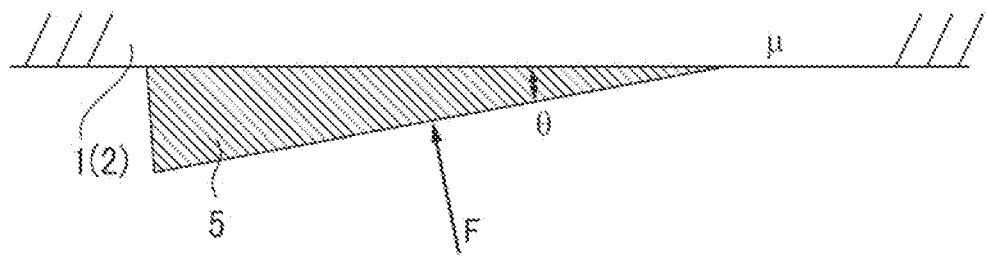
FIG. 9A is a view showing a force that the wedge receives from the sleeve on a wedge mating surface, and a wedge angle.
Figure 9B:
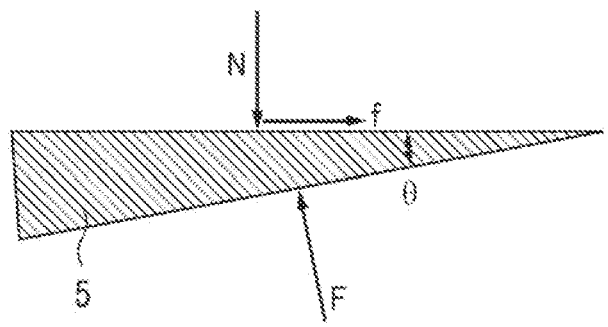
FIG. 9B is a view showing a force that the wedge receives from the sleeve at the wedge mating surface, the wedge angle, a reaction force that the wedge receives from the tube, and a frictional force at an interface between the wedge and the tube.

A geometric relationship and a friction coefficient between the wedge 5 and a component to be mated with the wedge 5 are selected, for example, by a force or a moment of a steering wheel so as to prevent the wedge 5 from moving backward (backdrive, a situation in which the wedge moves in a direction causing radial backlash) when a load or a moment is applied to the tube. For example, FIGS. 9A and 9B show the force acting on the wedge 5 in a simplified manner. FIG. 9A is a view showing a force F that the wedge 5 receives from the sleeve 4 at the wedge mating surface 4a, and a wedge angle θ, and FIG. 9B is a view showing a force F that the wedge 5 receives from the sleeve 4 at the wedge mating surface 4a, the wedge angle θ, a reaction force N that the wedge 5 receives from the tube (the outer tube 1 or the inner tube 2), and a frictional force at an interface between the wedge 5 and the tube (the outer tube 1 or the inner tube 2).

In very simple examples shown in FIGS. 9A and 9B, F is a load applied on a non-friction surface, $\mu$ is a static friction coefficient between the wedge and the tube to be mated, θ is a wedge angle, N is a reaction force in a normal direction, and f ($\leq \mu N$) is a frictional force. Here, a condition that should be satisfied in order to prevent the backdrive of the wedge 5 is $\mu \geq \tan \theta$. This is irrelevant to a size of the force F. Actually, the force may be more complicated, but this condition is a general principle for selecting the appropriate geometric relationship and friction coefficient for the component to be mated with the wedge 5.

The wedge angle θ should be determined in association with the spring force applied to the wedge 5. When the wedge angle θ is smaller, the spring force should be smaller to achieve the same sliding force with respect to the tube (the outer tube 1 or the inner tube 2). Although the smaller wedge angle θ provides more safety against the backdrive the wedge 5, the spring force is expanded to a larger range by the wedge angle θ, and thus the sliding force is also greatly affected by the spring force due to the smaller wedge angle θ. When the wedge angle θ is smaller, the wedge 5 needs to move more in order to eliminate the same amount of radial backlash. When the wedge angle θ is extremely small, the above-described radial backlash cannot be eliminated. Therefore, in order to realize a robust configuration, it is not preferable to extremely reduce the wedge angle θ.

FIG. 10 is a view showing the wedge angle in the sliding interface having the circumferential wedge 5 when the outer tube 1 and the inner tube 2 are circular tubes. For a circumferential wedge configuration when the outer tube 1 or the inner tube 2 are the circular tubes, the wedge angle may be defined as $|\beta - 90 \text{ degrees}|$ according to FIG. 10. In order to simplify the description, the interface between the wedge 5 and the sleeve 4 may be an arc having an arc center (a point B) offset from a center (point A) of the tubes 1, 2 as shown. However, in this case, the local wedge angle is not constant and varies along the interface between the wedge 5 and the sleeve. At a part of the interface between the wedge 5 and the sleeve 4, the wedge angle may exceed a maximum angle for preventing the backdrive, but as the entire interface, a design thereof will satisfy the no-backdrive condition as long as the wedge 5 can be prevented from moving backward. It is also possible to design a non-circular contour such that the local wedge angle is constant along the entire interface between the wedge 5 and the sleeve 4.

Figure 11:
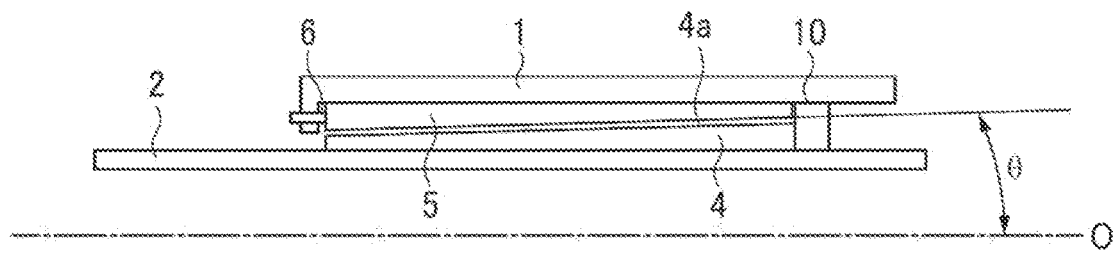
FIG. 11 is a view showing the wedge angle in the sliding interface having the axial wedge.

FIG. 11 is a view showing the wedge angle in the sliding interface having the axial wedge 5. The wedge 5 is biased by a spring 6 fixed to the outer tube 1. For a configuration of the axial wedge 5, as shown in FIG. 11, the wedge angle θ may be defined as a positive angle (an angle in a cross section including a central axis O) between the interface between the wedge 5 and the sleeve 4 and the central axis O of the inner tube 2 and the outer tube 1.

<Number and Size of Components>

In the description of the present specification, the wedge 5 may be one or more wedges 5. In the description of the present specification, the sleeve 4 may be one or more sleeves 4. Regarding the circumferential wedge configuration, the one or more wedges 5 and the one or more sleeves 4 can have large and small axial dimensions. For the configuration in the axial direction, the one or more wedges 5 and the one or more sleeves 4 may form a smaller or larger arc as shown in the present specification.

<Assembly>

During assembly, the wedge 5 can temporarily move against biasing of the spring 6 to create play. This often occurs when the wedge 5 is accessible from outside (for example, through a slot or an opening of the outer tube 1), and/or when the wedge 5 has a special shape (for example, one or more tabs that push, pull, compress or extend the wedge 5, or a special shape that accepts an assembly tool). The spring 6 may be added at an end of the assembly such that the wedge 5 and the sleeve 4 can be easily assembled first.

<Wear Compensation>

As the component wears (in particular, in the sliding interface), the biasing of the spring 6 applied to the wedge 5 further advances the wedge 5 so as to eliminate the radial backlash.

<Arrangement of Spring>

The spring 6 may be arranged between the wedge 5 and the wedge 5, between the wedge 5 and the sleeve 4, between the wedge 5 and the outer tube 1 or between any combination. The wedge 5, the sleeve 4 and/or the first tube (1 or 2) can have an outward or inward protruding portion, a slot, a hole and/or other features, and can facilitate arrangement, attachment and holding of the spring 6.

<Spring>

The spring 6 may be one or more springs 6. A type of the spring 6 may be a compression spring, a tension spring, a set screw in which the spring is incorporated, a torsion spring, a wire spring, or any other type of spring. In order to keep the spring force relatively constant regardless of material expansion or contraction due to a temperature change and a manufacturing tolerance, it is preferable that the spring has a low spring constant. A stronger spring force that may be designed to achieve a desired sliding force results in a larger sliding force. It is preferable that the spring force is low in order to realize a low sliding force, and is sufficiently large in order to eliminate the radial backlash.

<Material>

In order to make the assembly possible and to reduce the undesirable backlash by means of deformation when the spring force is applied, the wedge 5 and the sleeve 4 should be at least slightly flexible. Ideally, the interface of the sliding surface has a low friction coefficient. Plastic materials are suitable for these purposes. POM and PA (polyamide materials such as nylon) are two plastic materials that can be effective, but the configuration of the present invention is not limited to the use of any specific material. Various materials may be used for the wedge 5 and the sleeve 4.

<Wedge Shape and Cross-Sectional Shape>

In most of the examples described in this specification, the inner tube 2 and the outer tube 1 have a circular cross section. The wedge 5 may have a linear shape or another shape, and the inner tube 2 or the outer tube 1 may have various cross sections. For example, the shape may be a double D shape, an oval shape, a polygonal shape (a triangular shape, a rectangular shape, a pentagonal shape, a hexagonal shape or the like), or various curved shapes. Various wedge shapes and cross sections can be used for the configuration in the circumferential direction, the axial direction and a combination direction thereof.

Figure 12:
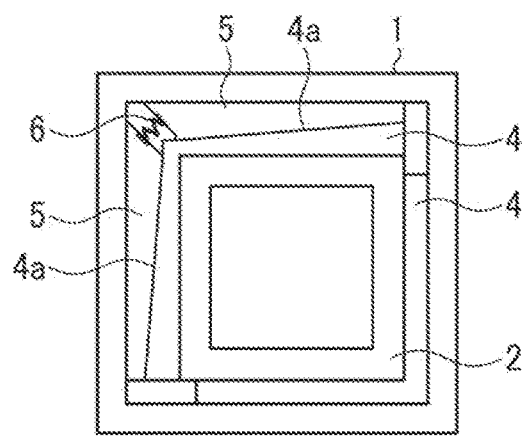
FIG. 12 is a view showing an example of a configuration of the wedge and the sleeve when the outer tube and the inner tube have a square cross section.
Figure 13:
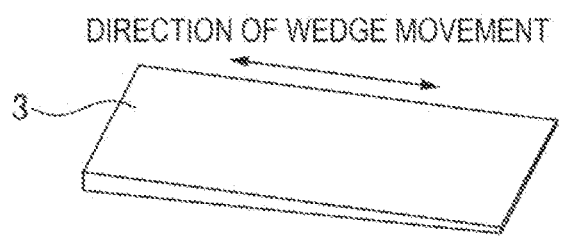
FIG. 13 is a view showing an example of the wedge having a flat shape.

For example, FIG. 12 shows a cross-sectional view of an example of the telescopic structure in which the inner tube 2 and the outer tube 1 have a rectangular cross section. In a configuration in FIG. 12, the reference numeral 1 denotes an outer tube, the reference numeral 2 denotes an inner tube movably arranged inside the outer tube 1, the reference numeral 4 denotes a sleeve, the reference numeral 5 denotes a wedge, and the reference numeral 6 denotes a spring. The sleeve 4 is fixed to the outer tube 1. Two wedges 5 are provided between portions of the outer tube 1 and the sleeve 4 in the radial direction, and are respectively mated with two wedge mating surfaces 4a of the sleeve 4, thereby being biased by the spring 6 in directions away from each other. FIG. 13 shows an example of the wedge 5 used for such a sliding interface. A direction in which the wedge 5 in FIG. 13 moves may be the circumferential direction, the axial direction or any combination direction thereof <Orientation of Wedge>

Figure 14:
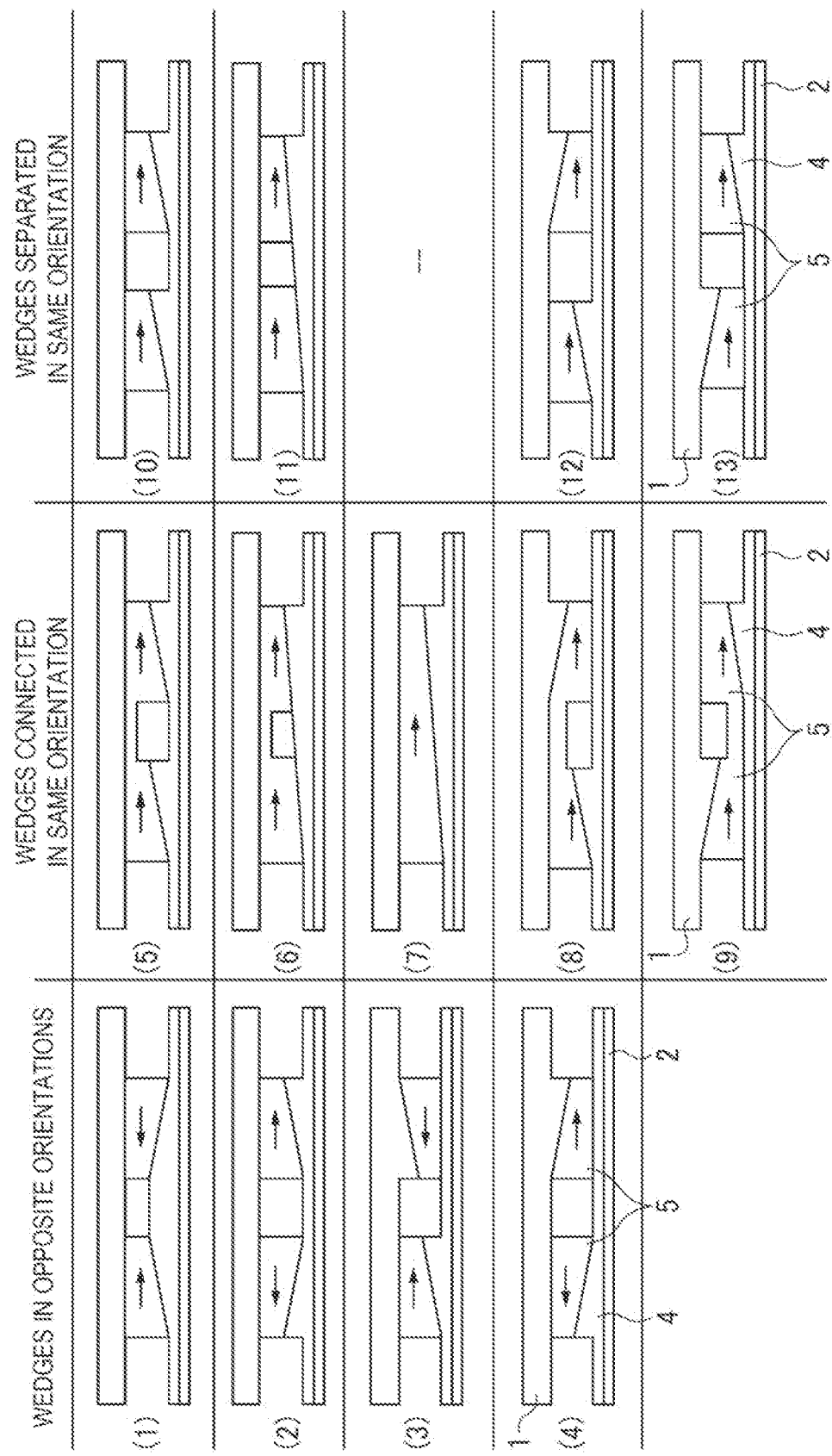
FIG. 14 is a schematic view showing a plurality of examples of an arrangement of two wedges in the same direction or opposite directions in the sliding interface.

When a plurality of wedges 5 are provided along a specific direction, wedge surfaces of the wedges 5 may be "arranged in opposite orientations to each other" or "arranged in the same orientation" along the circumferential direction, the axial direction or the combination direction as described below. FIG. 14 shows a plurality of examples of combinations of the orientations of the wedge surfaces of the two wedges 5 arranged along one circumferential direction, one axial direction or one combination direction. Specifically, (i) a case where the two wedges 5 are arranged in opposite orientations (see (1) to (4) of FIG. 14), (ii) a case where the two wedges 5 are arranged in the same orientation and the two wedges 5 are connected (see (5) to (9) of FIG. 14), and (iii) a case where the two wedges 5 are arranged in the same orientation and the two wedges 5 are separated (see (10) to (13) of FIG. 14) are schematically shown. In FIG. 14, the reference numeral 1 denotes an outer tube, the reference numeral 2 denotes an inner tube movably arranged inside the outer tube 1, the reference numeral 4 denotes a sleeve, and the reference numeral 5 denotes the wedge. In FIG. 14, arrows indicate directions of the biasing forces applied by the spring, but do not necessarily indicate the number of springs to be used. A configuration of the "opposite orientations" or the "same orientation" shown in FIG. 14 can be incorporated into a configuration for the circumferential direction, the axial direction and the combination direction. When a plurality of wedge surfaces are aligned in the same orientation, the wedge surfaces may be integrated into a single component, but this is not required. In the example of the "opposite orientations", the plurality of wedges may be connected to each other via one spring. Alternatively, each wedge 5 may be connected to another component (the sleeve 4, the outer tube 1) via one spring. In the example of the "same orientation", each wedge portion needs to be connected to the sleeve 4, the outer tube 1 via the spring. In the example in which the plurality of separated wedges 5 are in the "same orientation", these wedges 5 cannot be connected to each other via one spring. In the "wedges 5 connected in the same orientation", a single spring may be preferably used in order to reduce the number of components. In the example of the "same orientation", any direction can be configured as a moving direction of the wedges 5. (In the drawing, the arrows are shown to the right, but an opposite direction is also possible.) In the plurality of examples in FIG. 14, it is assumed that the sleeve 4 is fixed to the outer tube 1. Therefore, the wedge 5 is shown between the outer tube 1 and the sleeve 4. However, the examples may be applied to a case where the sleeve 4 is fixed to the inner tube 2 by simply swapping positions of the outer tube 1 and the inner tube 2. Modifications listed in the above paragraph can also be applied to the case where the sleeve 4 is fixed to the inner tube 2.

Figure 15:
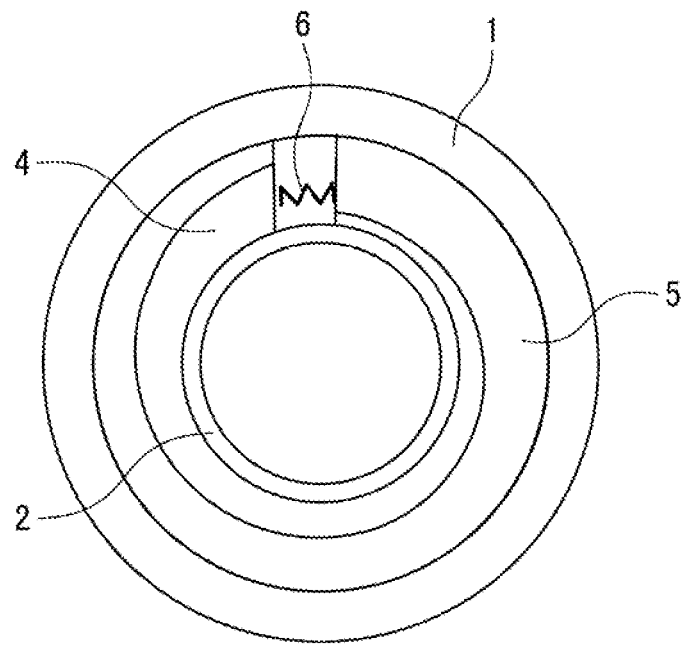
FIG. 15 is a schematic cross-sectional view showing an example of the sliding interface having a single circumferential wedge when the outer tube and the inner tube have a circular cross section.

FIG. 15 is a cross-sectional view of an example of the telescopic structure in which the inner tube 2 and the outer tube 1 have a circular cross section. In a configuration in FIG. 15, the reference numeral 1 denotes an outer tube, the reference numeral 2 denotes an inner tube movably arranged inside the outer tube 1, the reference numeral 4 denotes a sleeve, the reference numeral 5 denotes a wedge, the reference numeral 6 denotes a spring, and the sleeve 4 is fixed to the outer tube 1 although not shown. An arrangement of the wedges in the configuration in FIG. 15 is obtained by applying an arrangement in (7) of FIG. 14 in the circumferential direction.

Figure 16:
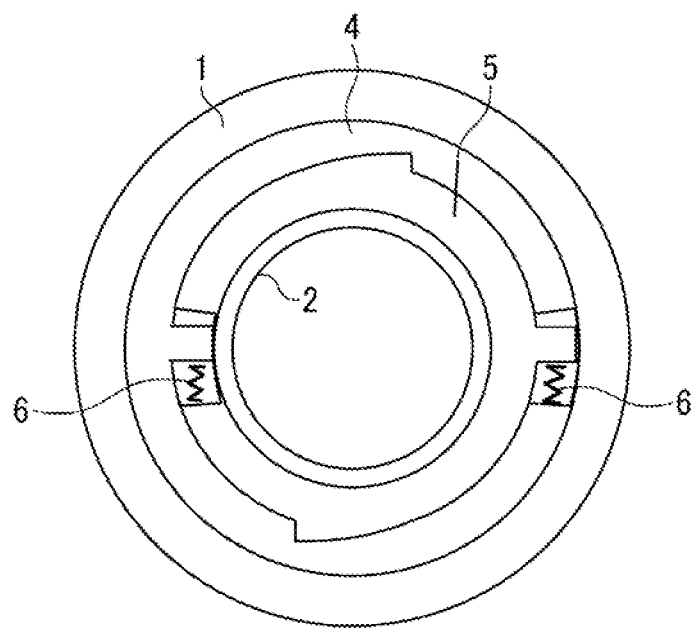
FIG. 16 is a schematic cross-sectional view showing an example of the sliding interface having two circumferential wedges when the outer tube and the inner tube have a circular cross section.

FIG. 16 is a cross-sectional view of an example of the telescopic structure in which the inner tube 2 and the outer tube 1 have a circular cross section. In a configuration in FIG. 16, the reference numeral 1 denotes an outer tube, the reference numeral 2 denotes an inner tube movably arranged inside the outer tube 1, the reference numeral 4 denotes a sleeve, the reference numeral 5 denotes a wedge, the reference numeral 6 denotes a spring, and the sleeve 4 is fixed to the outer tube 1 although not shown. An arrangement of the wedges in the configuration in FIG. 16 is obtained by applying an arrangement in (5) of FIG. 14 in the circumferential direction.

<Contact Surface>

Contact surfaces between the inner tube 2 and the sleeve 4, between the sleeve 4 and the wedge 5, and between the wedge 5 and the outer tube 1 may be clearly defined. By clearly defining the contact surface, the contact can be restricted to a specific area in the axial direction and/or the circumferential direction. A purpose of the contact surface is to control and/or improve the natural frequency, the rigidity and the sliding force (including those at low temperatures). In the configuration in which the sleeve 4 is fixed to the outer tube 1, the contact surface should be clearly limited between the sleeve 4 and the inner tube 2. In the configuration in which the sleeve 4 is fixed to the inner tube 2, the contact surface should be clearly limited between the sleeve 4 and the outer tube 1. The contact surface is most favorably limited by a boss (a raised surface) on the sleeve 4.

Figure 17A:
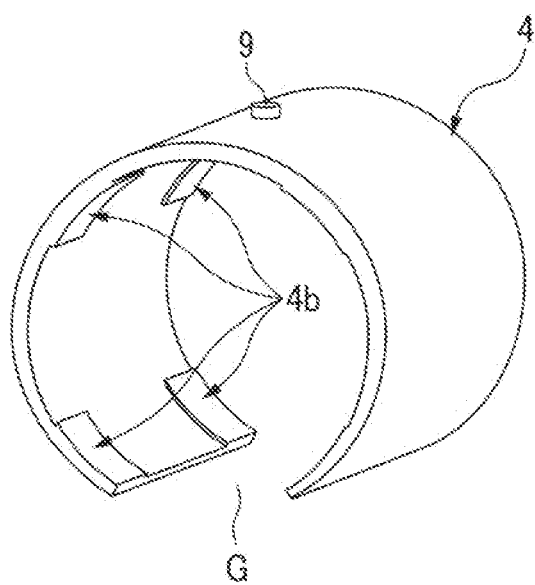
FIG. 17A is a perspective view of an example of the sleeve having contact surfaces.
Figure 17B:
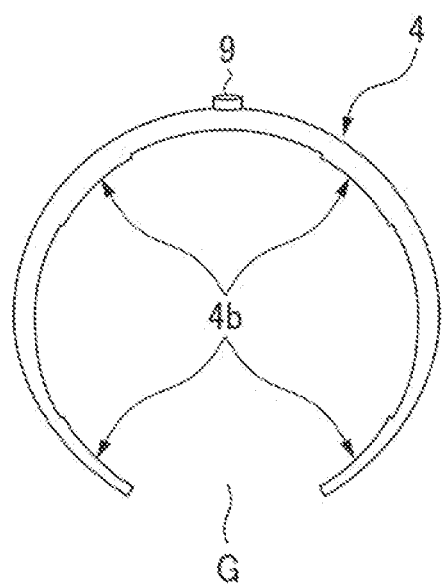
FIG. 17B is an end view of the sleeve in FIG. 17A as viewed in the axial direction.

FIGS. 17A and 17B are respectively a perspective view and an end view as viewed in the axial direction showing an example of the sleeve 4 having bosses 4b (raised surfaces) that come into contact with the inner tube 2. The example in FIGS. 17A and 17B is the sleeve 4 to be fixed to the outer tube 1. Therefore, the bosses 4b (the raised surfaces) are arranged on the inner circumferential surface of the sleeve 4. The bosses 4b are contact surfaces in direct contact with the inner tube 2. When the sleeve 4 is fixed to the inner tube 2, the bosses 4b are arranged on an outer circumferential surface of the sleeve 4. As will be described later, a protrusion 9 shown on an upper portion of the sleeve 4 in FIGS. 17A and 17B is a fixing portion that fixes the sleeve 4 to the outer tube 1. A gap G over the entire length of the sleeve 4 in the axial direction of the sleeve 4 in FIGS. 17A and 17B will be described later.

FIGS. 18A, 18B and 18C are respectively a rear view, a side view and a front view schematically showing an example of an arrangement of contact surfaces with a tube on the sleeve 4.

In the following example of the arrangement of the contact surfaces and the description thereof, although a detailed sleeve shape is not shown, a cylinder drawn with a black thin line indicates the sleeve 4, and hatched areas indicate contact surfaces 4c with the (inner or outer) tube that slides relative to the sleeve 4. A direction "V" indicates a vertical direction, and a direction "H" indicates a horizontal direction. Broken lines in the rear view and the front view indicate intervals between the contact surfaces 4c around a circumference. (The vertical direction V is a direction of a tilting operation of a steering column, which is one of applications of the present invention described later, and the horizontal direction H is a left-right direction as viewed from a driver who operates the steering wheel.)

All examples and information related to the contact surfaces 4c described below may be used in all embodiments regardless of whether a configuration of the contact surfaces 4c uses the circumferential wedge 5 or the axial wedge 5, and whether the sleeve 4 is fixed to the outer tube 1 or the inner tube 2. All examples can be modified so as to use larger or smaller contact surfaces 4c. The smaller contact surface 4c is expected to be more preferable for reducing a sliding force at a low temperature, while the larger contact surface 4c is expected to be more preferable for improving bending rigidity.

In the sleeve 4 in the example in FIGS. 18A, 18B and 18C, there are eight contact surfaces 4c in total, which are arranged at intervals at four positions in the circumferential direction and arranged at intervals at two positions in the axial direction. The two positions in the axial direction where the contact surfaces 4c are arranged are arranged as far as possible in order to realize the highest rigidity. In this configuration, a size of the contact surface to be used is not limited to any specific size.

A width of the contact surface 4c in the axial direction on a front side (a front surface side) is indicated by L1, a width of the contact surface 4c in the axial direction on a rear side (a rear surface side) is indicated by L2, an angle (an arc angle) of an arc of the contact surface 4c in the circumferential direction on a front side (a front surface side) is indicated by $\alpha 1$, and an angle of an arc of the contact surface 4c in the circumferential direction on a rear side (a rear surface side) is indicated by $\alpha 2$. When these symbols are used, in a configuration in FIGS. 18A, 18B and 18C, conditions of L1=L2, L1>L2 or L1<L2 may be used, and conditions of $\alpha 1=\alpha 2$, $\alpha 1>\alpha 2$ or $\alpha 1<\alpha 2$ may also be used. L1 and L2 may be in a range from a small value (for example, 10 mm) to a large value (for example, 50 mm). $\alpha 1$ and $\alpha 2$ may be in a range from a small value (for example, 10°) to a large value (for example, 80°). In one example, the conditions of L1=L2=30 mm and $\alpha 1=\alpha 2=40°$ are used. All of the four contact surfaces 4c on the front side may not have the same arc angle $\alpha 1$, and all of the four contact surfaces 4c on the rear side may not have the same arc angle $\alpha 2$.

When used in the steering column described later, it is considered that the contact surfaces 4c in an area L1 receive a force larger than that of the contact surfaces 4c in an area L2 according to a force applied to the steering wheel and a simple force analysis, and it is therefore beneficial to enlarge the contact surfaces 4c in the area L1 relative to the contact surfaces 4c in the area L2 (by increasing the length L1 and/or increasing the angle $\alpha 1$ of the arc).

The plurality of contact surfaces 4c should be arranged at appropriate intervals in the circumferential direction. For example, all of the four surfaces should not be on the same half side of the circumference. Arranging the contact surfaces 4c at positions of ±45° and ±135° from the "V" direction (as indicated by the broken lines in the front view and the rear view) may be the best in order to achieve equal bending rigidity in the "V" and "H" directions (in consideration of the rigidity only between the inner tube and the outer tube). It is considered that biasing to the contact surfaces 4c away from the "H" direction (for example, the contact surfaces 4c at ±35° and ±145° from the "V" direction) increases the rigidity in the "V" direction and decreases the rigidity in the "H" direction. This may be preferable if higher rigidity is required in the "V" direction than in the "H" direction.

FIGS. 19A, 19B and 19C are respectively a rear view, a side view and a front view schematically showing another example of an arrangement of the contact surfaces 4c on the sleeve 4. In the sleeve 4 in the example in FIGS. 19A, 19B and 19C, there are six contact surfaces 4c in total, which are arranged at intervals at three positions in the circumferential direction and arranged at intervals at two positions in the axial direction. The two positions in the axial direction where the contact surfaces 4c are arranged are arranged as far as possible in order to realize the highest rigidity. In this configuration, a size of the contact surface 4c to be used is not limited to any specific size.

When the above-described symbols are used, in a configuration in FIGS. 19A, 19B and 19C, conditions of L1=L2, L1>L2 or L1<L2 may be used, and conditions of α1=α2, α1>α2 or α1<α2 may also be used. L1 and L2 may be in a range from a small value (for example, 10 mm) to a large value (for example, 50 mm). α1 and α2 may be in a range from a small value (for example, 10°) to a large value (for example, 110°). All of the three contact surfaces 4c on a front side may not have the same arc angle α1, and all of the three contact surfaces 4c on a rear side may not have the same arc angle α2.

When used in the steering column described later, it is considered that the contact surfaces 4c in an area L1 receive a force larger than that of the contact surfaces 4c in an area L2 according to a force applied to the steering wheel and a simple force analysis, and it is therefore beneficial to enlarge the contact surfaces 4c in the area L1 relative to the contact surfaces 4c in the area L2 (by increasing the length L1 and/or increasing the angle α1 of the arc).

The plurality of contact surfaces 4c should be arranged at appropriate intervals in the circumferential direction. For example, all of the three contact surfaces 4c should not be on the same half side of the circumference. The intervals between the contact surfaces 4c may be equal to each other (may be 120° as shown) or may be different from each other. The three contact surfaces 4c on the front side may be aligned with the three contact surfaces 4c on the rear side, or may have different phase angles. In the area on the front side and/or the area on the rear side, the contact surface 4c may or may not be present exactly on a "V" axis or an "H" axis.

In a sliding interface having eight contact surfaces 4c in total (four on a front side and four on a rear side), the sleeve 4 needs to be configured such that at least two contact surfaces 4c on the front side and at least two contact surfaces 4c on the rear side have flexibility in the radial direction, and the sleeve 4 receives a wedge force to eliminate the radial backlash. FIGS. 20A to 20F show several examples. Various options may be used for the contact surfaces 4c on the front side and the contact surfaces 4c on the rear side. (The contact surfaces 4c do not need to be at intervals of 90° as shown in FIGS. 20A to 20F).

In a sliding interface having six contact surfaces 4c in total (three on a front side and three on a rear side), at least one contact surface 4c on the front side and at least one contact surface 4c on the rear side needs to have flexibility in the radial direction (for example, due to a shape of an open sleeve), and a force should be received from the wedge 5 so as to eliminate the radial backlash. FIGS. 21A to 21C show several examples. Various options may be used for the contact surfaces 4c on the front side and the contact surfaces 4c on the rear side. The contact surfaces 4c do not need to be at intervals of 120° as shown in FIGS. 21A to 20C.

It is preferable to use the plurality of contact surfaces 4c, but the present invention is not limited to the use of any specific configuration for the contact surfaces 4c (or to the use of any contact surface 4c at all).

<Selective Thickness Reduction and Material Removal>

In order to make the sleeve 4 flexible on the contact surface 4c that receives the wedge force and facilitate expansion and contraction, the sleeve 4 may have the gap G over the entire length in the axial direction at one circumferential position, for example, as shown in FIG. 17A. In this case, the sleeve 4 does not have a complete cylindrical shape, but has an intermittent cylindrical shape due to the gap G. As shown in FIGS. 22A and 22B, a thickness can be selectively reduced or a material can be removed in an area T between the contact surfaces 4c of the sleeve 4 on the front and rear sides.

<Arrangement of Wedge with Respect to Contact Surface>

From a viewpoint of eliminating the backlash in the radial direction, it is beneficial if the contact surfaces 4c that receive the wedge force may eliminate the radial backlash separately at respective positions. This is realized, for example, when each contact surface 4c has an individual wedge 5 that receives a spring force. When a single wedge 5 applies a force to one or more contact surfaces 4c, the backlash can be eliminated in one contact surface 4c (for example, due to a variation in allowable error, material deformation or positional displacement of the wedge 5), but the backlash may not be eliminated in other contact surfaces 4c. However, in practice, in order to reduce the number of components and further simplify the assembly, it may be beneficial to provide one wedge 5 that applies a force to two or more contact surfaces 4c. For example, in some cases, a single circumferential wedge 5 can apply a force to the contact surface 4c on the front side and the contact surface 4c on the rear side, and a single axial wedge 5 can apply a force to the two contact surfaces 4c on the front and rear sides. In the following embodiments of the present specification, other examples are shown. Even when the wedge 5 moves, a back side of each contact surface 4c that receives the wedge force should always be covered or largely be covered with the wedge 5. In a configuration in the circumferential direction, separate spring forces can be applied on the front side and the rear side. In a configuration in the axial direction, separate wedges 5 may be provided on the front side and the rear side. As a result, the backlash can be eliminated separately on each of the front side and the rear side.

<Sleeve Fixing Method>

In the present specification, "the sleeve is fixed to the tube" means that the sleeve is prevented from moving in the axial direction with respect to the tube and is prevented from moving by rotating in the circumferential direction with respect to the tube. (Fixation of rotation is highly preferable, but may not be required.) Any method can be used to fix the sleeve 4 to the outer tube 1 (or the inner tube 2). For example, when the sleeve 4 is fixed to the outer tube 1, the sleeve 4 may protrude radially outward into the outer tube 1 like the protrusion 9 (a fixing portion) of the upper portion of the sleeve 4 in FIGS. 17A and 17B, or the outer tube 1 may protrude radially inward into the sleeve 4. When the sleeve 4 is fixed to the inner tube 2, the sleeve 4 may protrude radially inward into the inner tube 2, or the inner tube 2 may protrude radially outward into the sleeve 4. The sleeve 4 may be held by using a screw, a rivet or other methods. One or a more fixing positions (fixing portions) in the axial direction and/or the circumferential direction may be provided. The fixing positions may or may not be provided at the plurality of contact surfaces in the circumferential direction. The fixing positions of the sleeve 4 to the outer tube 1 (or the inner tube 2) may or may not be provided at the plurality of contact surfaces 4c in the axial direction. The sleeve 4 may be press-fitted into the tube (the outer tube 1 or the inner tube 2) to which the sleeve 4 is fixed in order to eliminate axial backlash between the sleeve 4 and the tube (the outer tube 1 or the inner tube 2). For example, as shown in FIG. 23, the press-fit can be realized by using a circular shape, a square shape, a circular shape having serrations (serrated portions) or the like.

Figure 24A:
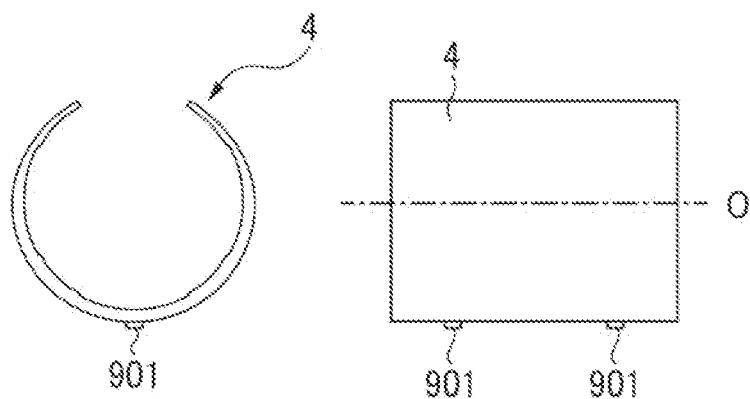
Figure 24B:
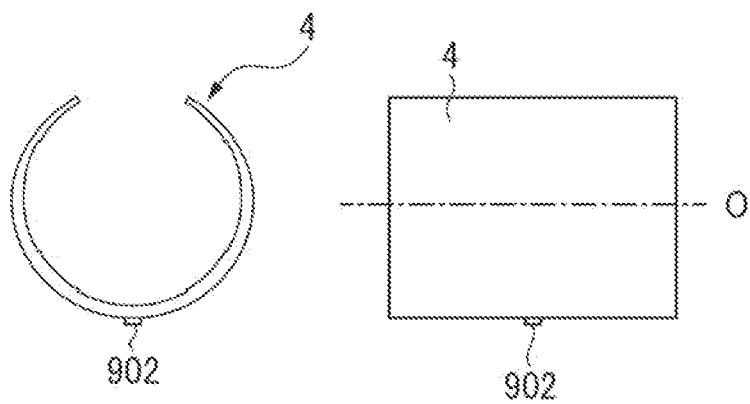
Figure 24C:
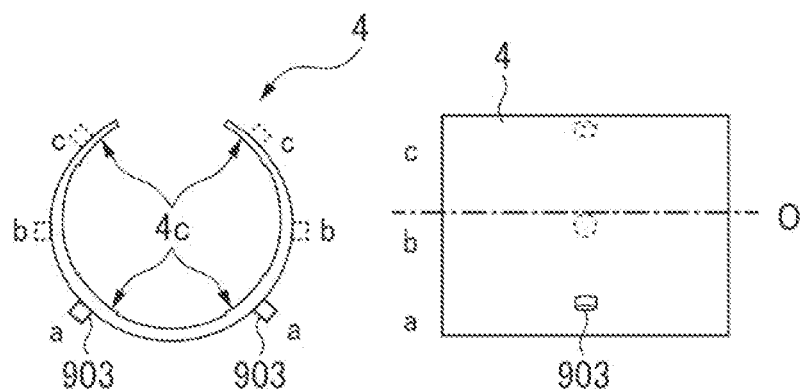
Figure 24D:
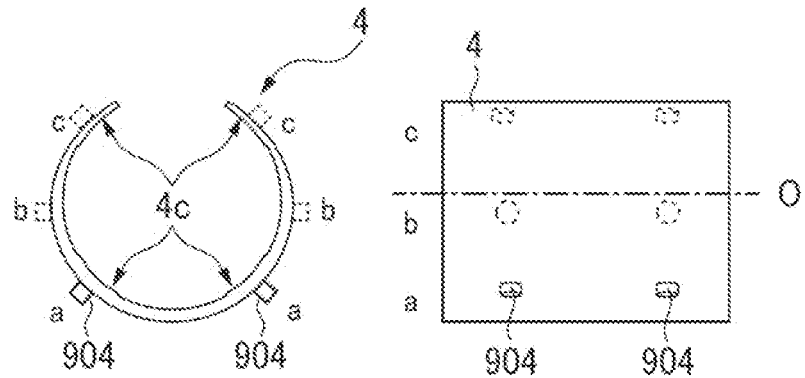

Each of FIGS. 24A, 24B, 24C and 24D is a front view and a side view of an example of the sleeve 4 having one or more fixing positions (fixing portions). In the example of FIG. 24A, a plurality of tabs (protrusions) 901 for fixing the sleeve 4 to the outer tube 1 are provided at two positions in total. In the example of FIG. 24B, a tab (protrusion) 902 for fixing the sleeve 4 to the outer tube 1 is provided at one position as in total. In the example of FIG. 24C, a plurality of tabs (protrusions) 903 for fixing the sleeve 4 to the outer tube 1 are provided (at one position on each of the left and right sides with respect to a central axis of the tube, that is, at two positions in total). As the position where the tab 903 is provided, circumferential positions a, b or c may be used. In the example of FIG. 24D, a plurality of tabs (protrusions) 904 for fixing the sleeve 4 to the outer tube 1 are provided (at two positions in a direction of the central axis O on each of the left and right sides with respect to the central axis O, that is, at four positions in total). As the position where the tab 903 is provided, circumferential positions a, b or c may be used. The outer tube 1 (not shown) has a hole or a shape for receiving the tabs 901, 902, 903, 904 protruding outward on the sleeve 4. These examples can be applied to any embodiment described in the present specification (for the wedge configuration in the circumferential direction and the axial direction). The configuration or position of the wedge on the sleeve 4 is not considered here. Providing a single fixing position (the example in FIG. 24B) in the axial direction and the circumferential direction can help to reduce a stress due to fixation during a temperature change.

<Example of Product of Telescopic Structure>

FIG. 25 is a perspective view showing an appearance of an example of an actual device having the telescopic structure according to the present invention. In the device in FIG. 25, the outer tube 1 is joined to a flange 20.

First Embodiment

FIG. 26A is an end view of a sliding interface using circumferential wedges as viewed in the axial direction according to a first embodiment of the present invention, and FIG. 26B is a partial perspective view thereof. In FIGS. 26A and 26B, the reference numeral 1 denotes an outer tube, the reference numeral 2 denotes an inner tube, a reference numeral 401 denotes a sleeve, a reference numeral 402 denotes four contact surfaces of the sleeve 401 at this axial position, reference numerals 501, 502 denote wedges, a reference numeral 601 denotes a spring, and a reference numeral 905 denotes a fixing position (fixing portion) of the sleeve. In the following description of the embodiment of the present invention, the outer tube 1 is a housing when used in the steering column described later. As shown in FIG. 26A, the sleeve 401 and two wedges 501, 502 are inserted between the outer tube (the housing) 1 and the inner tube 2. The sleeve 401 has a shape opened by a gap G on a lower side in FIG. 26A, and is fixed to the outer tube 1 (for example, as described in the section of "sleeve fixing method" in the present specification) at the fixing position (the fixing portion) 905 on an upper side in FIG. 26A as shown. The sleeve 401 has four contact surfaces 402 at this axial position. (As will be described later with reference to FIG. 26D, the sleeve 401 further has four contact surfaces at another axial position.) The sleeve 401 is fitted to an outer side of the inner tube 2 such that entire surfaces of the four contact surfaces 402 at each axial position are in contact with a radially outer surface (an outer circumferential surface) of the inner tube 2. An upper portion of the sleeve 401 has a portion having a thickness that gradually decreases toward an upper side (a center in the circumferential direction) on both left and right sides (both sides in the circumferential direction) in the FIG. 26A. The two wedges 501, 502 are inserted into the upper portion of the sleeve 401 in opposite orientations along the circumferential direction such that base side end portions thereof face each other. The wedges 501, 502 each have a thickness gradient so as to become thinner toward a lower side on both the left and right sides, and are inserted so as to be fitted onto portions on both left and right sides (wedge mating surfaces) of the sleeve 401 having the thickness gradient described above. A compressed spring 601 is connected between the base side end portions of the wedges 501, 502 in the circumferential direction, and biases the wedges 501, 502 in directions of pushing the base side end portions of the wedges 501, 502 (that is, in directions in which the wedges 501, 502 are away from each other). (That is, the wedges 501, 502 correspond to the wedge arrangement in (2) of FIG. 14.) Accordingly, no gap is formed between the outer tube 1 and the inner tube 2 at circumferential positions of the contact surfaces 402 of the sleeve 401 on a side close to the wedges 501, 502 (the contact surfaces 402 on the upper side in FIG. 26A), and the wedges 501, 502 enter between the sleeve 401 and the outer tube 1 to a depth at which no gap is formed between the outer tube 1 and the inner tube 2 even at circumferential positions of the contact surfaces 402 of the sleeve 401 on a side far from the wedges 501, 502 (the contact surfaces 402 on the lower side in FIG. 26A) due to the inner tube 2 being pushed down by entry of the wedges 501, 502. Therefore, no backlash occurs between the outer tube 1 and the inner tube 2 due to the wedges 501, 502 and the sleeve 401. Since the sleeve 401 is fixed to the outer tube 1 and the wedges 501, 502 are between the sleeve 401 and the outer tube 1, the inner tube 2 only contacts the sleeve 401 (in particular, the contact surfaces 402). (That is, only the sleeve 401 receives a sliding frictional force.) Therefore, when the inner tube 2 is moved relative to the outer tube 1, the wedges 501, 502 are not affected at all by movement of the inner tube 2, and in particular, no friction occurs between the inner tube 2 and the wedges 501, 502. In the above-described configuration, the spring 601 may be any spring as long as the spring 601 can bias the base side end portions of the wedges 501, 502 in the pushing directions (that is, in the directions in which the wedges 501, 502 are away from each other). For example, FIG. 26C shows an example in which a coil spring 601' is installed in a gap of the sleeve 401 in a configuration in FIG. 26B. In FIG. 26A, a center of the inner tube 2 is shown to be offset downward from a center of the outer tube 1, but the thicknesses of the sleeve 401 and the wedges 501, 502 can be adjusted such that the inner tube 2 and the outer tube 1 are concentric.

FIG. 26D is a perspective view showing a wedge surface of the wedges 501, 502 to be mated with a back side of the contact surface 402 on a side close to the wedges 501, 502. In FIG. 26D, upper and lower sides are inverted with respect to FIGS. 26B and 26C. As described above, in the present embodiment, the sleeve 401 includes the four contact surfaces 402 at each of the two axial positions. Based on an idea of eliminating the gap between the outer tube 1 and the inner tube 2 at least at axial and circumferential positions of the four contact surfaces 402, in the modification of the present embodiment, a contact surface 510 of the wedge raised radially inward from a periphery is formed in a part of the wedges 501, 502 at two axial positions and two circumferential positions on the upper side among the four contact surfaces 402 at each of the axial positions (that is, on a back side of the contact surface 402 of the sleeve 401). Accordingly, at the two axial positions and the two circumferential positions on the upper side among the four contact surfaces 402 at each of the two axial positions, backlash can be prevented and rigidity can be maintained similarly to the telescopic structure before modification of the first embodiment.

Second Embodiment

FIG. 27A is a partial perspective view of a sliding interface using circumferential wedges according to a second embodiment of the present invention, FIG. 27B is an end view of the sliding interface in FIG. 27A as viewed in the axial direction, and FIG. 27C is a view showing an assembly of a sleeve and the wedges constituting the sliding interface in FIG. 27A. In FIGS. 27A, 27B and 27C, the reference numeral 1 denotes an outer tube, the reference numeral 2 denotes an inner tube, a reference numeral 403 denotes a sleeve, a reference numeral 404 denotes contact surfaces of the sleeve 403, reference numerals 503, 504 denote wedges, a reference numeral 603 denotes a spring, reference numerals 801, 802 denote flanges formed at both axial ends of the wedges 503, 504, and a reference numeral 906 denotes sleeve fixing protrusions (tabs). The sliding interface according to the second embodiment is different from the sliding interface according to the first embodiment in the following points. That is, in the first embodiment, a circumferential position of the spring 601 between the two wedges 501, 502 (an upper side in FIG. 26A) and a circumferential position of the gap G of the sleeve 401 (a lower side in FIG. 26A) are different from each other by 180°, but in the second embodiment, both are in the same phase (an upper side in FIG. 27B).

In the second embodiment, as a first option, as shown in FIG. 27C, the two wedges 503, 504 have the flanges 801, 802 formed at both axial end portions so as to cover a part of a thickness of both axial end portions of the sleeve 403, and the two wedges 503, 504 can be reliably prevented from being displaced from the sleeve 403 in the axial direction. In this case, the flanges 801, 802 have a (radial) width that only covers a part of the (radial) thickness of both axial end portions of the sleeve 403, and the flanges 801, 802 do not reach an inner diameter of the sleeve 403, so that the inner tube 2 sliding inside the sleeve 403 does not come into contact with the flanges 801, 802. The circumferential position of the gap G of the sleeve 403 and the circumferential position of the spring 603 between the two wedges 503, 504 (that is, a circumferential position of a gap between facing base side end portions of the two wedges 503, 504) are in the same phase (both are on the upper side in FIG. 27B). Therefore, at the time of assembly, the two wedges 503, 504 can be first fitted to two facing circumferential end portions of the sleeve 403 as shown in FIG. 27C and then inserted into the outer tube 1, thereby facilitating assembly. The flanges 801, 802 correspond to a "displacement prevention structure" described as a preferred feature of the present invention.

In the second embodiment, as a second option, a special shape (for example, a groove) for holding the spring 603 may be formed at the facing base side end portions of the two wedges 503, 504. The spring may be held as described later with reference to FIGS. 28A, 28B, 28C and 28D. (Even when the shape is not shown, all the embodiments of the present invention can hold the spring by using the groove or other shapes.)

In the second embodiment, for example, like two tabs 906 shown in FIGS. 27B and 27C, one or more sleeve fixing protrusions (tabs) are formed on the sleeve 403, and are press-fitted into the outer tube 1 to form one or more of fixing positions (fixing portions) of the sleeve 403.

In the second embodiment, as shown in FIGS. 27B and 27C, the four contact surfaces 404 (a total of eight contact surfaces 404) are provided at each of two axial positions, similarly to the first embodiment. As a third option, a contact surface of the wedge (see the contact surface 510 in FIG. 26D) raised radially inward from a periphery can be formed in a part of the wedges 503, 504 at two axial positions and two circumferential positions on an upper side among the four contact surfaces 404 at each of the two axial positions (that is, on a back side of the contact surface 404 of the sleeve 403).

<Shape for Holding Spring>

Each of FIGS. 28A, 28B, 28C and 28D is a top view showing an example of shapes of a spring and base side end portions of wedges to which the spring is attached. In these drawings, a configuration of the second embodiment described above is used as the example, but the shapes of the spring and the base side end portions of the wedges to which the spring is attached, which are shown in FIGS. 28A, 28B, 28C and 28D, are also applicable to other embodiments of the present invention. As will be described later, the telescopic structure according to the present invention can be used in a steering column of an automobile, but either an axial end portion of wedges 505, 506 and a sleeve 405 shown in FIGS. 28A, 28B, 28C and 28D may be on a driver side. In FIGS. 28A, 28B, 28C and 28D, the reference numeral 2 denotes an inner tube, the reference numeral 405 denotes a sleeve, the reference numerals 505, 506 denote wedges, and 603, 604, 605 and 606 denote springs.

Figure 28A:
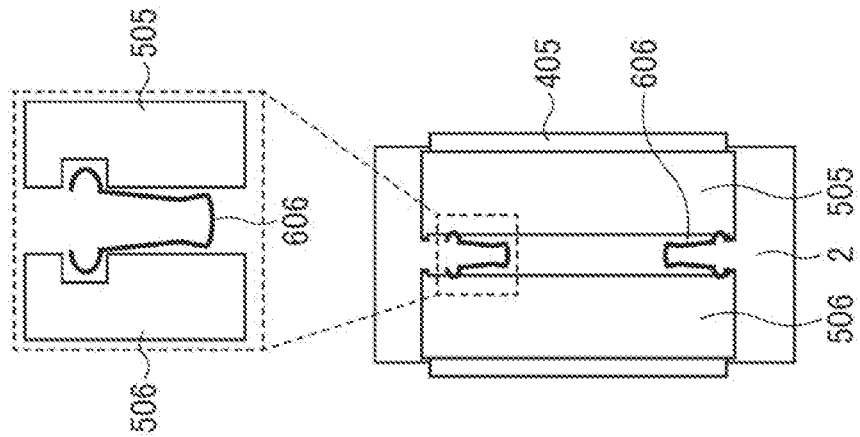
Figure 28B:
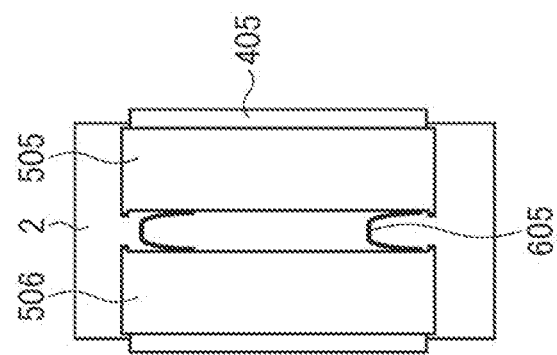
Figure 28C:
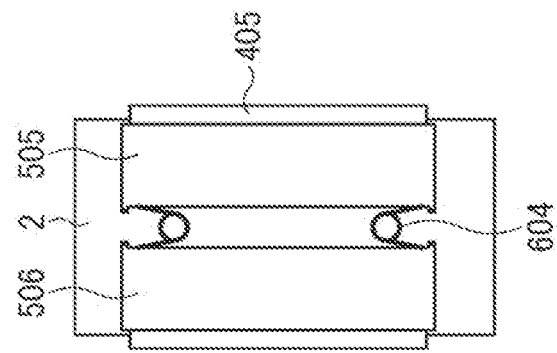
Figure 28D:
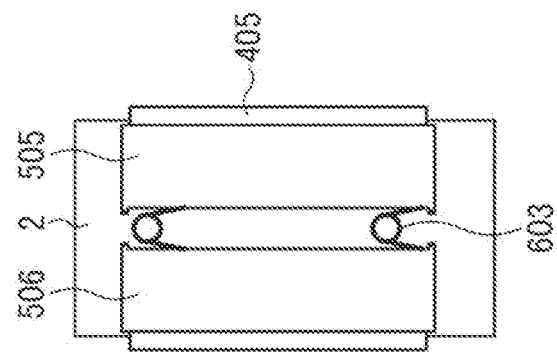

In a configuration in FIG. 28A, two torsion springs 603 are installed in the same direction in a gap between the two wedges 505, 506. In a configuration in FIG. 28B, two torsion springs 604 are installed in directions opposite to each other in the gap between the two wedges 505, 506. In a configuration in FIG. 28C, the two torsion clip springs 605 are installed in the same direction in the gap between the two wedges 505, 506. (Installation in directions opposite to each other is also possible.) In a configuration in FIG. 28D, a second type of clip spring 606 is installed in directions opposite to each other in the gap between the two wedges 505, 506, but may be installed in the same direction. An upper portion of FIG. 28D shows a partially enlarged view of an attachment portion of one clip spring 606. For example, as shown in the partially enlarged view, in all the embodiments of the present invention, a shape for fixing a spring at a correct position during assembly may be provided between the spring and a component to be mated.

The torsion spring, the clip spring or a similar element can effectively function due to a low spring constant thereof. For configurations of all the circumferential wedges, it is preferable that spring forces are separately applied to both axial end portions of the wedge (for example, using two springs) in order to ensure that no backlash occurs in contact surfaces at both the axial end portions. A configuration concept described in the item "shape for holding spring" can be applied to all other configurations of the circumferential wedges in the present specification.

Third Embodiment

FIG. 29 is an end view of a sliding interface using circumferential wedges as viewed in the axial direction according to a third embodiment of the present invention. In FIG. 29, the reference numeral 1 denotes an outer tube, the reference numeral 2 denotes an inner tube, the reference numeral 405 denotes a sleeve, reference numerals 507-1, 507-2 denote two connected wedges, and the reference numeral 605 denotes a spring. The sleeve 405 is fixed to the outer tube 1 (not shown), and covers an entire outer circumferential surface of the inner tube 2 except for a position of the gap G of the sleeve 405. Two wedges 507-1, 507-2 having wedge surfaces in the same direction and connected to each other are inserted between the outer tube 1 and the sleeve 405. An arrangement of the wedges 507-1, 507-2 in a configuration in FIG. 29 is obtained by applying the arrangement in (5) of FIG. 14 in the circumferential direction, and the sleeve 405 has two continuous portions 405-1, 405-2 having a shape that engages with wedge surfaces of the two wedges 507-1, 507-2. A spring 605 is inserted into a base side end portion of the two connected wedges 507-1, 507-2. The spring 605 biases the two wedges 507-1, 507-2 in such a direction that the two wedges 507-1, 507-2 engage more deeply with the two continuous portions 405-1, 405-2 of the sleeve 405. Due to biasing by the spring 605, no gap is formed between the outer tube 1 and the inner tube 2 at a circumferential position of a contact surface of the sleeve 405 on a side close to the wedges 507-1, 507-2. Since the inner tube 2 is pushed down by entry of the wedges 507-1, 507-2, the wedges 507-1, 507-2 enter between the sleeve 405 and the outer tube 1 to a depth at which no gap is formed between the outer tube 1 and the inner tube 2 even at a circumferential position of the contact surface of the sleeve 405 on a side far from the wedges of the sleeve 405. Therefore, no backlash occurs between the outer tube 1 and the inner tube 2 due to the wedges 507-1, 507-2 and the sleeve 405. Since the sleeve 405 is fixed to the outer tube 1 and the wedges 507-1, 507-2 are between the sleeve 405 and the outer tube 1, the inner tube 2 contacts only the sleeve 405. (That is, only the sleeve 405 receives a sliding frictional force.) Therefore, when the inner tube 2 is moved relative to the outer tube 1, the wedges 507-1, 507-2 are not affected at all by movement of the inner tube 2, and in particular, no friction occurs between the inner tube 2 and the wedges 507-1, 507-2.

Fourth Embodiment

FIG. 30 is an end view of a sliding interface using a circumferential wedge as viewed in the axial direction according to a fourth embodiment of the present invention. In FIG. 30, the reference numeral 1 denotes an outer tube, the reference numeral 2 denotes an inner tube, a reference numeral 407 denotes a sleeve, a reference numeral 408 denotes three contact surfaces of the sleeve 407 at this axial position, a reference numeral 509 denotes a wedge, and a reference numeral 607 denotes a spring. The sleeve 407 is fixed to the outer tube 1 (not shown), and covers an entire outer circumferential surface of the inner tube 2 except for a position of the gap G of the sleeve 407 such that entire surfaces of all the contact surfaces 408 are in contact with the outer circumferential surface of the inner tube 2. A portion where a radial thickness gradually decreases is formed on one end side of the sleeve 407 in the circumferential direction so as to engage with a wedge surface of the wedge 509. The wedge 509 is inserted between the portion of the sleeve 407 where the radial thickness decreases and the outer tube 1 such that a base end portion of the wedge 509 is at the position of the gap G of the sleeve 407. The spring 607 is inserted between an end portion of the sleeve 407 on a side opposite to the portion where the radial thickness decreases and the base end portion of the wedge 509. The three contact surfaces 408 of the sleeve 407 are arranged at substantially equal intervals in the circumferential direction on a radially inner surface of the sleeve 407, and one of the three contact surfaces 408 is located on a back side of a surface of the sleeve 407 that is in contact with the wedge 509. The spring 607 biases the wedge 509 in such a direction that the wedge 509 engages more deeply with the portion of the sleeve 407 where the radial thickness decreases. Due to biasing by the spring 607, no gap is formed between the outer tube 1 and the inner tube 2 at circumferential positions of the contact surfaces 408 of the sleeve 407 on a side close to the wedge 509, and the wedge 509 enters between the sleeve 407 and the outer tube 1 to a depth at which no gap is formed between the outer tube 1 and the inner tube 2 even at circumferential positions of the contact surfaces 408 of the sleeve 407 on a side far from the wedge due to the inner tube 2 being pushed down by entry of the wedge 509. Therefore, no backlash occurs between the outer tube 1 and the inner tube 2 due to the wedge 509 and the sleeve 407. Since the sleeve 407 is fixed to the outer tube 1 and the wedge 509 is between the sleeve 407 and the outer tube 1, the inner tube 2 contacts only the sleeve 407. (That is, only the sleeve 407 receives a sliding frictional force.) Therefore, when the inner tube 2 is moved relative to the outer tube 1, the wedge 509 is not affected at all by movement of the inner tube 2, and in particular, no friction occurs between the inner tube 2 and the wedge 509.

Fifth Embodiment

FIG. 31 is an end view of a sliding interface using circumferential wedges as viewed in the axial direction according to a fifth embodiment of the present invention. In FIG. 31, the reference numeral 1 denotes an outer tube, the reference numeral 2 denotes an inner tube, a reference numeral 410 denotes a sleeve, a reference numeral 411 denotes four contact surfaces of the sleeve 410 at this axial position, reference numerals 511, 512 denote wedges, a reference numeral 609 denotes a spring, and a reference numeral 908 denotes a fixing position (a fixing portion) of the sleeve 410. The sleeve 410 has four contact surfaces 411 at substantially equal intervals in the circumferential direction, and is fixed to the inner tube 2 at the fixing position 908 at a circumferential position shown on a lower side in FIG. 31 such that the gap G is located at a circumferential position shown on an upper side in FIG. 31. Entire surfaces of all the contact surfaces 411 are in contact with an inner circumferential surface of the outer tube 1. The sleeve 410 covers the entire inner circumferential surface of the outer tube 1 except for the position of the gap G. Portions where radial thicknesses gradually decrease are formed on both end sides of the sleeve 410 in the circumferential direction so as to respectively engage with wedge surfaces of the wedges 511, 512. The wedges 511, 512 are inserted between the portions of the sleeve 410 where the radial thicknesses decrease and the inner tube 2. Base end portions of the wedges 511, 512 and the spring 609 are arranged in vicinity of the gap G of the sleeve 410. The base end portions of the wedges 511, 512 are connected to each other by the spring 609. The spring 609 biases the two wedges 511, 512 in such directions that the two wedges 511, 512 engage more deeply with the two portions of the sleeve 410 where the radial thicknesses decrease. Due to biasing by the spring 609, no gap is formed between the outer tube 1 and the inner tube 2 at circumferential positions of the contact surfaces 411 on a side close to the wedges of the sleeve 410. Since the inner tube 2 is pushed down by entry of the wedges 511, 512, the wedges 511, 512 enter between the sleeve 410 and the inner tube 2 to a depth at which no gap is formed between the outer tube 1 and the inner tube 2 even at circumferential positions of the contact surfaces 411 of the sleeve 410 on a side far from the wedges 511, 512. Therefore, no backlash occurs between the outer tube 1 and the inner tube 2 due to the wedges 511, 512 and the sleeve 410. Since the sleeve 410 is fixed to the inner tube 2 and the wedges 511, 512 are between the sleeve 410 and the inner tube 2, the outer tube 1 contacts only the sleeve 410. (That is, only the sleeve 410 receives a sliding frictional force.) Therefore, when the inner tube 2 is moved relative to the outer tube 1, the wedges 511, 512 are not affected at all by movement relative to the outer tube 1, and in particular, no friction occurs between the outer tube 1 and the wedges 511, 512.

Sixth Embodiment

FIG. 32 is an end view of a sliding interface using circumferential wedges as viewed in the axial direction according to a sixth embodiment of the present invention. In FIG. 32, the reference numeral 1 denotes an outer tube, the reference numeral 2 denotes an inner tube, a reference numeral 414 denotes a sleeve, a reference numeral 415 denotes four contact surfaces of the sleeve 414 at this axial position, reference numerals 513, 514 denote wedges, reference numerals 611, 612 denote springs, and a reference numeral 910 denotes a fixing position (a fixing portion) of the sleeve. The sleeve 414 has four contact surfaces 415 at substantially equal intervals in the circumferential direction. The sleeve 414 is fixed to the outer tube 1 at the fixing position 910 at a circumferential position shown on an upper side in FIG. 32 such that the gap G is located at a circumferential position shown on a lower side in FIG. 32. Entire surfaces of all the contact surfaces 411 are in contact with an outer circumferential surface of the inner tube 2. The sleeve 414 covers the entire outer circumferential surface of the inner tube 2 except for the position of the gap of the sleeve 414. An arrangement of the wedges 513, 514 in a configuration in FIG. 32 is obtained by applying an arrangement in (1) of FIG. 14 in the circumferential direction. Portions where radial thicknesses gradually decrease from both end portions in the circumferential direction are formed on both ends of the sleeve 414 in the circumferential direction so as to respectively engage with wedge surfaces of the wedges 513, 514. The wedges 513, 514 are arranged between the portions of the sleeve 414 where the radial thicknesses decrease and the outer tube 1, and are inserted such that tip end portions of the wedges 513, 514 are in vicinity of the gap G of the sleeve 414. The springs 611, 612 are respectively inserted between base end portions of the wedges 513, 514 and stepped portions 414a formed in the sleeve 414. (Examples of shapes of the base end portions of the wedges 513, 514, the stepped portions 414a formed in the sleeve 414, and the springs 611, 612 will be described later with reference to FIGS. 34, 35 and 36.) The springs 611, 612 bias the two wedge 513, 514 in such directions that the two wedges 513, 514 engage more deeply with the two portions of the sleeve 414 where the radial thicknesses decrease. Due to biasing by the springs 611, 612, no gap is formed between the outer tube 1 and the inner tube 2 at circumferential positions of the contact surfaces 415 on a side close to the wedges 513, 514 of the sleeve 414. Since the inner tube 2 is pushed up by entry of the wedges 513, 514, the wedges 513, 514 enter between the sleeve 414 and the outer tube 1 to a depth at which no gap is formed between the outer tube 1 and the inner tube 2 even at circumferential positions of the contact surfaces 415 of the sleeve 414 on a side far from the wedges 513, 514. Therefore, no backlash occurs between the outer tube 1 and the inner tube 2 due to the wedges 513, 514 and the sleeve 414. Since the sleeve 414 is fixed to the outer tube 1 and the wedges 513, 514 are between the sleeve 414 and the outer tube 1, the inner tube 2 contacts only the sleeve 414. (That is, only the sleeve 414 receives a sliding frictional force.) Therefore, when the inner tube 2 is moved relative to the outer tube 1, the wedges 513, 514 are not affected at all by movement of the inner tube 2, and in particular, no friction occurs between the inner tube 2 and the wedges 513, 514.

Seventh Embodiment

FIG. 33 is an end view of a sliding interface using circumferential wedges as viewed in the axial direction according to a seventh embodiment of the present invention. In FIG. 33, the reference numeral 1 denotes an outer tube, the reference numeral 2 denotes an inner tube, a reference numeral 416 denotes a sleeve, a reference numeral 417 denotes four contact surfaces of the sleeve 416 at this axial position, reference numerals 517, 518 denote wedges, reference numerals 615, 616 denote springs, and a reference numeral 912 denotes a fixing position (a fixing portion) of the sleeve. The sleeve 416 has four contact surfaces 417 at substantially equal intervals in the circumferential direction, and is fixed to the outer tube 1 at the fixing position 912 at a circumferential position shown on an upper side in FIG. 33 such that the gap G is located at a circumferential position shown on a lower side in FIG. 33. Entire surfaces of all the contact surfaces 417 are in contact with an outer circumferential surface of the inner tube 2. The sleeve 416 covers the entire outer circumferential surface of the inner tube 2 except for a position of the gap G of the sleeve 416. An arrangement of the wedges 517, 518 in a configuration in FIG. 33 is obtained by applying the arrangement in (1) of FIG. 14 in the circumferential direction, and portions where radial thicknesses gradually decrease as being away from the fixing position 912 in the circumferential direction are formed on both sides of the fixing position 912 of the sleeve 416 in the circumferential direction so as to respectively engage with wedge surfaces of the wedges 517, 518. The wedges 517, 518 are inserted between the portions of the sleeve 416 where the radial thicknesses decrease and the outer tube 1. The wedges 517, 518 are arranged such that tip end portions thereof are on a side close to the fixing position 912 of the sleeve 416. The springs 615, 616 are respectively inserted between base end portions of the wedges 517, 518 and stepped portions 416a formed in the sleeve 416. Examples of shapes of the base end portions of the wedges 517, 518, the stepped portions 416a formed in the sleeve 416, and the springs 615, 616 will be described later with reference to FIGS. 34, 35, and 36. The springs 615, 616 bias the two wedge 517, 518 in such directions that the two wedges 517, 518 engage more deeply with the two portions of the sleeve 416 where the radial thicknesses decrease. Due to biasing by the springs 615, 616, no gap is formed between the outer tube 1 and the inner tube 2 at circumferential positions of the contact surfaces 417 on a side close to the wedges 517, 518 of the sleeve 416. Since the inner tube 2 is pushed down by entry of the wedges 517, 518, the wedges 517, 518 enter between the sleeve 416 and the outer tube 1 to a depth at which no gap is formed between the outer tube 1 and the inner tube 2 even at circumferential positions of the contact surfaces 417 of the sleeve 416 on a side far from the wedges 517, 518. Therefore, no backlash occurs between the outer tube 1 and the inner tube 2 due to the wedges 517, 518 and the sleeve 416. Since the sleeve 416 is fixed to the outer tube 1 and the wedges 517, 518 are between the sleeve 416 and the outer tube 1, the inner tube 2 contacts only the sleeve 416. (That is, only the sleeve 416 receives a sliding frictional force.) Therefore, when the inner tube 2 is moved relative to the outer tube 1, the wedges 517, 518 are not affected at all by movement of the inner tube 2, and in particular, no friction occurs between the inner tube 2 and the wedges 517, 518.

<Spring for Circumferential Wedge>

Although a clip spring or a torsion spring (similarly to the second embodiment of the present invention having a circumferential wedge configuration) may be used between the wedges and the sleeve in the sixth and seventh embodiments, FIG. 34 shows an example of a spring that may be used in a sliding interface having two springs and a circumferential wedge configuration such as the sliding interface using the circumferential wedges according to the sixth and seventh embodiments of the present invention. The spring in FIG. 34 is formed so as to have two wire springs 600a, 600b and an assembly support portion 600c. One ends of the wire springs 600a, 600b are respectively connected to both ends of the assembly support portion 600c. The wire springs 600a, 600b may be inserted from one axial end of the sliding interface, for example, as the springs 611, 612 in the sixth embodiment of the present invention, or as the springs 615, 616 in the seventh embodiment of the present invention. The assembly support portion 600c is a portion for gripping of the spring in FIG. 34 at the time of assembly, and has a curved shape extending along a periphery of a sliding interface having two springs and the circumferential wedge configuration so as not to interfere with an operation of the inner tube in a telescopic structure in the FIG. 34 (for example, as in the sixth and seventh embodiments). The spring in FIG. 34 may be used in any portion of an outer periphery in any of the embodiments of a sliding interface using two springs and a circumferential wedge configuration. The wire springs 600a, 600b are made of, for example, a straight metal ribbon. When the wire springs 600a, 600b are inserted into the sliding interface using two springs and the circumferential wedge configuration, the wire springs 600a, 600b push a wedge and a sleeve away from each other, for example, as schematically shown in FIGS. 35 and 36.

FIG. 35 is a view schematically showing an example of shapes of end surfaces of a base side end portion of the wedge and a stepped portion of the sleeve facing the base side end portion of the wedge, which is suitable for using the wire springs in the sliding interface using the circumferential wedge configuration, for example. A reference numeral 400 on an upper side in FIG. 35 denotes the end surface formed on the sleeve so as to face the base side end portion of the wedge with the spring interposed therebetween in the sliding interface using the circumferential wedge configuration, such as the stepped portion 414a of the sleeve 414 in FIG. 32 or the stepped portion 416a of the sleeve 416 in FIG. 33. Concave portions and a convex portion as shown are formed on the end surface 400 of the sleeve. A reference numeral 500 on a lower side in FIG. 35 denotes the end surface formed on the base side end portion of the wedge so as to face the end surface 400 formed on the sleeve with the spring interposed therebetween in the sliding interface using the circumferential wedge configuration, such as the base side end portions of the wedge 513 or 514 in FIG. 32 or the wedge 517 or 518 in FIG. 33. Convex portions and a concave portion respectively facing the concave portions and the convex portion of the end surface 400 of the sleeve are formed on the end surface 500 of the wedge. A wire spring 600 is inserted between the end surfaces 400, 500. The wire spring 600 is a spring installed between the end surface 400 formed on the sleeve and the end surface 500 formed on the base side end portion of the wedge, which face each other, in the sliding interface using the circumferential wedge configuration, such as the spring 611 or 612 in FIG. 32 or the spring 615 or 616 in FIG. 33. The inserted wire spring 600 pushes the convex portions of the end surfaces 400, 500 of the wedge and the sleeve in an attempt to straighten, and biases the wedge and the sleeve in directions away from each other. Arrow in FIG. 35 indicates the directions of a spring force.

Structures of the concave portions and the convex portions of the end surfaces shown in FIG. 35 can be provided at two positions separated from each other in the axial direction as schematically shown in FIG. 36.

Eighth Embodiment

FIG. 37A is an axial cross-sectional view of a sliding interface using axial wedges according to an eighth embodiment of the present invention, and FIG. 37B is an enlarged cross-sectional view of a peripheral portion of one wedge in a configuration in FIG. 37A. FIG. 37C is a partial perspective view of the telescopic structure having the configuration in FIG. 37A, and FIG. 37D is a partial perspective view of the telescopic structure in FIG. 37C with an outer tube removed. In FIGS. 37A to 37D, the reference numeral 1 denotes an outer tube, the reference numeral 2 denotes an inner tube, a reference numeral 421 denotes a sleeve, a reference numeral 422 denotes contact surfaces of the sleeve 421 with the inner tube 2, reference numerals 521, 522 denote wedges, and a reference numeral 621 denotes a spring. In the configuration in FIG. 37A, the sleeve 421 is fixed to the outer tube 1 (not shown), and an arrangement of the wedges 521, 522 in the configuration in FIG. 37A corresponds to the arrangement in (2) of FIG. 14. As shown in FIG. 37A, outer diameters of both axial end portions of an outer circumferential surface of the sleeve 421 gradually decrease from an axially outer side toward an axially inner side. An outer diameter of an axially central portion of the sleeve 421 on the outer circumferential surface is substantially constant. Each of the wedges 521, 522 has an inner peripheral surface where an inner diameter gradually increases toward the axially outer side, and an outer peripheral surface having a substantially constant outer diameter. The inner peripheral surfaces of the wedges 521, 522 are in contact with both axial end portions of the outer circumferential surface of the sleeve 421, and the outer peripheral surfaces of the wedges 521, 522 are in contact with both axial end portions of an inner circumferential surface of the outer tube 1. As shown in FIGS. 37C and 37D, the wedges 521, 522 are arranged at respective axial positions so as to extend over substantially an entire circumference in the circumferential direction. In the contact surfaces 422 of the sleeve 421 with the inner tube 2, the wedges 521, 522 are arranged at axial positions of the portions of the sleeve 421 where the outer diameters decrease. The spring 621 is connected between base side end surfaces of the wedges 521, 522, and pushes the wedges 521, 522 in directions in which the wedges 521, 522 are away from each other (axially outward). Axial dimensions of the wedges 521, 522 can also be increased in order to shorten the spring 621. Due to biasing by the spring 621, the wedges 521, 522 enter between the sleeve 421 and the outer tube 1 to a depth at which no gap is formed between the outer tube 1 and the inner tube 2 at the axial positions of the contact surfaces 422 of the sleeve 421. Therefore, no backlash occurs between the outer tube 1 and the inner tube 2 due to the wedges 521, 522 and the sleeve 421. Since the sleeve 421 is fixed to the outer tube 1 and the wedges 521, 522 are between the sleeve 421 and the outer tube 1, the inner tube 2 contacts only the sleeve 421. (That is, only the sleeve 421 receives a sliding frictional force.) Therefore, when the inner tube 2 is moved relative to the outer tube 1, the wedges 521, 522 are not affected at all by movement of the inner tube 2, and in particular, no friction occurs between the inner tube 2 and the wedges 521, 522.

Ninth Embodiment

FIG. 38 is an axial cross-sectional view of a sliding interface using axial wedges according to a ninth embodiment of the present invention. In FIG. 38, the reference numeral 1 denotes an outer tube, the reference numeral 2 denotes an inner tube, a reference numeral 423 denotes a sleeve, a reference numeral 424 denotes contact surfaces of the sleeve 423 with the inner tube 2, reference numerals 525, 526 denote wedges, and a reference numeral 623 denotes a spring. In a configuration in FIG. 38, the sleeve 423 is fixed to the inner tube 2 (not shown), and an arrangement of the wedges 525, 526 corresponds to the orientations in (2) of FIG. 14. As shown in FIG. 38, inner diameters of both axial end portions of an inner circumferential surface of the sleeve 423 gradually increase from an axially outer side toward an axially inner side. Each of the wedges 525, 526 has an outer peripheral surface where an outer diameter gradually decreases toward the axially outer side, and an inner peripheral surface having a substantially constant inner diameter. The outer peripheral surfaces of the wedges 525, 526 are in contact with both axial end portions of the inner circumferential surface of the sleeve 421, and the inner peripheral surfaces of the wedges 525, 526 are in contact with both axial end portions of an outer circumferential surface of the inner tube 2. The wedges 525, 526 are arranged at respective axial positions so as to extend over substantially an entire circumference in the circumferential direction. Corresponding to the contact surfaces 424 of the sleeve 423 with the outer tube 1, the wedges 525, 526 are arranged at axial positions of the portions of the sleeve 423 where the inner diameters decrease. The spring 623 is connected between base side end surfaces of the wedges 525, 526, and pushes the wedges 525, 526 in directions in which the wedges 525, 526 are away from each other (axially outward). Axial dimensions of the wedges 525, 526 can also be increased in order to shorten the spring 623. Due to biasing by the spring 623, the wedges 525, 526 enter between the sleeve 423 and the inner tube 2 to a depth at which no gap is formed between the outer tube 1 and the inner tube 2 at the axial positions of the contact surfaces 424 of the sleeve 423. Therefore, no backlash occurs between the outer tube 1 and the inner tube 2 due to the wedges 525, 526 and the sleeve 423. Since the sleeve 423 is fixed to the inner tube 2 and the wedges 525, 526 are between the sleeve 423 and the inner tube 2, the outer tube 1 contacts only the sleeve 423. (That is, only the sleeve 423 receives a sliding frictional force.) Therefore, when the inner tube 2 is moved relative to the outer tube 1, the wedges 525, 526 are not affected at all by movement of the outer tube 1, and in particular, no friction occurs between the outer tube 1 and the wedges 525, 526.

Tenth Embodiment

FIG. 39A is an axial cross-sectional view of a sliding interface using axial wedges according to a tenth embodiment of the present invention, and FIG. 39B is an enlarged cross-sectional view of a peripheral portion of one wedge in a configuration in FIG. 39A. In FIGS. 39A and 39B, the reference numeral 1 denotes an outer tube, the reference numeral 2 denotes an inner tube, a reference numeral 425 denotes a sleeve, a reference numeral 426 denotes contact surfaces of the sleeve 425 with the inner tube 2, reference numerals 529, 530 denote wedges, and a reference numeral 625 denotes a spring. In the configuration of FIG. 39A, the sleeve 425 is fixed to the outer tube 1 (not shown), and an arrangement of the wedges corresponds to the arrangement in (2) of FIG. 14. The tenth embodiment shown in FIG. 39A is different from the eighth embodiment shown in FIG. 37A in that in the eighth embodiment, the wedges 521, 522 extend in the circumferential direction over substantially the entire circumference (see FIGS. 37C to 37D), whereas in the tenth embodiment, a configuration including the wedges 529, 530, the spring 625 and the sleeve 425 shown above the central axis O in FIG. 39A is provided only at one or more circumferential positions. Below the central axis in FIG. 39A, there is shown a cross section at a circumferential position where the configuration including the wedges 529, 530, the spring 625 and the sleeve 425 is not provided. The configuration and operation of the wedges 529, 530, the spring 625 and the sleeve 425 described above are the same as those of the eighth embodiment described with reference to FIG. 37A except for the difference described above, and description thereof will be omitted. In the tenth embodiment as well, no backlash occurs between the outer tube 1 and the inner tube 2 due to the wedges 529, 530 and the sleeve 425. Since the sleeve 425 is fixed to the outer tube 1 and the wedges 529, 530 are between the sleeve 425 and the outer tube 1, the inner tube 2 contacts only the sleeve 425. (That is, only the sleeve 425 receives a sliding frictional force.) Therefore, when the inner tube 2 is moved relative to the outer tube 1, the wedges 529, 530 are not affected at all by movement of the inner tube 2, and in particular, no friction occurs between the inner tube 2 and the wedges 529, 530.

Eleventh Embodiment

FIG. 40A is a perspective view of a telescopic structure having a sliding interface using an axial wedge according to an eleventh embodiment of the present invention, FIG. 40B is a perspective view of a sleeve constituting the sliding interface in the telescopic structure in FIG. 40A, FIG. 40C is a perspective view of the wedge constituting the sliding interface in the telescopic structure in FIG. 40A, FIG. 40D is an end view of the telescopic structure in FIG. 40A as viewed in the axial direction, FIG. 40E is a perspective view obtained by virtually cutting an assembly of the sleeve and the wedge in the telescopic structure in FIG. 40A along a vertical plane passing through a central axis, FIG. 40F is a top view of a lower half of a portion where the sliding interface of the telescopic structure in FIG. 40A exists, obtained by virtually removing an upper half from a horizontal plane passing through the central axis, and FIG. 40G is an enlarged view of a peripheral portion of one wedge in FIG. 40F.

In FIGS. 40A to 40G, the reference numeral 1 denotes an outer tube, the reference numeral 2 denotes an inner tube, a reference numeral 430 denotes a sleeve, reference numerals 431, 432 denote contact surfaces of the sleeve 430 with the inner tube 2, a reference numeral 540 denotes a wedge, and a reference numeral 630 denotes a spring. In a configuration shown in FIGS. 40A to 40G, the sleeve 430 is fixed to the outer tube 1 at a fixing position (a fixing position) 930.

As shown in FIG. 40B, the sleeve 430 has a gap G over an entire axial length at a position of 180° when a position of the fixing position (the fixing portion) 930 to the outer tube 1 directly above in the FIG. 40B is set to a circumferential position of 0°. As shown in FIG. 40F, an outer circumferential surface of the sleeve 430 has a conical surface shape in which an outer diameter gradually increases at a constant angle from one end side (a left end side in FIG. 40F) toward the other end side in the axial direction. As shown in FIG. 40C, the wedge 540 has a gap S over an entire axial length at a circumferential position of 0°. As shown in FIG. 40F, an inner circumferential surface of the wedge 540 has a conical surface shape in which an inner diameter gradually increases at the same angle as the outer circumferential surface of the sleeve 430 from one end side (the left side in FIG. 40F) toward the other end side in the axial direction so as to fit the substantially entire outer circumferential surface of the sleeve 430 having the conical surface shape. In this way, when the wedge 540 is fitted to the outer circumferential surface of the sleeve 430, the assembly as shown in the perspective view of FIG. 40E virtually cut along the vertical plane is formed. Since the gaps G, S are provided over the entire length in the axial direction, the sleeve 430 and the wedge 540 can be respectively extended and contracted.

As shown in FIGS. 40D and 40F, an inner circumferential surface of the sleeve 430 and an outer circumferential surface of the wedge 540 are cylindrical surfaces. As shown in FIGS. 40B, 40E and 40F, the contact surfaces 431, 432 each having a constant axial width and raised from a periphery over substantially an entire circumference in the circumferential direction are formed in vicinity of both axial ends of the inner circumferential surface of the sleeve 430. The inner tube 2 having a cylindrical outer circumferential surface comes into contact with the sleeve 430 and slides on the contact surfaces 431, 432. In vicinity of both axial ends of the outer circumferential surface of the wedge 540, contact surfaces 541, 542 each having a constant axial width and raised from a periphery over substantially an entire circumference in the circumferential direction are formed at axial positions substantially the same as the contact surfaces 431, 432 of the sleeve 430. The wedge 540 comes into contact with the inner circumferential surface (the cylindrical surface) of the outer tube 1 at the contact surfaces 541, 542.

As shown in FIGS. 40F and 40G, the sleeve 430 further includes a lip 434 protruding radially outward at one axial end (a left end in 40F), and the spring 630 is installed between a base side end surface of the wedge 540 and the lip 434. The spring 630 pushes the wedge 540 in a direction in which engagement between the wedge 540 and the sleeve 430 becomes deeper. Due to biasing by the spring 630, the wedge 540 enters more deeply between the sleeve 430 and the outer tube 1, and substantially no gap is formed between the outer tube 1 and the inner tube 2 at positions of the contact surfaces 431, 432 of the sleeve 430 and the contact surfaces 541, 542 of the wedge 540. Therefore, no backlash occurs between the outer tube 1 and the inner tube 2. Since the sleeve 430 is fixed to the outer tube 1 and the wedge 540 is between the sleeve 430 and the outer tube 1, the inner tube 2 contacts only the sleeve 430. (That is, only the sleeve 430 receives a sliding frictional force.) Therefore, when the inner tube 2 is moved relative to the outer tube 1, the wedge 540 is not affected at all by movement of the inner tube 2, and in particular, no friction occurs between the inner tube 2 and the wedge 540.

As shown in FIG. 40F, the wedge 540 may include a tab 543 that is used to remove or displace the wedge 540 and to assist assembly of the inner tube 2.

<Modifications of Configuration of Axial Wedge>

An object of the lip 434 as shown in FIGS. 40F and 40G is to provide a surface for holding the spring. The lip does not need to extend over the entire circumference. The outer tube, the sleeve, the wedge or a combination thereof may be provided with one or more lips including outward and/or inward protrusions. The lip may be provided at a front side, a rear side or an intermediate position in the axial direction. Other methods (other than using the lip) of applying a spring force to the wedge may be used. The lip and the spring may be incorporated into one component (for example, a push nut attached to the outer tube).

In the configuration shown in FIGS. 40A to 40G, the gaps G, S in the circumferential direction of the wedge 540 and the sleeve 430 have a phase difference of 180°, but the circumferential positions of the gaps G, S of the wedge 540 and the sleeve 430 may be in the same phase or different phases. A space defined by the gap S of the wedge 540 may be used to attach the sleeve 430 to the outer tube 1. Accordingly, the wedge 540 can be prevented from rotating. Although not necessary, other methods may be used to prevent rotation of the wedge 540.

The sleeve 430 and the wedge 540 may be inverted by 180° such that the conical interface is inclined in a direction opposite to the axial direction. In this case, a tab for assisting the assembly of the inner tube by pushing (rather than pulling) the wedge 540 can be used.

FIG. 41A is an axial cross-sectional view schematically showing only necessary portions of a telescopic structure having a modification of a sliding interface using an axial wedge, and FIG. 41B is an end view schematically showing only necessary portions as viewed in the axial direction for description of assembly steps of the telescopic structure in FIG. 41A. A reference numeral 110 denotes an outer tube, the reference numeral 2 denotes an inner tube, a reference numeral 440 denotes a sleeve, a reference numeral 545 denotes a wedge, a reference numeral 111 denotes a tab provided on the outer tube 110, and a reference numeral 635 denotes a spring-loaded set screw. In a configuration in FIGS. 41A and 41B, the sleeve 440 is fixed to the outer tube 110 at a fixing position (a fixing portion) 940. In the configuration shown in FIGS. 40A to 40G, the spring 630 provided between the lip 434 protruding radially outward at one axial end of the sleeve 440 and the base side end surface of the wedge 540 pushes the base side end surface of the wedge 540, thereby biasing the wedge 540 in the axial direction. In contrast, in the configuration in FIGS. 41A and 41B, the outer tube 110 has the tab 111 protruding radially inward, the spring-loaded set screw 635 is attached to the tab 111, and a tip end of the set screw 635 pushes a base side end surface of the wedge 545, thereby biasing the wedge 545 in the axial direction. As shown in FIG. 41B, the tab 111 has a shape protruding radially inward only in a part in the circumferential direction at one axial end of the outer tube 110. A circumferential width of the tab 111 is smaller than a circumferential width of the gap S of the wedge 545. (If necessary, the circumferential width of the tab 111 is smaller than a circumferential width of the gap G of the sleeve 440.) As shown in step 1 in FIG. 41B, at a beginning of assembly, the wedge 545 and the sleeve 440 are inserted into the outer tube 110 such that a circumferential position of the wedge 545 is aligned with a circumferential position of the tab 111 and the tab 111 passes through the gap S of the wedge 545 (or, if necessary, a circumferential position of the sleeve 440 is aligned with the circumferential position of the tab 111 such that the tab 111 also passes through the gap G of the sleeve 440). Thereafter, as shown in step 2 in FIG. 41B, the wedge 545 is rotated in the circumferential direction, so that the circumferential position of the tab 111 and a circumferential portion of the wedge 545 other than the gap S overlap as viewed in the axial direction. When the set screw 635 is incorporated into the tab 111, the tip end of the set screw 635 pushes the base side end surface of the wedge 545 to bias the wedge 545 in the axial direction.

FIG. 42 is an axial cross-sectional view schematically showing only necessary portions of a telescopic structure having another modification of a sliding interface using an axial wedge. In FIG. 42, the reference numeral 1 denotes an outer tube, the reference numeral 2 denotes an inner tube, a reference numeral 450 denotes a sleeve, a reference numeral 451 denotes a lip provided on the sleeve 450, a reference numeral 550 denotes a wedge, and a reference numeral 650 denotes a spring. As shown in a configuration in FIG. 42, two conical surfaces 701, 702 are formed on an inner circumferential surface of the wedge 550. Correspondingly, two conical surfaces separated from each other in the axial direction are formed on an outer circumferential surface of the sleeve 450 so as to engage with the two conical surfaces 701, 702 of the wedge 550. The lip 451 protruding radially outward is provided at one axial end of the sleeve 450. The spring 650 is provided between the lip 451 and a base side end surface of a wedge element of the wedge 550 on a side close to the lip 451. In the configuration shown in FIGS. 40A to 40G, since the wedge 540 has one conical surface formed over substantially the entire axial length of the sleeve 430, radial thicknesses of the sleeve 430 and the wedge 540 increase as shown in FIG. 40F, and a radial clearance between the outer tube 1 and the inner tube 2 increases. In the configuration shown in FIG. 42, since the wedge 550 has the two connected relatively small conical surfaces 701, 702, radial thicknesses of the sleeve 450 and the wedge 550 are sufficiently small. Therefore, a radial clearance C between the outer tube 1 and the inner tube 2 can be reduced.

FIG. 43 is an axial cross-sectional view schematically showing only necessary portions of a telescopic structure having still another modification of a sliding interface using an axial wedge. In FIG. 43, the reference numeral 110 denotes an outer tube, the reference numeral 2 denotes an inner tube, a reference numeral 460 denotes a sleeve, a reference numeral 560 denotes a wedge, the reference numeral 111 denotes a tab provided on the outer tube 110, and the reference numeral 635 denotes a spring-loaded set screw. The sleeve 460 is fixed to the outer tube 110 at a fixing position (a fixing portion) 940. In a configuration in FIG. 43, the wedge 560 extends only in a certain circumferential range including a circumferential position of 0°, and the wedge 560 does not exist at least in a certain circumferential range including a circumferential position of 180°. A sum of radial thicknesses of the sleeve 460 and the wedge 560 is relatively small in the certain circumferential range including the circumferential position of 180°. Other configurations and operations of the configuration in FIG. 43 are the same as those of the configuration shown in FIG. 41A.

Twelfth Embodiment

FIG. 44A is an end view of a telescopic structure including a sliding interface having an axial wedge as viewed in the axial direction according to a twelfth embodiment of the present invention, FIG. 44B is a perspective view of a sleeve constituting the sliding interface in FIG. 44A, FIG. 44C is a perspective view showing an assembly of the sleeve and the wedge in FIG. 44B, FIG. 44D is a perspective view obtained by virtually cutting the assembly in FIG. 44C along a vertical plane parallel to a central axis, FIG. 44E is a partial perspective view of a configuration example near one end portion of the assembly in FIG. 44C as viewed obliquely from above, FIG. 44F is a schematic view showing a spring setting example at one end portion of the assembly shown in FIG. 44E, FIG. 44G is a schematic view showing another spring setting example at one end portion of the assembly shown in FIG. 44E, FIG. 44H is a schematic view showing a spring setting example in another configuration example near one end portion of the assembly in FIG. 44C, and FIG. 44I is a schematic view showing a spring setting example in a configuration example near the other end portion of the assembly in FIG. 44C. In FIGS. 44A to 44I, the reference numeral 1 denotes an outer tube, the reference numeral 2 denotes an inner tube, a reference numeral 470 denotes a sleeve, a reference numeral 471 denotes four contact surfaces of the sleeve 470, a reference numeral 472 denotes wedge mating surfaces of the sleeve 470, and a reference numeral 570 denotes a wedge.

As shown in FIG. 44B, the sleeve 470 has the gap G extending over an entire axial length on an upper side, the wedge mating surfaces 472 to be mated with the wedge 570 on both sides of the gap G in the circumferential direction, and the four contact surfaces 471 on an inner circumferential surface. The inner circumferential surface of the sleeve 470 is a cylindrical surface. An outer circumferential surface of the sleeve 470 other than the wedge mating surfaces 472 is a cylindrical surface, but the wedge mating surface 472 is a conical surface where an outer diameter gradually decreases from one end (a Y side in drawing) toward the other end (an X side in the drawing) in the axial direction. Therefore, a thickness of the wedge mating surface 472 of the sleeve 470 gradually decreases from one end (the Y side) toward the other end (the X side) in the axial direction. The wedge mating surfaces 472 are mated with the wedge 570 as shown in FIGS. 44C and 44D. An outer peripheral surface of the wedge 570 is a cylindrical surface, and an inner peripheral surface of the wedge 570 is conical surfaces having inclinations corresponding to the wedge mating surfaces 472 of the sleeve 470. Therefore, a thickness of the wedge 570 gradually increases from one end (the Y side) toward the other end (the X side) in the axial direction. As shown in FIG. 44D, the sleeve 470 has tabs 990 (fixing portions) to be press-fitted into the outer tube 1 at a circumferential position of 180° when a circumferential position of the gap G is set to 0°. The sleeve 470 and the wedge 570 are inserted into the outer tube 1, and the inner tube 2 is inserted into the sleeve 470 to form the sliding interface having a cross section as shown in FIG. 44A.

In order to bias the wedge 570 in a direction to deepen engagement with the sleeve 470, one or more springs may be installed on the X side (a side where the wedge 570 is thick) or the Y side (a side where the wedge 570 is thin) of the assembly in FIG. 44C. FIGS. 44E, 44F, 44G and 44H show an example in which one or more springs are provided on the X side, and FIG. 44I shows an example in which one or more springs are provided on the Y side.

FIG. 44E is the partial perspective view of the configuration example of near an end portion of the assembly in FIG. 44C on the X side (the side where the wedge 570 is thick) as viewed obliquely from above. In the configuration example in FIG. 44E, a central portion of an X-side end portion of the wedge 570 is removed such that portions 470a, 470a of the X-side end portion of the sleeve 470 on both sides of the gap G in the circumferential direction are exposed. A circular protrusion 473 as shown in FIG. 44E is formed on each of the exposed portions 470a, 470a of the X-side end portion of the sleeve 470. A torsion spring 671 or a wire spring 672 is installed around the protrusions 473, for example, as shown in FIGS. 44F and 44G, and the wedge 570 is pushed toward the other end that is the Y side in the axial direction (the side where the wedge 570 is thin) as indicated by an arrow in FIG. 44E by a force of the spring that attempts to straighten. FIG. 44H schematically shows the spring setting example in another configuration example near the X-side (the side where the wedge 570 is thick) end portion of the assembly in FIG. 44C. In the example in FIG. 44H, the X-side end portion of the wedge 570 is removed so as to expose the two protrusions 473 of the sleeve 470 and a peripheral portion thereof, torsion springs 673, 674 are installed respectively around the protrusions 473, and the wedge 570 is pushed toward the other end that is the Y side in the axial direction by forces of the torsion springs 673, 674 that attempt to straighten.

FIG. 44I schematically shows the spring setting example in the configuration example near the Y-side (the side where the wedge 570 is thin) end portion of the assembly in FIG. 44C. In the example shown in FIG. 44I, a circular protrusion 571 is formed on the inner peripheral surface of the wedge 570 near the Y-side end portion and at a circumferential position where the gap G of the sleeve 470 is formed. A torsion spring 675 is installed around the protrusion 571, and the wedge 570 is pulled toward the Y side in the axial direction as indicated by an arrow in FIG. 44I by a force of the torsion spring 675 that attempts to straighten.

An advantage of the twelfth embodiment of the present invention is that a minimum number of components (one wedge component, one sleeve component and one spring portion) may be used. The spring may be provided near one side (the X side or the Y side) in the axial direction in order to simplify the assembly. When the telescopic structure including the sliding interface according to the twelfth embodiment is used in the steering column described later, the side where the wedge is thick may be provided on a side close to the driver or a side far from the driver in the axial direction.

Thirteenth Embodiment

FIG. 45A is a perspective view of an assembly of a sleeve and wedges constituting a sliding interface having the axial wedges according to a thirteenth embodiment of the present invention, FIG. 45B is an enlarged view of vicinity of one end portion in the assembly in FIG. 45A, FIG. 45C is an end view of the assembly in FIG. 45A as viewed in the axial direction, FIG. 45D is a partial end view showing a configuration within a broken line in the assembly in FIG. 45C in an enlarged manner, FIG. 45E is a perspective view of the sleeve in the assembly in FIG. 45A, FIG. 45F is a perspective view showing a relative arrangement of the two wedges in the assembly in FIG. 45A, FIG. 45G is a top view of the assembly in FIG. 45A obtained by virtually removing an upper half of an outer tube as viewed from above, and FIG. 45H is a partial exploded perspective view showing a cross section of the two wedges and the sleeve obtained by virtually cutting the assembly in FIG. 45A along a vertical plane at a position of a line I-I in FIG. 45G. In FIGS. 45A to 45H, the reference numeral 1 denotes an outer tube, a reference numeral 480 denotes a sleeve, a reference numeral 481 denotes contact surfaces (sleeve pads) of the sleeve 480 with the inner tube 2, a reference numeral 482 denotes contact surfaces of the sleeve 480 with the outer tube, reference numerals 581, 582 denote wedges, a reference numeral 483 denotes wedge mating surfaces of the sleeve 480 with the wedge 581, a reference numeral 484 denotes a wedge mating surface of the sleeve 480 with the wedge 582, a reference numeral 485 denotes inclined surfaces for facilitating assembly, a reference numeral 487 denotes rectangular portions removed from the sleeve 480, a reference numeral 581' denotes contact surfaces of the wedge 581 with the outer tube, the reference numeral 582' denotes contact surfaces of the wedge 582 with the outer tube, a reference numeral 583 denotes wedge surfaces of the wedge 581 to be mated with the wedge mating surfaces 483 of the sleeve 480, a reference numeral 584 denotes a wedge surface of the wedge 582 to be mated with the wedge mating surface 484 of the sleeve 480, a reference numeral 589 denotes a protrusion provided near an axial end portion of the wedge 582 to fix a spring, and a reference numeral 995 denotes a fixing position (a fixing position) of the sleeve 480 to the outer tube.

As shown in FIGS. 45E and 45C, an inner circumferential surface of the sleeve 480 has four raised contact surfaces 481 provided at substantially equal intervals in the circumferential direction near both axial ends. On a back side of the contact surfaces 481 on both sides of the gap G over an entire axial length at one circumferential position, the wedge mating surfaces 483 with the wedge 581 are formed on one end side in the axial direction (a right side in FIG. 45E, FIG. 45F and FIG. 45H, an X side in the drawing), and the wedge mating surfaces 484 with the wedge 582 are formed on the other end side in the axial direction (a left side in FIG. 45E, FIG. 45F and FIG. 45H, a Y side in the drawing). A reference numeral 489 denotes the sleeve pads, where the contact surfaces 481 and the wedge mating surfaces 483, 484 are formed in the sleeve 480 and which are formed to be thinner than the other portions. As shown in FIG. 45H, the wedge mating surfaces 483, 484 are inclined such that outer diameters gradually increase from an axial end side toward an axial inner side, corresponding to shapes of the wedge surfaces 583 of the wedge 581 and the wedge surface 584 of the wedge 582, which will be described later. The wedge mating surfaces 483, 484 are formed by providing stepped portions 483a, 484a on an outer circumferential surface of the sleeve 480. Therefore, as shown in FIGS. 45A, 45C, 45F and 45G, when the wedges 581, 582 are mated with the wedge mating surfaces 483, 484, the stepped portions 483a, 484a prevent the wedges 581, 582 from displacing in the circumferential direction. As an option, flexibility of the sleeve 480 can be increased by removing a portion of the sleeve 480 or reducing a thickness of the sleeve 480 in an area between the wedge mating surfaces 483, 484 in the axial direction. In a configuration of FIGS. 45A, 45C, 45E, 45G and 45H, the rectangular portion 487 of the sleeve 480 is removed in an area (indicated by a broken line in FIG. 45E) between the sleeve pads 489, 489 (the wedge mating surfaces 483, 484) in the axial direction. As shown in FIGS. 45E and 45G, the inclined surface 485 having an inclination in which an outer diameter gradually decreases toward an inner side in the axial direction (the X side) is formed on the axial inner side of the wedge mating surface 484 in the outer circumferential surface of the sleeve 480, thereby facilitating the assembly (insertion into the outer tube from a right side to a left side in the FIG. 45H). The raised contact surface 482 is formed on the back side of the contact surface 481 (the outer circumferential surface of the sleeve 480) that is far from the gap G of the sleeve 480, and the contact surface 482 comes into contact with the outer tube. The sleeve 480 is fixed to the outer tube at the fixing position (the fixing portion) 995 (see FIG. 45C).

As shown in FIGS. 45A, 45F and 45G, the wedge 581 has axial and circumferential dimensions so as to substantially cover the wedge mating surface 483 on one end side (the X side) in the axial direction. The wedge 582 includes circumferential both side portions 582a, 582a having axial and circumferential dimensions so as to substantially cover the wedge mating surfaces 484 on the other end side (the Y side) in the axial direction, the inclined surfaces 485 adjacent to the wedge mating surfaces 484, and the removed rectangular portions 487, and a circumferential central portion 582b that connects the circumferential both side portions 582a, 582a and covers the gap G of the sleeve 480. As shown in FIGS. 45E, 45F and 45H, the wedge surface 583 that fits the wedge mating surface 483 is formed on an inner peripheral surface of the wedge 581, and the wedge surface 584 that fits the wedge mating surface 484 is formed on the inner peripheral surface of the wedge 582. In particular, as shown in FIG. 45H, the wedge surfaces 583, 584 are inclined such that inner diameters gradually increase from the axial end side toward the axial inner side, corresponding to the wedge mating surfaces 483, 484. Outer peripheral surfaces of the wedges 581, 582 are cylindrical surfaces similarly to a radially inner surface of the outer tube. The contact surfaces 581', 582' formed on the outer peripheral surfaces of the wedges 581, 582 come into contact with an inner circumferential surface of the outer tube. As shown in FIG. 45H, the other end in the axial direction (a Y-side end portion) of the wedge surface 584 of the wedge 582 is chamfered to facilitate the assembly (the insertion into the outer tube from the right side to the left side in FIG. 45H).

As shown in FIGS. 45A and 45B, the protrusion 589 is provided in a portion extending to one end in the axial direction (an X-side end portion) of the wedge 582. A circumferential central portion of one end portion in the axial direction (the X-side end portion) of the wedge 581 corresponding to the protrusion 589 and a peripheral portion has a shape that exposes the protrusion 589 and the peripheral portion. A spring is provided on the protrusion 589. FIG. 45G shows an example in which a torsion spring 680 is attached, but for example, a wire spring may be used. Here, since the torsion spring or the wire spring attempts to straighten, the wedge 581 is pushed to the other side in the axial direction (the Y side). The protrusion 589 is pushed toward one side (the X side) in an own direction by reaction of a force pushing the wedge 581 upward. In FIG. 45H, the wedges 581, 582 are shown away from the sleeve 480 for illustration, but when the wedges 581, 582 and the sleeve 480 are actually inserted into the outer tube, the sleeve 480 and the wedges 581, 582 in FIG. 45H are inserted between the outer tube and the inner tube without a gap at least at positions of the contact surfaces 481. The wedge surface 583 of the wedge 581 fits the wedge mating surface 483 of the sleeve 480. The wedge surface 584 of the wedge 582 fits the wedge mating surface 484 of the sleeve 480. Here, as described above, due to an action of the spring 680, the wedge 581 is biased to the other side in the axial direction (the Y side), and the wedge 582 is biased to one side in the axial direction (the X side). That is, the arrangement in (1) of FIG. 14 is applied to an arrangement of the wedges in the configuration of FIGS. 45A, 45C, 45E, 45G and 45H. Due to biasing by the spring 680, the wedge 581 enters more deeply between the sleeve 480 and the inner tube to a depth at which no gap is formed between the outer tube and the inner tube at an axial position of the contact surface 481 of the sleeve 480. At the same time, the wedge 582 enters more deeply between the sleeve 480 and the inner tube to a depth at which no gap is formed between the outer tube and the inner tube at an axial position of the wedge mating surface 484 of the sleeve 480. Therefore, no backlash occurs between the outer tube and the inner tube due to the wedges 581, 582 and the sleeve 480. Since the sleeve 480 is fixed to the outer tube and the wedges 581, 582 are between the sleeve 480 and the outer tube, the inner tube contacts only the sleeve 480. (That is, only the sleeve 480 receives a sliding frictional force.) Therefore, when the outer tube is moved relative to the outer tube, the wedges 581, 582 are not affected at all by movement of the inner tube, and in particular, no friction occurs between the outer tube and the wedges 581, 582.

In the configuration of FIGS. 45A, 45C, 45E, 45G and 45H, a direction in which components are assembled to the outer tube is the direction from the right side to the left side in FIG. 45H (the Y direction). An order of the assembly is an order of the wedge 582, the wedge 581, the inner tube and the spring, but the order of the inner tube and the spring can be swapped.

In the configuration of FIGS. 45A to 45H, the wedges are biased so as to be pulled in directions toward each other corresponding to the arrangement in (1) of FIG. 14, but the configuration may be modified to a configuration in which the wedges are biased so as to be pushed in directions away from each other corresponding to the arrangement in (2) of FIG. 14.

Advantages of the embodiment of the configuration of the FIGS. 45A, 45C, 45E, 45G and 45H are as follows.

1. The sleeve pad 489 can be clamped independently.
2. Since only one spring is used, the number of components can be further reduced.
3. As shown in FIG. 45G, since the spring 680 can be installed at the end in the axial direction, the spring 680 can be easily attached and detached. That is, the spring 680 can be easily pushed in or be removed in order to loosen a grip force on the inner tube.

FIG. 45D shows the configuration within the broken line in the assembly in FIG. 45C in the enlarged manner. In the configuration in FIG. 45D, the wedge 581 may have an extension portion 581'-1 that sufficiently or excessively covers the back side of the contact surface 481 of the sleeve 480.

Fourteenth Embodiment

FIG. 46A is an end view of one of two sliding interfaces using circumferential wedges as viewed in the axial direction in a telescopic structure having three tubes according to a fourteenth embodiment of the present invention, and FIG. 46B is an end view of the telescopic structure according to the fourteenth embodiment as viewed from one end side in the axial direction. For example, an example of the telescopic structure having the three tubes, which is used in a steering column, will be described later with reference to FIGS. 51A to 52C. In FIGS. 46A and 46B, a reference numeral 11 denotes an outer tube, a reference numeral 12 denotes an intermediate tube, a reference numeral 13 denotes an inner tube, a reference numeral 41 denotes a sleeve constituting the sliding interface between the outer tube 11 and the intermediate tube 12, a reference numeral 41' denotes contact surfaces of the sleeve 41 with the intermediate tube 12, a reference numeral 42 denotes a sleeve constituting the sliding interface between the intermediate tube 12 and the inner tube 13, a reference numeral 42' denotes contact surfaces of the sleeve 42 with the inner tube 13, reference numerals 51, 52 denote wedges between the outer tube 11 and sleeve 41 constituting the sliding interface between the outer tube 11 and the intermediate tube 12, reference numerals 53, 54 denote wedge between the intermediate tube 12 and the sleeve 42 and the inner tube 13, a reference numeral 61 denotes a spring provided between the wedges 51, 52, a reference numeral 62 denotes a spring provided between the wedges 53, 54, a reference numeral 91 denotes a fixing position (a fixing portion) for fixing the sleeve 41 to the outer tube 11, and a reference numeral 92 denotes a fixing position (a fixing portion) for fixing the sleeve 42 to the intermediate tube 12.

The sliding interface between the outer tube 11 and the intermediate tube 12 and the sliding interface between the intermediate tube 12 and the inner tube 13 in FIGS. 46A and 46B are the same as the sliding interface according to the first embodiment (see FIG. 26A), and thus redundant description will be omitted. A configuration between the inner tube which might contain (for example, a shaft in the steering column) 13 and the outer tube 11 may be offset in axis. When the telescopic structure in FIGS. 46A and 46B is used in the steering column, there is an advantage that a height of a column can be kept low. However, all the tubes in the telescopic structure in FIGS. 46A and 46B may be concentric. The wedges 51, 52, 53, 54 may be on the same side as the gap G of the sleeves 41, 42 or on the opposite side, and the number of wedges may be one. The embodiment in which the wedges are arranged in the axial direction can be similarly applied to the telescopic structure having the three tubes.

<Application to Steering Column>

The telescopic structure according to the present invention can be used in a steering column that enables axial adjustment of a steering wheel (along a steering shaft). In the following example of the steering column, an outer tube (housing) having a telescopic structure can be further inclined with respect to a top bracket by a tilt mechanism. That is, the following example of the steering column is an example of an Electric Rake-and-Reach (ERR) steering column. Here, Rake is an inclination of the steering wheel, and Rach is telescopic movement of the steering wheel. FIG. 47A is a view showing a state in which the telescopic structure is extended in an example of a steering column of an automobile using the telescopic structure according to the present invention, FIG. 47B is a view showing a state in which the telescopic structure is shortened in the example in FIG. 47A, and FIG. 47C is a view showing a state in which the telescopic structure is inclined (tilted down) downward in the example in FIG. 47A. In FIGS. 47A, 47B and 47C, a reference numeral 1000 denotes a steering shaft, a 1001 denotes an outer tube (a housing), a reference numeral 1002 denotes an inner tube, a reference numeral 1101 denotes a force feedback actuator (FFA), a reference numeral 1102 denotes a (telescopic operation) gear motor, a reference numeral 1103 denotes a screw shaft, a reference numeral 1104 denotes a nut, a reference numeral 1105 denotes a nut, a reference numeral 1106 denotes a (tilt operation) gear motor, a reference numeral 1107 denotes a screw shaft, and a reference numeral 1108 denotes a top bracket. Although not shown, the sliding interface according to the present invention may be provided at a position indicated by an arrow SI (between the outer tube 1001 and the inner tube 1002). Although not shown, a steering wheel is attached to the steering shaft 1000, and the steering shaft 1000 is rotatably supported around an axis inside the inner tube 1002 on a side close to a driver (for example, as shown in FIG. 21 of U.S. Pat. No. 9,254,861). (All the contents of U.S. Pat. No. 9,254,861 are incorporated in the present specification by reference.) The telescopic structure enables control within a range from the state in FIG. 47A in which the inner tube 1002 is fully extended to outside of the outer tube 1001 to the state in FIG. 47B in which the inner tube 1002 fully accommodated inside the outer tube 1001, whereby the driver of the automobile can set a position of the steering wheel in a front-rear direction to any position. FIG. 47C shows a state in which the telescopic structure is inclined downward (tilted down) as a result of an operation of a tilt mechanism in the example of the steering column.

<Tube Configuration Example>

In the steering column, in order to adjust an axial length, two or more tubes can slide on each other, and one sliding interface is provided for each sliding position. Hereinafter, five usage examples of the telescopic structure having various configurations will be described. In each of the sliding interfaces, (when only a length at which the tubes are functionally engaged with each other is taken into consideration,) a length at which the wedge and the sleeve of the sliding interface are effectively engaged is preferably sufficiently large (for example, a minimum of 70 mm) in order to provide good bending rigidity. FIG. 48A is a view showing an engagement length L of a sliding interface (in a fully engaged state), and FIG. 48B is a view showing the sliding interface in a non-fully engaged state. A pair of tubes 1, 2 are always fully (or almost fully) engaged with a sliding interface 3 during all operations of the steering wheel. When the steering wheel is adjusted axially as close to the driver as possible (to a "fully extended" position), one or more sliding interfaces 3 are located as close to the driver as possible. At this time, the best bending rigidity is provided.

FIGS. 49A and 49B are views schematically showing a telescopic structure having two tubes and one sliding interface as a first usage example of the telescopic structure according to the present invention in the steering column, in which FIG. 49A is a view showing a fully extended state, and FIG. 49B is a view showing a fully shortened state. In FIGS. 49A and 49B, the reference numeral 1000 denotes a steering shaft, a reference numeral 1010 denotes an outer tube (a housing), a reference numeral 1020 denotes an inner tube, a reference numeral 1030 denotes a sliding interface, the reference numeral 1101 denotes a force feedback actuator (FFA), and the reference numeral 1108 denotes a top bracket. In the first usage example, one sliding interface 1030 is provided between the inner tube 1020 and the outer tube 1010. The sliding interface (a wedge and a sleeve) 1030 is fixed to the outer tube 1010 to eliminate radial backlash between the inner tube 1020 and the outer tube 1010. When the inner tube 1020 is pulled in, the sliding interface 1030 does not move relative to the outer tube 1010, and a distance from the sliding interface 1030 to a steering wheel decreases. This is beneficial for bending rigidity. This example may also be modified such that a tube having a smaller diameter (the inner tube 1020) is located on an FFA 1101 side, and a tube having a larger diameter (the outer tube 1010) is located on a driver side.

FIGS. 50A and 50B are views schematically showing a telescopic structure having two tubes and one sliding interface as a second usage example of the telescopic structure according to the present invention in a steering column, in which 50A is a view showing a fully extended state, and 50B is a view showing a fully shortened state. In FIGS. 50A and 50B, the reference numeral 1000 denotes a steering shaft, the reference numeral 1010 denotes an outer tube (a housing), the reference numeral 1020 denotes an inner tube, a reference numeral 1031 denotes a sliding interface, the reference numeral 1101 denotes a force feedback actuator (FFA), and the reference numeral 1108 denotes a top bracket. In the second usage example, the sliding interface (a wedge and a sleeve) 1031 is fixed to the inner tube 1020 to eliminate radial backlash between the inner tube 1020 and the outer tube 1010. When the inner tube 1020 is pulled in, the sliding interface 1031 moves together with the inner tube 1020, and a distance from the sliding interface 1031 to a steering wheel does not change. This example may also be modified such that a tube having a smaller diameter (the inner tube 1020) is located on an FFA 1101 side, and a tube having a larger diameter (the outer tube 1010) is located on a driver side.

FIGS. 51A, 51B and 51C are views schematically showing a telescopic structure having three tubes and two sliding interfaces as a third usage example of the telescopic structure according to the present invention in a steering column, in which 51A is a view showing a fully extended state, 51B is a view showing a partially extended state, and 51C is a view showing a fully shortened state. In FIGS. 51A, 51B and 51C, the reference numeral 1000 denotes a steering shaft, the reference numeral 1010 denotes an outer tube (a housing), a reference numeral 1021 denotes an inner tube, a reference numeral 1022 denotes an intermediate tube, reference numerals 1032, 1033 respectively denote first and second sliding interfaces, the reference numeral 1101 denotes a force feedback actuator (FFA), and the reference numeral 1108 denotes a top bracket. In the third usage example, the first sliding interface (a wedge and a sleeve) 1032 is arranged between the inner tube 1021 and the intermediate tube 1022, and the second sliding interface (a wedge and a sleeve) 1033 is arranged between the intermediate tube 1022 and the outer tube 1010. The outer tube 1010 is provided on an FFA 1101 side, the inner tube 1021 is provided on a driver side, and the intermediate tube 1022 is provided therebetween. The first sliding interface 1032 is fixed to the intermediate tube 1022 to eliminate radial backlash between the intermediate tube 1022 and the inner tube 1021. The second sliding interface 1033 is fixed to the outer tube 1010 to eliminate radial backlash between the outer tube 1010 and the intermediate tube 1022. Even when the inner tube 1021 moves relative to the intermediate tube 1022, the first sliding interface 1032 does not move relative to the intermediate tube 1022. Even when the intermediate tube 1022 moves relative to the outer tube 1010, the second sliding interface 1033 does not move relative to the outer tube 1010. In this arrangement, the sliding interfaces 1032, 1033 are maintained closer to a driver. This is preferable for bending rigidity. The second sliding interface 1033 may have a longer, equal or shorter engagement length as compared to that of the first sliding interface 1032. The longer engagement length may be used for the sleeve farther from the driver.

This example may be modified as follows.

1. The first sliding interface 1032 is fixed to the intermediate tube 1022, and the second sliding interface 1033 is also fixed to the intermediate tube 1022.

2. The first sliding interface 1032 is fixed to the inner tube 1021, and the second sliding interface 1033 is fixed to the intermediate tube 1022.

3. The first sliding interface 1032 is fixed to the inner tube 1021, and the second sliding interface 1033 is fixed to the outer tube 1010.

The third usage example may also be modified such that a tube (the inner tube) having a minimum diameter is located on an FFA side, and a tube (the outer tube 1010) having a maximum diameter is located on a driver side. The four methods of fixing the two sliding interfaces described herein can also be applied to the modified arrangement described above.

FIGS. 52A, 52B and 52C are views schematically showing a telescopic structure having three tubes and two sliding interfaces as a fourth usage example of the telescopic structure according to the present invention in a steering column, in which 52A is a view showing a fully extended state, 52B is a view showing a partially extended state, and 52C is a view showing a fully shortened state. In FIGS. 52A, 52B, and 52C, the reference numeral 1000 denotes a steering shaft, a 1011 denotes an outer tube, a reference numeral 1023 denotes an inner tube, a reference numeral 1024 denotes an intermediate tube, reference numerals 1034, 1035 denote first and second sliding interfaces, the reference numeral 1101 denotes a force feedback actuator (FFA), and the reference numeral 1108 denotes a top bracket. In the fourth usage example, the first sliding interface 1034 is arranged between the inner tube 1023 and the outer tube 1011, and the second sliding interface 1035 is arranged between the intermediate tube 1024 and the outer tube 1011. In the axial direction, the intermediate tube 1024 is provided on an FFA 1101 side, the inner tube 1023 is provided on a driver side, and the outer tube 1011 is provided therebetween. As shown in the drawing, the inner tube 1023 is arranged inside the intermediate tube 1024 to provide an additional stroke. The first sliding interface 1034 and the second sliding interface 1035 are fixed to the outer tube 1011 (a cross section is shown in the drawing). The first sliding interface 1034 eliminates radial backlash between the inner tube 1023 and the outer tube 1011, and the second sliding interface 1035 eliminates radial backlash between the outer tube 1011 and the intermediate tube 1024. When the inner tube 1023 moves relative to the outer tube 1011, the first sliding interface 1034 does not move relative to the outer tube 1011. When the outer tube 1011 moves relative to the intermediate tube 1024, the second sliding interface 1035 does not move relative to the outer tube 1011. An advantage of this configuration is that the two sliding interfaces 1034, 1035 do not overlap with each other in the axial direction, thus avoiding a triple fitting state between the three tubes. The second sliding interface 1035 may have a longer, equal or shorter engagement length as compared to that of the first sliding interface 1034. The longer engagement length may be used for the sleeve farther from the driver.

This example may also be modified such that the first sliding interface 1034 is still fixed to the outer tube 1011, and the second sliding interface 1035 is fixed to the intermediate tube 1024. This example may also be modified such that a tube having a minimum diameter (the inner tube 1023) may be located on the FFA 1101 side, and a tube having an intermediate diameter (the intermediate tube 1024) may be located on the driver side. The two methods of fixing the two sliding interfaces described herein can also be applied to this case.

FIG. 53 is a view schematically showing a telescopic structure having three tubes and two sliding interfaces as a fifth usage example of the telescopic structure according to the present invention in a steering column, and is a view showing a state in which the telescopic structure is fully extended. In FIG. 53, the reference numeral 1000 denotes a steering shaft, a reference numeral 1012 denotes an outer tube, a reference numeral 1025 denotes an inner tube, a reference numeral 1026 denotes an intermediate tube, reference numerals 1036, 1037 respectively denote first and second sliding interfaces, the reference numeral 1101 denotes a force feedback actuator (FFA), and the reference numeral 1108 denotes a top bracket. In the fifth usage example, the first sliding interface 1036 is arranged between the inner tube 1025 and the outer tube 1012, and the second sliding interface 1037 is arranged between the inner tube 1025 and the outer tube 1012. In the axial direction, the intermediate tube 1026 is provided on an FFA 1101 side, the inner tube 25 is provided on a driver side, and the outer tube 1012 is provided therebetween. The inner tube 1025 is arranged inside the intermediate tube 1026 to provide an additional stroke. Both the first sliding interface 1036 and the second sliding interface 1037 are fixed to the outer tube 1012. The first sliding interface 1036 eliminates radial backlash between the inner tube 1025 and the outer tube 1012, and the second sliding interface 1037 eliminates radial backlash between the outer tube 1012 and inner tube 25. When the intermediate tube 1026 moves relative to the outer tube 1012, the first sliding interface 1036 does not move relative to the outer tube 1012. When the outer tube 1012 moves relative to the intermediate tube 1026, the second sliding interface 1037 does not move relative to the outer tube 1012. An advantage of this configuration is that the two sliding interfaces 1036, 1037 do not overlap with each other in the axial direction, thus avoiding a triple fitting state between the three tubes 1012, 1025, 1026. The first sliding interface 1036 may have a longer, equal or shorter engagement length as compared to that of the second sliding interface 1037. The longer engagement length may be used for the sleeve farther from the driver.

The configuration of the sliding interfaces for the three tubes is not limited to the above-described example. Any embodiment of the sliding interface between the inner tube and the outer tube may implement the telescopic structure having three tubes by being used for the first sliding interface and/or the second sliding interface. The first and second sliding interfaces may have the same configuration or different configurations, may have the same thickness or different thicknesses, and may be made of the same material or different materials. When the two configurations are essentially the same, the two configurations may have phases in different rotation directions. Regardless of the sliding interface configuration for the three tubes, the three tubes may have a concentric axis, or may have off-set axes. The two sliding interfaces may have the same sliding force or different sliding forces as long as the two sliding interfaces are controlled by a spring force. For example, when a single actuator is used to move three tubes as in a telescope, different sliding forces are preferably used if friction is used to control a sliding order of the tubes.

<Temperature Compensation>

Expansion and contraction during a temperature change may create a gap in the sliding interface including the wedge and the sleeve between the tubes, resulting in occurrence of backlash. Therefore, in the telescopic structure according to the present invention, a method and an operation of temperature compensation for solving this problem will be described below.

<First Temperature Compensation Method>

In a first temperature compensation method, utilizing a difference in thermal expansion characteristics of the inner tube, the outer tube and a component sandwiched therebetween, members having three different thermal expansion characteristics are basically used, and correction is performed using the thermal expansion characteristics of the member sandwiched between the inner tube and the outer tube with a gap that may occur during the temperature change. At this time, basic conditions are that (1) an outer tube having a central thermal expansion coefficient is used, (2) an inner tube having a smaller thermal expansion coefficient is used, and (3) a member having the largest thermal expansion coefficient is used as the member sandwiched between the outer tube and the inner tube, and these conditions are combined. Specifically, in consideration of a change in a radius of the outer tube and a change in a radius of the inner tube during the temperature change, the thermal expansion characteristics of the member sandwiched between the outer tube and the inner tube are set so as to match a difference in the changes in radius. In general, a thickness of a plastic material of the sliding interface is configured to be approximately 1 mm. However, when an inner diameter of the outer tube is 50 to 70 mm, the temperature change can be compensated by setting the thickness of the plastic material to approximately 4 to 5 mm. These values are obtained when the outer tube is made of aluminum, the inner tube is made of steel, and the sleeve is made of a polyoxymethylene material (POM). However, since the configuration of the present invention is not limited to the use of any specific material, a thickness of an ideal sliding interface (a wedge and a sleeve) may be recalculated based on a selected material, geometric conditions (for example, dimensions such as a diameter and a tube thickness), and the principle of thermal expansion. This configuration concept for the temperature compensation may be used for circumferential and axial wedges. It should be noted that the sleeve expands or contracts not only in the radial direction but also in the axial direction and the circumferential direction. Therefore, in order to realize the temperature compensation as described above, it is necessary that the wedge and the sleeve do not move relative to each other in a wedge direction during the temperature change. This requires, for example, sufficiently high friction between the wedge and the sleeve. When the wedge and the sleeve move relative to each other, a radial thickness changes at a position of the wedge due to movement along an inclination of a wedge surface, and thus radial backlash or undesirable press-fitting may occur.

<Second Temperature Compensation Method>

When the inner tube and the outer tube are made of the same material, the temperature compensation can be performed using the following configuration. In general, when the tubes are made of the same metal material and the sleeve is made of a plastic material, a radial thickness of the sleeve greatly changes according to the temperature change. However, in the configuration of the sliding interface according to the present invention, an excessive change in the radial thickness is offset by using a change in a circumferential length of the sleeve during the temperature change.

A configuration according to the sixth embodiment of the present invention (FIG. 32) will be described as an example with reference to FIG. 54. FIG. 54 is the same as FIG. 32, showing a length (L) from the fixing position (the fixing portion) 910 to a wedge position W, except that a contact surface A far from the wedge position W and a contact surface B at the wedge position W are shown separately. Here, a case of a temperature rise will be considered. The sleeve 414 expands in the circumferential direction (see arrows in the drawing) and in the radial direction. The expansion is larger than that in a case where the sleeve 414 is made of the same material as the tubes 1, 2. It is assumed that there is movement between the wedges 513, 514 and the sleeve 414 at the wedge position W (for example, due to sufficient friction between the wedges 513, 514 and the outer tube 1) during the temperature change. As a result of the temperature change, a thickness of the sleeve 414 increases alone due to thermal expansion at the contact surface A far from the wedge position W. However, at the wedge position W (the contact surface B), a change in thickness is a sum of two effects: (1) an increase in thickness due to the thermal expansion and (2) a decrease in thickness due to relative movement between the sleeve 414 and the wedges 513, 514. The second effect may be set such that an excessive change in thickness (that is, an amount exceeding a desired amount for filling a gap between the tubes 1, 2) is offset at the contact surfaces A, B. As a result, radial backlash does not occur in the wedges 513, 514 and the tubes 1, 2 as a whole. However, since the compensation for both the contact surfaces (A, B) is defined only by the contact surface B, the final thicknesses at the contact surfaces A, B are not equal, and the inner tube is slightly offset in the radial direction in this process.

The second effect described above depends on the length (L) from the fixing position (the fixing portion) 910 to the wedge position W. When L is larger, the sleeve 414 moves more at the wedge position W, and the second effect is greater. This effect also depends on a wedge angle. When the wedge angle is larger, the second effect is greater. By optimizing the length L and/or other parameters (for example, a wedge angle, a diameter, a thickness and a thermal property) and using the principle of thermal expansion, a thin sliding interface (for example, having a thickness of 3 mm) that compensates for temperature can be configured using this configuration. The length L should also be determined while attempting to achieve a preferable configuration for the contact surface (described with reference to FIGS. 18, 19, 20A to 20F, and 21A to 21C, for example). For example, as depicted in FIG. 54, the contact surfaces B may be formed at positions of approximately 270° from each other. If the rotation enhances bending rigidity for the selected length L, the entire wedge sleeve can be rotated by 90°.

Assuming that linear expansion is proportional to the temperature change, the same principle can be used to compensate for a temperature decrease by this method.

The configuration concept for the temperature compensation described above may be applied to a configuration in the axial direction described below. However, in this case, sleeve expansion or contraction in the axial direction (rather than in the circumferential direction) is used to perform the compensation. FIG. 55 is a partial cross-sectional view schematically showing a distance between a fixing position of a sleeve and a wedge position in a sliding interface having axial wedges, which is considered in a second temperature compensation method. In FIG. 55, the reference numeral 1 denotes an outer tube, the reference numeral 2 denotes an inner tube, a reference numeral 490 denotes a sleeve, reference numerals 591, 592 denote wedges, a reference numeral 991 denotes a fixing position (a fixing portion) of the sleeve 490 to the outer tube 1, the reference numeral L denotes a length from the fixing position 991 to the wedge position W, and a reference numeral f denotes a biasing force by a biasing member. Here, the length L is an axial length (instead of a circumferential length). Operational effects are the same except that the length L relates to a configuration of contact surfaces in the axial direction and a configuration of a wedge sleeve length regardless of a configuration of the contact surfaces in the circumferential direction, and thus description thereof will be omitted. In FIG. 55, the contact surface A is located at another circumferential position (not shown), and no wedge is formed at the circumferential position.

<Third Temperature Compensation Method>

The outer tube has a thermal expansion coefficient higher than that of the inner tube, and the wedges and the sleeve have a thermal expansion coefficient higher than that of the outer tube. However, the temperature compensation can also be performed even when a radial gap between the inner tube and the outer tube is smaller than an ideal clearance determined according to the first configuration concept for the temperature compensation. In this case, a thickness of the sleeve does not change sufficiently due to the temperature change. However, in the following configuration, an additional change in the thickness is provided by using a change in a circumferential length of the sleeve due to the temperature change.

A configuration according to the seventh embodiment of the present invention (FIG. 33) will be described as an example with reference to FIG. 56. FIG. 55 is the same as FIG. 33, showing a length (L) from the fixing position (the fixing portion) 912 to the wedge position W, except that the contact surface A far from the wedge position W and B at the wedge position W are shown separately. Here, a case of a temperature rise will be considered. The sleeve 416 expands in the circumferential direction and in the radial direction, but radial expansion is not sufficient to fill a gap. It is assumed that there is movement between the wedges 517, 518 and the sleeve 416 at the wedge position W, for example, due to sufficient friction between the wedges 517, 518 and the outer tube 1, during the temperature change. As a result of the temperature change, a thickness of the sleeve 416 is increased alone due to thermal expansion at A far from the wedges 517, 518. However, at the wedge position W (B), a change in thickness is a sum of two effects: (1) an increase in thickness due to the thermal expansion, and (2) an increase in thickness due to relative movement between the sleeve 416 and the wedges 517, 518. The second effect described above can be set so as to give an additional change in thickness required for filling the gap between the tubes 1, 2. As a result, radial backlash does not occur as a whole. However, since the compensation for both A and B is defined only by B, the final thicknesses of A, B are not equal, and the inner tube 2 is slightly offset in the radial direction in this process.

The second effect described above depends on the length (L) from the fixing position (the fixing portion) 912 to the wedge position W. When L is larger, the sleeve 416 moves more at the wedge position W, and the second effect is greater. This effect also depends on a wedge angle. When the wedge angle is larger, the second effect is greater. By optimizing the length L and/or other parameters (for example, a wedge angle, a diameter, a thickness and a thermal property) and using the principle of thermal expansion, a thin sliding interface (for example, having a thickness of 3 mm) that compensates for temperature can be configured using this configuration. The length L should also be determined while attempting to achieve a preferable configuration for the contact surface (described with reference to FIGS. 18, 19, 20A to 20F, and 21A to 21C, for example). For example, as depicted in FIG. 56, B may be formed at positions of approximately 90° from each other. If the rotation enhances bending rigidity for the selected length L, the sliding interface (the wedges 517, 518 and the sleeve 416) can be rotated by 90°.

Assuming that linear expansion is proportional to the temperature change, the same principle can be used to compensate for a temperature decrease by this method.

The configuration concept for the temperature compensation described above may be applied to a configuration in the axial direction described below. However, in this case, sleeve expansion or contraction in the axial direction (rather than in the circumferential direction) is used to perform the compensation. FIG. 57 is a partial cross-sectional view schematically showing a distance between a fixing position of a sleeve and a wedge position in a sliding interface having axial wedges, which is considered in a third temperature compensation method. In FIG. 57, the reference numeral 1 denotes an outer tube, the reference numeral 2 denotes an inner tube, a reference numeral 492 denotes a sleeve, reference numerals 593, 594 denote wedges, a reference numeral 992 denotes a fixing position (a fixing portion) of the sleeve 492 to the outer tube 1, the reference numeral L denotes a length from the fixing position 992 to the wedge position, and the reference numeral f denotes a biasing force by a biasing member. Here, the length L is an axial length (instead of a circumferential length). In FIG. 57, A is located at another circumferential position (not shown), and no wedge is formed at the circumferential position.

<Spring and Temperature Compensation>

Any one of the concepts of the temperature compensation described can be used to intentionally cause backlash during the temperature rise. At this time, the spring can remove the backlash. This may be beneficial as grease flows more easily and the backlash is easily detected in a high temperature state. (The grease may or may not be used in the tubes that slide relative to the sleeve, but the grease is not considered to be used between the wedges and the sleeve). The spring can do a better job in terms of actually eliminating the backlash than the theory of thermal expansion at the time of providing full temperature compensation.

<Selective Material Removal>

The wedge may be configured to have a flexible shape by selective material removal. Flexibility can prevent the wedge from undesirably sticking (immobilizing) at the wedge position (for example, during the temperature change). This may cause a large sliding force. FIG. 58A shows an example of the wedge 5 without material removal, and FIGS. 58B to 58D show examples of the wedge 5 with material removed.

<Examples of Materials>

Although the present invention is not limited to the use of any specific material, several examples of combinations of materials that may be used are shown here.

For example, as shown in FIGS. 49A and 50A, the telescopic structure in the steering column having one sliding interface can be made of the following materials. However, the present invention is not limited thereto.

TABLE 1

| Outer tube | Inner tube | Wedge, sleeve |
| --- | --- | --- |
| Magnesium | Aluminum | POM or PA |
| Magnesium | Steel | POM or PA |
| Aluminum | Aluminum | POM or PA |
| Aluminum | Steel | POM or PA |
| Steel | Steel | POM or PA |

For example, as shown in FIG. 51A and the like, the telescopic structure in the steering column having two sliding interfaces can be made of the following materials. However, the present invention is not limited thereto.

TABLE 2

| Outer tube | Intermediate tube | Inner tube | Wedge, sleeve |
| --- | --- | --- | --- |
| Magnesium | Aluminum | Steel | POM or PA |
| Magnesium | Aluminum | Aluminum | POM or PA |
| Magnesium | Steel | Steel | POM or PA |
| Aluminum | Aluminum | Aluminum | POM or PA |
| Aluminum | Aluminum | Steel | POM or PA |
| Aluminum | Steel | Steel | POM or PA |
| Steel | Steel | Steel | POM or PA |

For example, as shown in FIGS. 52A and 53, the telescopic structure in the steering column having two sliding interfaces can be made of the following materials. However, the present invention is not limited thereto.

TABLE 3

| Outer tube | Intermediate Tube | Inner Tube | Wedge, sleeve |
| --- | --- | --- | --- |
| Aluminum | Steel | Steel | POM or PA |
| Aluminum | Aluminum | Aluminum | POM or PA |
| Aluminum | Steel | Aluminum | POM or PA |
| Aluminum | Aluminum | Steel | POM or PA |
| Magnesium | Steel | Steel | POM or PA |
| Magnesium | Aluminum | Aluminum | POM or PA |
| Magnesium | Steel | Aluminum | POM or PA |
| Magnesium | Aluminum | Steel | POM or PA |
| Steel | Steel | Steel | POM or PA |

<Lengths of Two Sliding Interface>

In the configuration having two sliding interfaces, an axial (effective) length of the sliding interface including the wedge and the sleeve can be optimized in relation to bending rigidity of the steering column. During an entire stroke of a certain telescope operation, the lengths of the first and second sliding interfaces 1034, 1035 can be adjusted by shifting a position of the intermediate tube 1028 located between the two tubes (the outer tube 1010 and the inner tube 1027) in a fully extended state in the axial direction. FIG. 59 shows an example of a change in the lengths of the two sliding interfaces 1034, 1035 in the telescopic structure having the two sliding interfaces 1034, 1035. A configuration before a position of the intermediate tube 1028 is shifted is shown on an upper side in FIG. 59, and a configuration after the position of the intermediate tube 1028 is shifted by d is shown on a lower side in FIG. 59. In this case, an axial length e of the first sliding interface 1034 is adjusted to e−d, and an axial length f of the second sliding interface 1035 is adjusted to f+d. The reference numeral 1000 denotes a steering shaft, the reference numeral 1010 denotes an outer tube (a housing), a reference numeral 1028 denotes an intermediate tube, a reference numeral 1027 denotes an inner tube, a reference numeral 1034 denotes a first sliding interface, a reference numeral 1035 denotes a second sliding interface, the reference numeral 1101 denotes a force feedback actuator (FFA), and the reference numeral 1108 denotes a top bracket.

It is considered that, when a force is applied to the steering shaft 1000 (or a wheel), deflection caused only by the three tubes 1010, 1028, 1027 (for example, by ignoring other factors such as a tilt mechanism) changes as shown in FIG. 60 according to a shift amount d of the intermediate tube 1028 (the axial length f+d of the second sliding interface 1035). In this way, an optimum value of the shift amount of the intermediate tube 1028 is obtained, and the lengths of the tubes 1010, 1028, 1027 and the lengths of the first and second sliding interfaces 1034, 1035 can be optimized.

<Thickness and Diameter>

A radial thickness of the sliding interface is not limited to any specific value, and a diameter of the sliding interface or the tube is not limited to any specific value. The thickness of the sliding interface depends on a wedge angle, a configuration for the temperature compensation, and a configuration of the spring, and may be approximately 3 to 5 mm. The smaller the thickness of the sliding interface is, the more rigid and the larger the tube can be, which may be advantageous in terms of bending rigidity. The diameters of the tube and the sliding interface may be, for example, approximately 50 to 80 mm.

The present invention is not limited to the embodiments described above, and combinations of the configurations of the embodiments and modifications and applications made by those skilled in the art based on the description of the specification and well-known technologies are also included in the scope of the present invention for protection.

What is claimed is:

1. A telescopic structure, comprising:
   an outer tube having a central axis;
   an inner tube arranged in the outer tube and movable in the outer tube in an axial direction of the central axis; and
   an interface structure provided between an inner circumferential surface of the outer tube and an outer circumferential surface of the inner tube,
   wherein the interface structure includes a sleeve, a wedge and a biasing member,
   wherein the sleeve is arranged between the inner circumferential surface of the outer tube and the outer circumferential surface of the inner tube,
   wherein the sleeve includes:
      at least one fixing portion fixed to a first tube that is one of the outer tube and the inner tube;
      at least one contact surface configured to come into contact with a second tube that is the other of the outer tube and the inner tube; and
      a wedge mating surface configured to be mated with the wedge,
   wherein the wedge is arranged between the first tube and the sleeve and is mated with the wedge mating surface of the sleeve,
   wherein the biasing member biases the wedge so as to engage the wedge between the first tube and the sleeve while allowing the sleeve and the second tube to slide on each other,
   wherein the sleeve has a gap over an entire length in the axial direction at a circumferential position,
   wherein the sleeve has an intermittent cylindrical shape due to the gap, and
   wherein the inner tube and the outer tube have a circular cross section.

2. The telescopic structure according to claim 1,
   wherein the wedge has an displacement prevention structure configured to prevent an axial displacement from the wedge mating surface.

3. The telescopic structure according to claim 1,
   wherein the biasing member is configured to bias the wedge in
      (i) the axial direction,
      (ii) a circumferential direction of the first tube, or
      (iii) an oblique direction having a direction component of the axial direction and a direction component of the circumferential direction.

4. The telescopic structure according to claim 1,
   wherein the wedge mating surface and the contact surface are arranged at the same position in the axial direction and the circumferential direction of the first tube.

5. The telescopic structure according to claim 4,
   wherein at the same position, the first tube, the wedge, the sleeve and the second tube overlap each other without a gap.

6. The telescopic structure according to claim 1,
   wherein a plurality of the contact surfaces are arranged at different positions in the axial direction and are raised from a periphery of the sleeve to come into contact with the second tube.

7. The telescopic structure according to claim 1,
   wherein the sleeve is made of a material having flexibility.

8. The telescopic structure according to claim 1,
   wherein the sleeve is made of a plastic material.

9. The telescopic structure according to claim 1,
   wherein the biasing member is a spring.

10. A steering column including the telescopic structure according to claim 1,
    wherein the steering column rotatably supports a steering shaft to which a steering wheel is attached.

* * * * *